US012340066B2

(12) United States Patent
Leahy, Jr. et al.

(10) Patent No.: US 12,340,066 B2
(45) Date of Patent: Jun. 24, 2025

(54) GEOSPATIAL ASSET MANAGEMENT

(71) Applicant: DreamHammer Corporation, Dallas, TX (US)

(72) Inventors: Michael B. Leahy, Jr., San Diego, CA (US); Nelson Paez, San Diego, CA (US)

(73) Assignee: DreamHammer Corporation, Dallas, TX (US)

( * ) Notice: Subject to any disclaimer, the term of this patent is extended or adjusted under 35 U.S.C. 154(b) by 0 days.

(21) Appl. No.: 17/862,908

(22) Filed: Jul. 12, 2022

(65) Prior Publication Data

US 2023/0121659 A1    Apr. 20, 2023

Related U.S. Application Data

(63) Continuation of application No. 16/510,089, filed on Jul. 12, 2019, now Pat. No. 11,392,269.

(60) Provisional application No. 62/697,698, filed on Jul. 13, 2018.

(51) Int. Cl.
    G06F 3/0482      (2013.01)
    G06F 3/04847     (2022.01)
    G09B 29/00       (2006.01)

(52) U.S. Cl.
    CPC ........ *G06F 3/0482* (2013.01); *G06F 3/04847* (2013.01); *G09B 29/003* (2013.01)

(58) Field of Classification Search
    None
    See application file for complete search history.

(56) References Cited

U.S. PATENT DOCUMENTS

| | | | | |
|---|---|---|---|---|
| 8,204,692 B2* | 6/2012 | Arango | ................ | E21B 41/00 |
| | | | | 702/9 |
| 8,725,607 B2* | 5/2014 | Dunn | ................. | G06Q 20/02 |
| | | | | 705/38 |
| 8,909,264 B1* | 12/2014 | Higuchi | ............... | H04W 4/00 |
| | | | | 455/456.3 |
| 9,460,175 B1* | 10/2016 | Hong | ............... | G06F 3/04842 |
| 10,109,094 B2* | 10/2018 | Hong | .................. | G06T 11/60 |
| 11,392,269 B2* | 7/2022 | Leahy, Jr. | ........... | G09B 29/003 |
| 2004/0117358 A1* | 6/2004 | von Kaenel | ........ | G06Q 40/08 |
| 2007/0226314 A1* | 9/2007 | Eick | .................. | G06F 16/986 |
| | | | | 709/217 |

(Continued)

OTHER PUBLICATIONS

Haklay et al. (Oct. 2008). "OpenStreetMap: User-Generated Street Maps," IEEE Pervasive Computing 7(4): 12-18.

(Continued)

*Primary Examiner* — Haimei Jiang

(57) ABSTRACT

Described are methods, systems, and techniques to implement an improved map interface that displays updatable geographic information and that enables users to request one or more data products for a geospatial asset corresponding to a region of a geographic area. In some embodiments, a GIS application can be configured to interface with third party geospatial data suppliers that provide different types of data products displayable in the map interface. One or more of these data products can be requested by the user and may be associated with a recurring time interval to provide the user with expanded display views that are up to date and complete.

17 Claims, 49 Drawing Sheets

(56) References Cited

U.S. PATENT DOCUMENTS

| | | | |
|---|---|---|---|
| 2008/0221984 A1* | 9/2008 | Abhyanker | G06Q 30/0239 705/14.35 |
| 2008/0268876 A1* | 10/2008 | Gelfand | H04W 4/02 455/457 |
| 2009/0089254 A1* | 4/2009 | Von Kaenel | G06F 16/00 |
| 2012/0089920 A1* | 4/2012 | Eick | G06T 11/206 715/739 |
| 2013/0027227 A1* | 1/2013 | Nordstrom | G01C 21/3438 340/990 |
| 2013/0091452 A1* | 4/2013 | Sorden | G06F 30/20 715/771 |
| 2013/0298189 A1* | 11/2013 | Marshall | G06F 21/629 726/1 |
| 2013/0339140 A1* | 12/2013 | Pokorny | G06Q 30/0242 705/14.49 |
| 2014/0006129 A1* | 1/2014 | Heath | G06Q 30/02 705/14.23 |
| 2014/0266708 A1* | 9/2014 | Warren | G08B 21/0275 340/539.13 |
| 2014/0324630 A1* | 10/2014 | Golden | G06Q 30/0623 705/26.61 |
| 2015/0081212 A1* | 3/2015 | Mitchell | H04W 4/022 701/454 |
| 2015/0112647 A1* | 4/2015 | Currin | H04L 67/10 703/1 |
| 2016/0202227 A1* | 7/2016 | Mathur | A01B 79/005 702/2 |
| 2017/0140478 A1* | 5/2017 | Freeman | G01S 19/14 |
| 2018/0017710 A1* | 1/2018 | Beck | G01V 20/00 |
| 2021/0314757 A1* | 10/2021 | Pellegrini | H04W 4/90 |

OTHER PUBLICATIONS

International Preliminary Report on Patentability dated Jan. 19, 2021, directed to PCT/US2019/041668; 12 pages.

International Search Report and Written Opinion mailed Nov. 25, 2019, directed to International Application No. PCT/US2019/041668; 19 pages.

Invitation to Pay Additional Fees mailed Sep. 30, 2019, directed to International Application No. PCT/US2019/041668; 17 pages.

Leahy Jr. et al., U.S. Office Action dated Jul. 15, 2021 directed to U.S. Appl. No. 16/510,089; 16 pages.

Leahy Jr. et al., U.S. Office Action dated Jun. 26, 2020 directed to U.S. Appl. No. 16/510,089; 18 pages.

Leahy Jr. et al., U.S. Office Action dated Dec. 8, 2020 directed to U.S. Appl. No. 16/510,089; 16 pages.

* cited by examiner

FIG. 7A

Ai PRIME | CLOUD *Beta*

Search all by name...

Company name

Asset types

Data Products

Operational Regions

☐ Created after  ▸   ☐ Created before ▸

Status
Open, Processing                                   Clear

704

---

Show work orders on map | Download report | PDF | CSV

Drone Global Network
@Drone Global Network

Limit
10

| Id | Asset/Subarea Name | Type | Company/Subscription | Status | Created | Actions |
|---|---|---|---|---|---|---|
| ▸ 491 | Midstream Pad 39 A | Site | Portal Testing | Open | 2018-03-15 | ... |
| ▸ 490 | Corn Field | Field | Krzysztof Saja | Open | 2018-03-12 | ... |
| ▸ 489 | BV test | Area | DH Marketing | Open | 2018-02-22 | ... |
| ▸ 483 | Burger Land | Field | Krzysztof Saja | Open | 2018-02-19 | ... |
| ▸ 482 | Corn Field | Field | Krzysztof Saja | Open | 2018-02-19 | ... |
| ▸ 481 | Oil Pads Area | Area | Krzysztof Saja | Open | 2018-02-19 | ... |
| ▸ 480 | Burger Land | Field | DH Marketing | Open | 2018-02-15 | ... |
| ▸ 457 | Deb Demo | Oil Well | Demo Herb | Processing | 2018-02-15 | ... |
| ▸ 456 | Storage Tanks | Oil Well | Krzysztof Saja | Open | 2018-02-15 | ... |
| ▸ 454 | Burger Land | Field | Krzysztof Saja | Open | 2018-02-15 | ... |

179 total

FIG. 7B

Ai PRIME iCLOUD *Beta*

Search all by name...

Company name

Asset types — 708

Data Products — 710

Operational Regions

☐ Created after ▸   ☐ Created before ▸

Status
Open, Processing

Clear

⇦ Dashboard | ◈ Work Orders | ≈ Users | ✈ Fleet | ✦ Subscriptions

Show work orders on map | Download report: PDF | CSV

| Id | Asset/Subarea Name | Type | Company/Subscription | Status | Created | Actions |
|---|---|---|---|---|---|---|
| ▸ 491 | Midstream Pad 39-A | Site | Portal Testing | Open | 2018-03-15 | ⋯ |
| | User Info<br>Name: Portal Testing<br>Type: Primary Customer<br>Entity: Company | Asset Info<br>Name: Midstream Pad 39-A<br>Type: Site<br>Created: 2018-03-15 | Data Products<br>RGB  MS | | | ⊙ Show on map — 712<br>▦ Show schema — 714<br>⬇ Download schema — 716 |
| ▸ 490 | Corn Field | Field | Krzysztof Saja | Open | 2018-03-12 | ⋯ |
| ▸ 489 | BV test | Area | DH Marketing | Open | 2018-02-22 | ⋯ |
| ▸ 483 | Burger Land | Field | Krzysztof Saja | Open | 2018-02-19 | ⋯ |
| ▸ 482 | Corn Field | Field | Krzysztof Saja | Open | 2018-02-19 | ⋯ |
| ▸ 481 | Oil Pads Area | Area | Krzysztof Saja | Open | 2018-02-19 | ⋯ |
| ▸ 480 | Burger Land | Field | Krzysztof Saja | Open | 2018-02-19 | ⋯ |

Limit: 10

Drone Global Network
@Drone Global Network 700B
702B

US 12,340,066 B2

GEOSPATIAL ASSET MANAGEMENT

CROSS REFERENCE TO RELATED APPLICATIONS

This application is a continuation of U.S. application Ser. No. 16/510,089, filed Jul. 12, 2019, which claims the benefit of U.S. Provisional Application No. 62/697,698, filed Jul. 13, 2018, the entire contents of each of which is incorporated herein by reference.

FIELD OF THE DISCLOSURE

This disclosure relates generally to Geographic Information Systems (GIS) and, more specifically, to managing geospatial assets using the GIS.

BACKGROUND OF THE DISCLOSURE

Geographic Information Systems (GIS) applications, such as Google Maps™, today enable users to view geospatial information, e.g., satellite images of a geographic area, within a map interface. Many map interfaces enables a user to view the geographic area at various resolutions. Often, however, the geospatial information displayed by the map interfaces are many years outdated, and therefore does not include up-to-date information. Users have become accustomed to the possible inaccuracies in the geospatial information and utilize these map interfaces with the understanding that the displayed geospatial information may not be accurate.

Moreover, current map interfaces provide users with only limited views for geographical areas. For example, Google Maps™ enable users to view satellite images, a rendered Mercator map, a map with overlaid street traffic indicators, and street-view images. Further, because the geospatial information displayed by current map interfaces often include images captured by satellites, portions of the images may be obscured by atmospheric phenomena such as fog, clouds, light pollution, air pollution, smoke, volcanic ash, etc. Therefore, the current user experience for map applications can be inconsistent.

SUMMARY OF THE DISCLOSURE

As described above, current map interfaces often display geographic information that is outdated, limited, or incomplete. There is a need, therefore, for methods, systems, and techniques to implement an improved map interface that displays updatable geographic information and that enables users to request one or more data products for a geospatial asset corresponding to a region of a geographic area. In some embodiments, a GIS application can be configured to interface with third party geospatial data suppliers that provide different types of data products displayable in the map interface. One or more of these data products can be requested by the user and associated with a recurring time interval to provide the user with expanded display views that are up to date and complete.

In some embodiments, a method of managing geospatial assets includes: displaying, using a graphical user interface (GUI), a plurality of selectable geospatial assets that are associated with the user at a user device, the plurality of selectable geospatial assets including a geospatial asset that corresponds to a data structure storing first information defining boundaries of a region on a map and storing second information used to retrieve uploaded data products associated with the region; receiving a first input from the user using the GUI to select the geospatial asset from the plurality of selectable geospatial assets; displaying, using the GUI, the boundaries of the region on the map based on the first input to select the geospatial asset; displaying a plurality of data products available for the region; receiving a second input from the user using the GUI to select one or more data products from the plurality of data products; providing to a geospatial data supplier a data request including the one or more selected data products; and displaying, using the GUI, a status of the data request indicating whether any of the one or more data products has been uploaded by the geospatial data supplier.

In some embodiments, the method includes: receiving the one or more data products from the geospatial data supplier; and updating the second information to associate the one or more data products with the geospatial asset.

In some embodiments, the method includes: generating a link associated with the geospatial asset, and inputting the link in a web browser causes the web browser to display the boundaries of the region on the map.

In some embodiments, the method includes: receiving, from the user, a request to provide the link; and displaying the link using the GUI.

In some embodiments, the method includes: providing to the user an option to select a recurrence time interval for one or more of the selected data products.

In some embodiments, the recurrence interval includes a number of days, a number of weeks, or a number of months.

In some embodiments, where the geographical asset is configured based on a file uploaded by the user, the method includes: receiving, from the user, the file including geolocation data associated with one or more geofences; and configuring the first information storing the boundaries of the region based on the one or more geofences, where the one or more geofences enclose the region.

In some embodiments, the geolocation data includes Global Positioning System (GPS) coordinates.

In some embodiments, where the geographical asset is configured based on a user's input on the map, the method includes: receiving, on the map displayed using the GUI, a third input from the user that designates the boundaries of the region.

In some embodiments, the third input includes a marking based on a drawing line, a polygon, a rectangle, a circle, or a location pin.

In some embodiments, the plurality of data products includes an RGB image, a multi spectral (MS) image, a long wave infra-red (IR) image, or a digital elevation map (DEM).

In some embodiments, a system for managing geospatial assets includes: one or more processors; and a memory storing instructions that when executed by the one or more processors, cause the one or more processors to perform operations including: displaying, using a graphical user interface (GUI), a plurality of selectable geospatial assets that are associated with the user at a user device, the plurality of selectable geospatial assets including a geospatial asset that corresponds to a data structure storing first information defining boundaries of a region on a map and storing second information used to retrieve uploaded data products associated with the region; receiving a first input from the user using the GUI to select the geospatial asset from the plurality of selectable geospatial assets; displaying, using the GUI, the boundaries of the region on the map based on the first input to select the geospatial asset; displaying a plurality of data products available for the region; receiving a second input from the user using the GUI to select one or more data products from the plurality of data products; providing to a geospatial data supplier a data request including the one or more selected data products; and displaying, using the GUI, a status of the data request indicating whether any of the one or more data products has been uploaded by the geospatial data supplier.

In some embodiments, the operations include: receiving the one or more data products from the geospatial data supplier; and updating the second information to associate the one or more data products with the geospatial asset.

In some embodiments, the operations include: generating a link associated with the geospatial asset, and inputting the link in a web browser causes the web browser to display the boundaries of the region on the map.

In some embodiments, the operations include: receiving, from the user, a request to provide the link; and displaying the link using the GUI.

In some embodiments, the operations include: providing to the user an option to select a recurrence time interval for one or more of the selected data products.

In some embodiments, the recurrence interval includes a number of days, a number of weeks, or a number of months.

In some embodiments, the geographical asset is configured based on a file uploaded by the user, and the operations include: receiving, from the user, the file including geolocation data associated with one or more geofences; configuring the first information storing the boundaries of the region based on the one or more geofences, where the one or more geofences enclose the region.

In some embodiments, the geolocation data includes Global Positioning System (GPS) coordinates.

In some embodiments, the geographical asset is configured based on a user's input on the map, and the operations include: receiving, on the map displayed using the GUI, a third input from the user that designates the boundaries of the region.

In some embodiments, the third input includes a marking based on a drawing line, a polygon, a rectangle, a circle, or a location pin.

In some embodiments, the plurality of data products include an RGB image, a multi spectral (MS) image, a long wave infra-red (IR) image, or a digital elevation map (DEM).

In some embodiments, a non-transitory computer-readable storage medium includes instructions for managing geospatial assets, and the instructions, when executed by one or more processors, cause the one or more processors to perform instructions including: displaying, using a graphical user interface (GUI), a plurality of selectable geospatial assets that are associated with the user at a user device, the plurality of selectable geospatial assets including a geospatial asset that corresponds to a data structure storing first information defining boundaries of a region on a map and storing second information used to retrieve uploaded data products associated with the region; receiving a first input from the user using the GUI to select the geospatial asset from the plurality of selectable geospatial assets; displaying, using the GUI, the boundaries of the region on the map based on the first input to select the geospatial asset; displaying a plurality of data products available for the region; receiving a second input from the user using the GUI to select one or more data products from the plurality of data products; providing to a geospatial data supplier a data request including the one or more selected data products; and displaying, using the GUI, a status of the data request indicating whether any of the one or more data products has been uploaded by the geospatial data supplier.

BRIEF DESCRIPTION OF THE FIGURES

The foregoing summary, as well as the following detailed description of embodiments, is better understood when read in conjunction with the appended drawings. For the purpose of illustrating the present disclosure, the drawings show example embodiments of the disclosure; the disclosure, however, is not limited to the specific methods and instrumentalities disclosed. In the drawings:

FIGS. 7A-G illustrate GUIs that show how the GIS application enables the requested one or more data products to be fulfilled by a geospatial data supplier, according to some embodiments;

DETAILED DESCRIPTION OF THE DISCLOSURE

Described herein are systems and methods for managing geospatial assets, according to some embodiments. In some embodiments, a GIS application can be configured to provide a GUI to the user to enable the user to configure one or more geospatial assets based on an input file or based on user markings on a map displayed by the GUI. In some embodiments, a geospatial asset corresponds to a data structure capable of storing first information defining boundaries of a region on the map and storing second information used to retrieve any uploaded data products associated with the region. The GIS application can be configured to interface with geospatial data suppliers to determine one or more data products that are available for the region based on the user's selection of the geospatial asset corresponding to the region. In some embodiments, the GIS application can generate a data request including one or more data products the user desires to obtain for the region. The GIS application may interface with the geospatial data suppliers to fulfill the user's data request. Upon receiving the one or more data products uploaded by the geospatial data suppliers, the GIS application can be configured to provide the one or more data products to the user.

Figure 1:
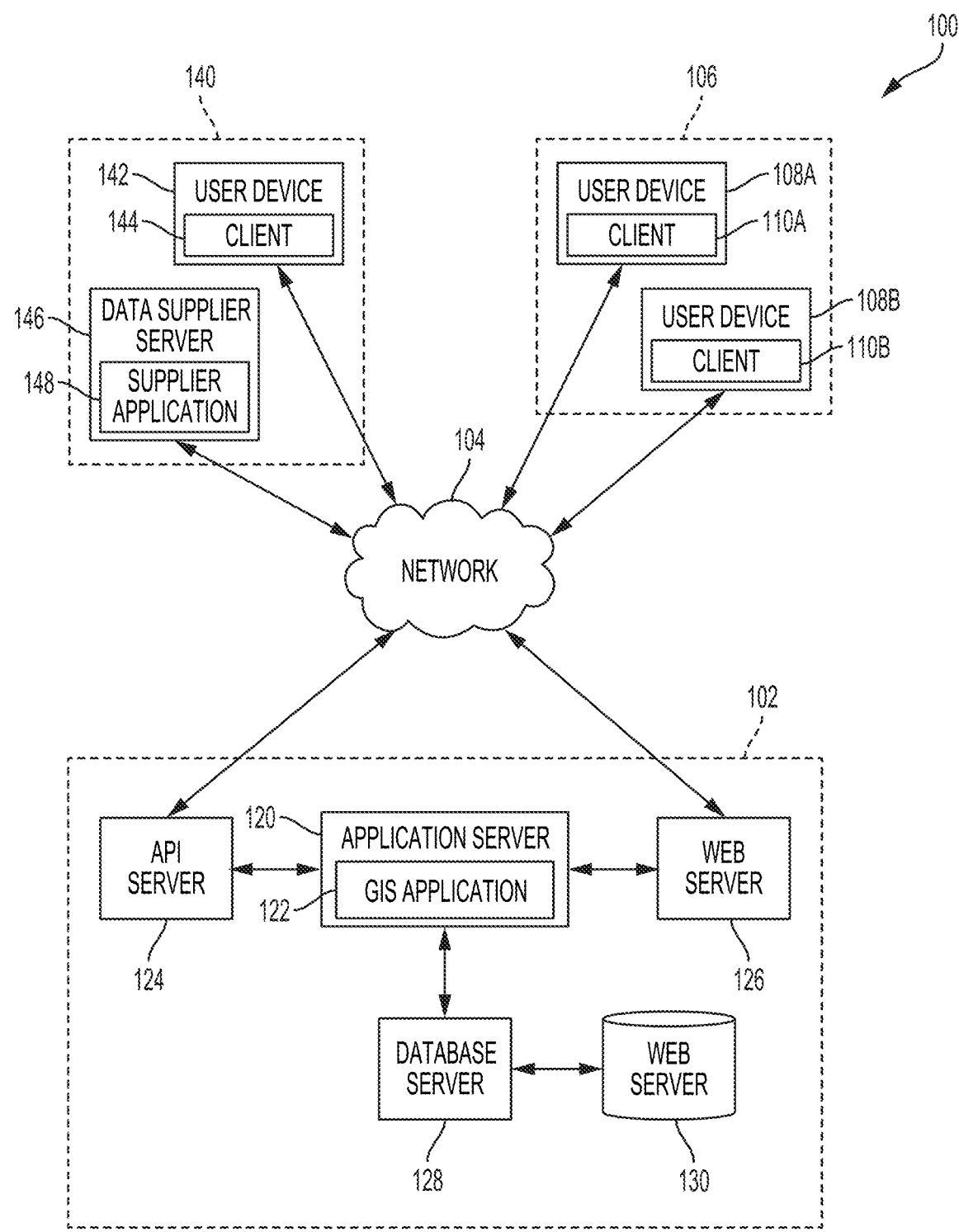
FIG. 1 illustrates a system for managing geospatial assets, according to some embodiments.

FIG. 1 illustrates a system 100 for managing geospatial assets, according to some embodiments. In some embodiments, the geospatial assets can be associated with a user and correspond to respective regions on a map that are of interest to the user, i.e., each region is an area of interest (AOI). In some embodiments, geospatial assets can correspond to data structures used to organize geospatial data stored in database 130. In some embodiments, a geospatial asset can correspond to a data structure storing: first information defining boundaries of a region on a map; and second information used to retrieve data products associated with the region. In some embodiments, the boundaries can be defined based on geolocation data. In some embodiments, the geolocation data includes one or more geofences that define the boundaries enclosing the region on the map. In some embodiments, a data product may be a type of graphical representation of the region. For example, the data product may include an RGB image, a multispectral (MS) image, a long wave infra-red (IR) image, a Digital Elevation Map (DEM) image, and the like.

System 100 includes a geospatial data management (GDM) system 102 configured to provide server-side functionality to geospatial data suppliers 140 and geospatial data consumers 106 via a network 104. In some embodiments, network 104 may include a Local Area Network (LAN), a Wide Area Network (WAN), the Internet, a Wi-Fi network, a WiMAX network, a cellular network (e.g., 3G, 4G, 4G Long Term Evolution (LTE)), or a combination thereof. Further, network 104 may implement one or more wired and/or wireless standards or protocols. In some embodiments, GDM system 102 can be configured to match the data requests of geospatial data consumers 106 in regards to geospatial assets with geospatial data suppliers 140 having the technical capability to obtain the requested data associated with the geospatial assets.

Geospatial data consumers 106 can access the functionality provided by GDM system 102 via clients 110A-B executing on user devices 108A-B, respectively. In some embodiments, user devices 108A-B includes devices capable of accessing network 104. For example, user devices 108A-B may include a desktop computer, a laptop, a tablet, a cellular telephone, a smartphone, a smartwatch, and the like. In some embodiments, clients 110A-B may include a web client (e.g., a web browser) or a client application that allows a user to interface with GIS application 122 of GDM system 102. For example, the user may operate client 110A to add a user-configurable geospatial asset, request data products associated with that geospatial asset, and retrieve the requested data products once supplied.

Data suppliers 140 can access the functionality provided by GDM 102 via client 144 or supplier application 148 executing on user device 142 and data-supplier server 146, respectively. In some embodiments, user device 142 and client 144 may correspond to the similarly named components of geospatial data consumer 106. In some embodiments, client 144 enables a user to interface with GIS application 122. For example, the user may operate client 144 to retrieve data requests associated with a geospatial asset, upload data products corresponding to the data requests, and verify a quality of the uploaded data products before fulfilling the data requests. In some embodiments, supplier application 148 can be configured to access GIS 122 through a programmatic interface provided by API server 124 of GDM system 102 and therefore does not require a web interface to interface with GIS application 122.

In some embodiments, GDM system 102 includes a Geographic Information System (GIS) application 122 executing on one or more application servers 120 and coupled to API server 124, web server 126, and database server 128. In some embodiments, application server 120 can be implemented on one or more virtual machines, servers, hardware appliance, general-purpose computers, or a combination thereof. In some embodiments, GIS application 122 can be configured to manage and access geospatial assets and related data products stored in database 130 via the coupling with database server 128. In some embodiments, GIS application 122 can be configured to interface with geospatial data suppliers 140 and geospatial data consumers 106 via API server 124 or web server 126. Web server 126 may enable users operating clients 110A-B and 144 to access the functionality of GIS application 122 in a web interface, e.g., through a web browser. API server 124 may provide users programmatic interfaces to access GIS application 122 without the need for the web interface.

Figure 2:
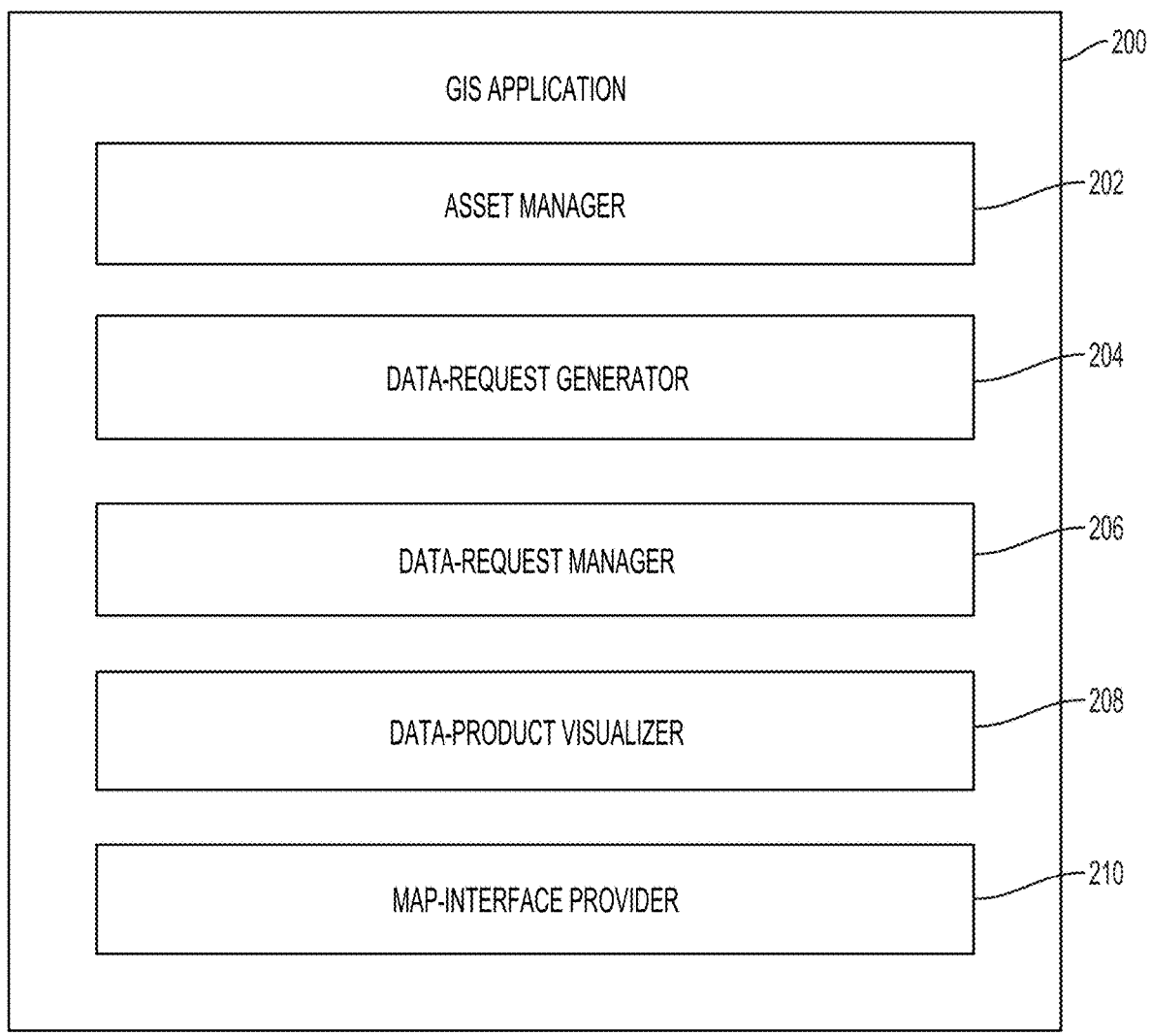
FIG. 2 illustrates components of a Geographic Information System (GIS) application for managing geospatial assets, according to some embodiments.

FIG. 2 illustrates components of a GIS application 200 (e.g., GIS application 122) for managing geospatial assets, according to some embodiments. In some embodiments, to enable geospatial asset management, GIS application 200 can be configured to include the following components: asset manager 202, data-request generator 204, data-request manager 206, data-product visualizer 208, and map-interface provider 210. Each of these components may represent a set of programming instructions stored in memory and executable by one or more processors.

Map-interface provider 210 can be configured to provide a client (e.g., clients 110A, 110B, and 144) with a graphical user interface (GUI) to access the functionality provided by one or more of asset manager 202, data-request generator 204, data-request manager 206, and data-product visualizer 208. In some embodiments, map-interface provider 210 can be configured to provide the GUI to a user's client to enable the user to manage geospatial assets in relation to a displayed map.

Asset manager 202 can be configured to enable a user to organize geospatial assets in a hierarchical file structure where one or more user-configurable geospatial assets can be stored within and associated with each other in a folder, as defined by a user. In some embodiments, asset manager 202 can enable the user to add a geospatial asset based on one or more geofences that define the boundaries of a region on a map. In some embodiments, asset manager 202 can enable a user to configure or request a data product subscription, as will be further described below with respect to FIGS. 12A-I.

In some embodiments, asset manager 202 can be configured to parse one or more geofences to generate the geospatial asset based on an input file uploaded by the user. In some embodiments, asset manager 202 can be configured to generate the one or more geofences to create the geospatial asset based on a user's input to mark the boundaries enclosing the region on a displayed map. For example, a drawing toolbar may be displayed in the GUI and enable the user to select drawing lines, circles, polygons, or rectangles, among other graphical objects to delineate the region.

In some embodiments, asset manager 202 can be configured to generate a link to the geospatial asset that enables other users to access data products and other information associated with the geospatial asset. For example, the link may be a web link that can be shared via email or text message and that can be accessed via, for example, a web browser. In another example, the link may be a Web Map Tile Service (WMTS) link that can be input into a GIS tool (e.g., ArcGis) to access the data analysis and visualization capabilities of the GIS tool in regards to the region (of the map) associated with the geospatial asset and the data products associated with the geospatial asset.

Data-request generator 204 can be configured to enable the user to request one or more data products associated with a selected geospatial asset. For example, the GUI displayed on client 110A may include a plurality of selectable geospatial assets, as generated by asset generator 202 described above. In some embodiments, the plurality of geospatial assets being displayed may be associated with a username or user credentials associated with the user. In some embodiments, upon receiving the user's selection of a geospatial asset, data-request generator 204 can be configured to display a plurality of available data products associated with the selected geospatial asset. In some embodiments, data-request generator 204 enables the user to select one or more of the data products as well as a recurrence time period for each of the data products. In some embodiments, data-request generator 204 can be configured to generate a data request to be fulfilled by one or more geospatial data suppliers (e.g., geospatial data suppliers 140) based on the one or more selected data products. As described above, a data product for a geospatial area may include, for example, an RGB image, a multispectral (MS) image, a long wave infra-red (IR) image, a Digital Elevation Map (DEM), etc.

Data-request manager 206 can be configured to manage the fulfillment of data requests from a user (e.g., geospatial data consumers 106) for one or more geospatial assets. In some embodiments, data-request manager 206 can be configured to enable a geospatial data supplier (e.g., geospatial data supplier 140) to provide one or more data products associated with a data request for a geospatial asset. For example, data-request manager 206 may enable the geospatial data supplier to upload a data product associated with the data request. In some embodiments, data-request manager 206 can implement a quality assurance mechanism to verify that the uploaded data product satisfies the data request before enabling the user (e.g., geospatial data consumers 106) access to the uploaded data product.

Data-product visualizer 208 can be configured to provide the user (e.g., geospatial data consumers 106) with one or more data products being specified in a data request generated by the user. In some embodiments, the GUI provided to the user may display a plurality of geospatial assets associated with that user. Data-product visualizer 208 may enable the user to view a processing status for each of the requested data products associated with a geospatial asset selected from the plurality of geospatial assets. In some embodiments, data-product visualizer 208 can be configured to enable the user to select a processed data product for display where the selected data product is displayed as a display layer on a map. In some embodiments, data-product visualizer 208 can be configured to enable the user to change a zoom level (e.g., zoom in or out) of the displayed data product. In some embodiments, data-product visualizer 208 provides an annotation mechanism that allows the user to create annotations for specific areas of interest of a region being visualized. For example, an annotation may be created directly on the displayed data product such that future display of the data product may include display of the annotation.

FIGS. 3-11 illustrate respective graphical user interfaces (GUIs) 300-1100 that show how GIS application 122 provides various functionalities to a user (e.g., geospatial data consumer 106) for managing or accessing the user's geospatial assets, according to some embodiments. In some embodiments, map-interface provider 210 of GIS application 200 (i.e., an example implementation of GIS application 122) can provide GUIs 300-1100 to the user via a client (e.g., client 110A-B or 144) of a user device (e.g., user devices 108A-B or 142) operated by the user. As discussed above with respect to FIG. 1, GUIs 300-1100 may be provided as a web interface to client 110A via web server 126. As described above, the client may be a web browser or a client application installed on a laptop or a mobile phone, etc. For ease of explanation, the various functionalities provided by GUIs 300-1100 and described below may be described with respect to the components of GIS application 200, as described with respect to FIG. 2.

Figure 3A:
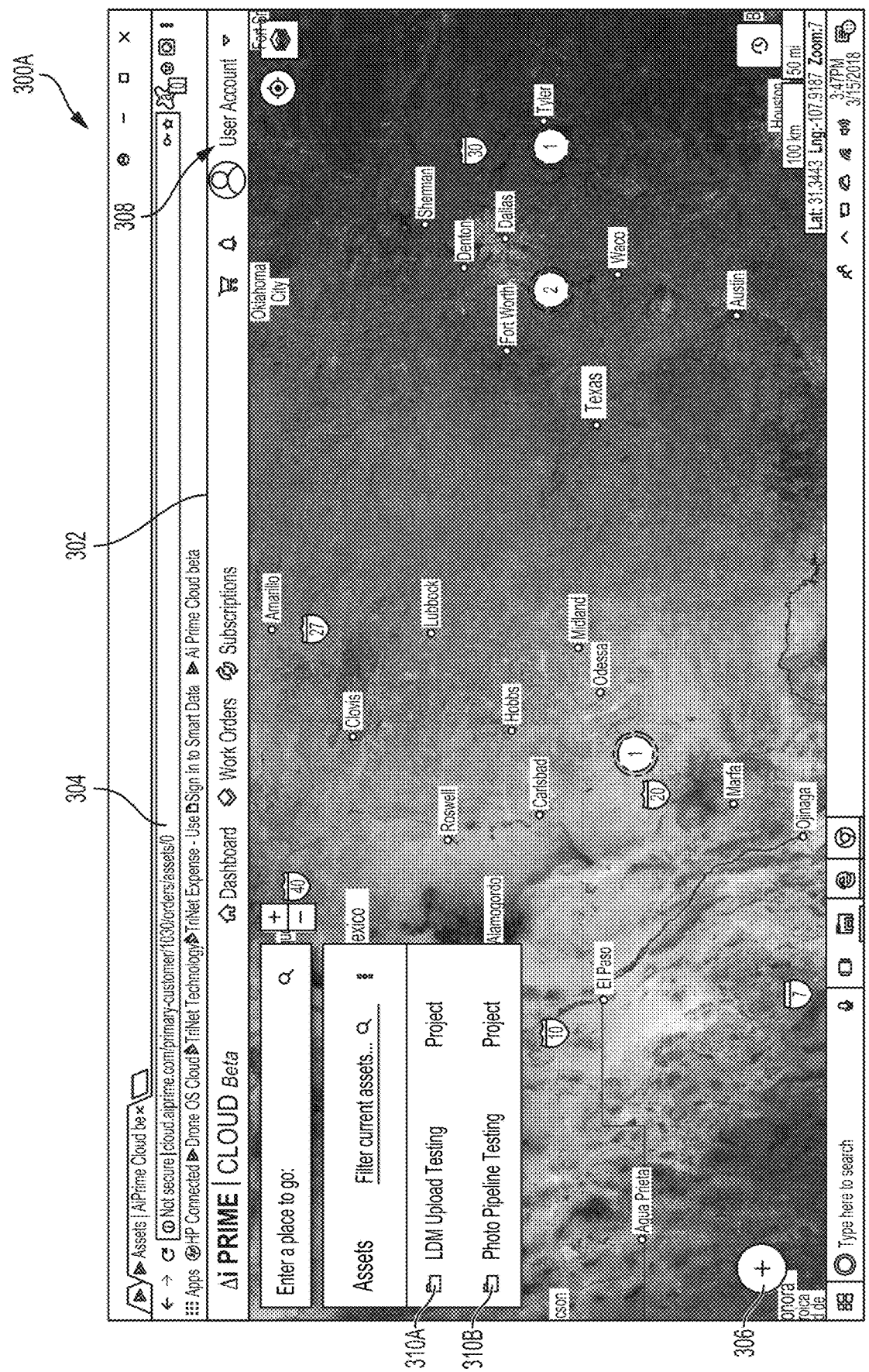
FIGS. 3A-C illustrate graphical user interfaces (GUIs) that show how the GIS application enables the user to manage geospatial assets associated with the user, according to some embodiments.
Figure 3B:
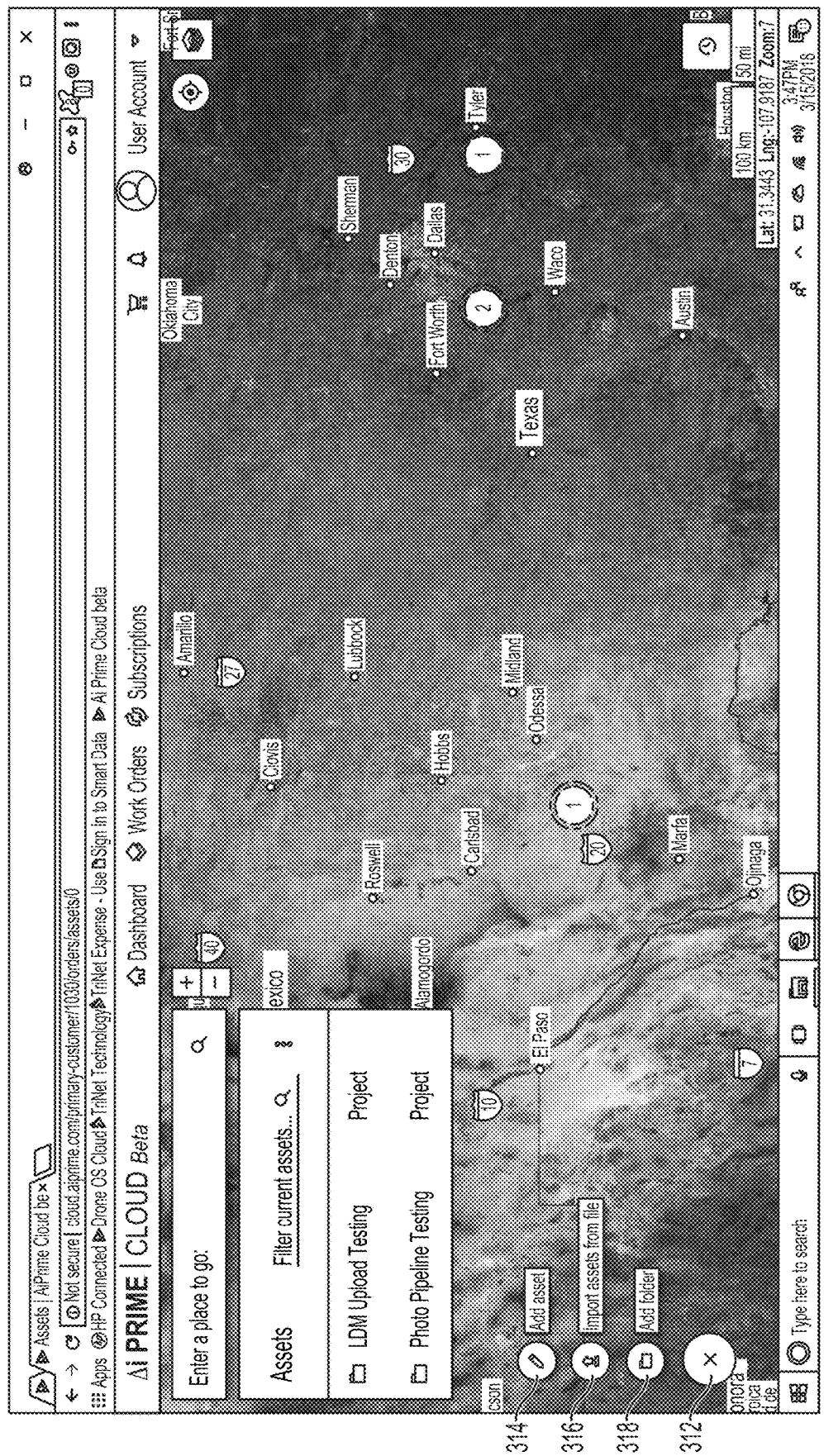
Figure 3C:
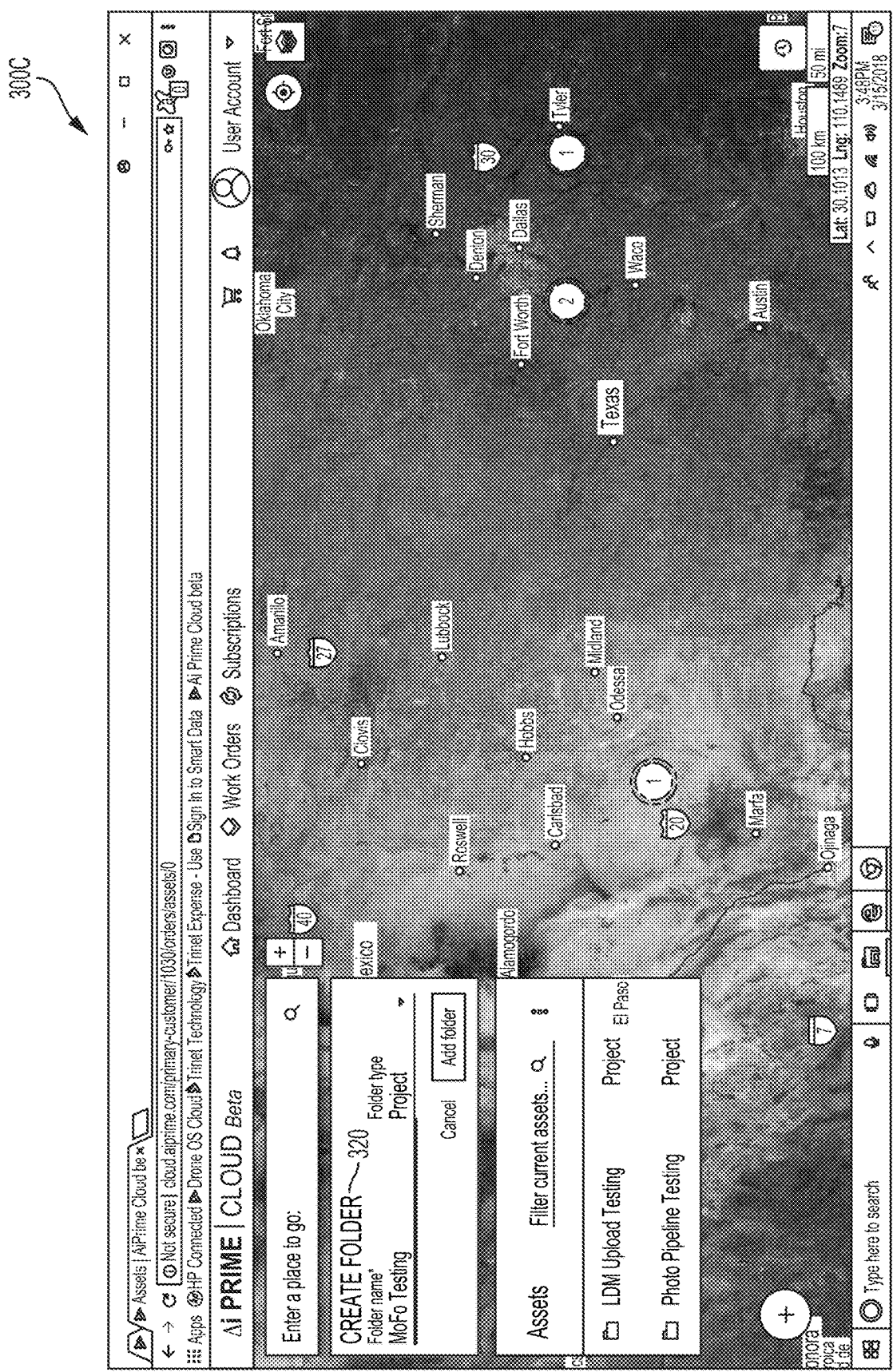
Figure 4A:
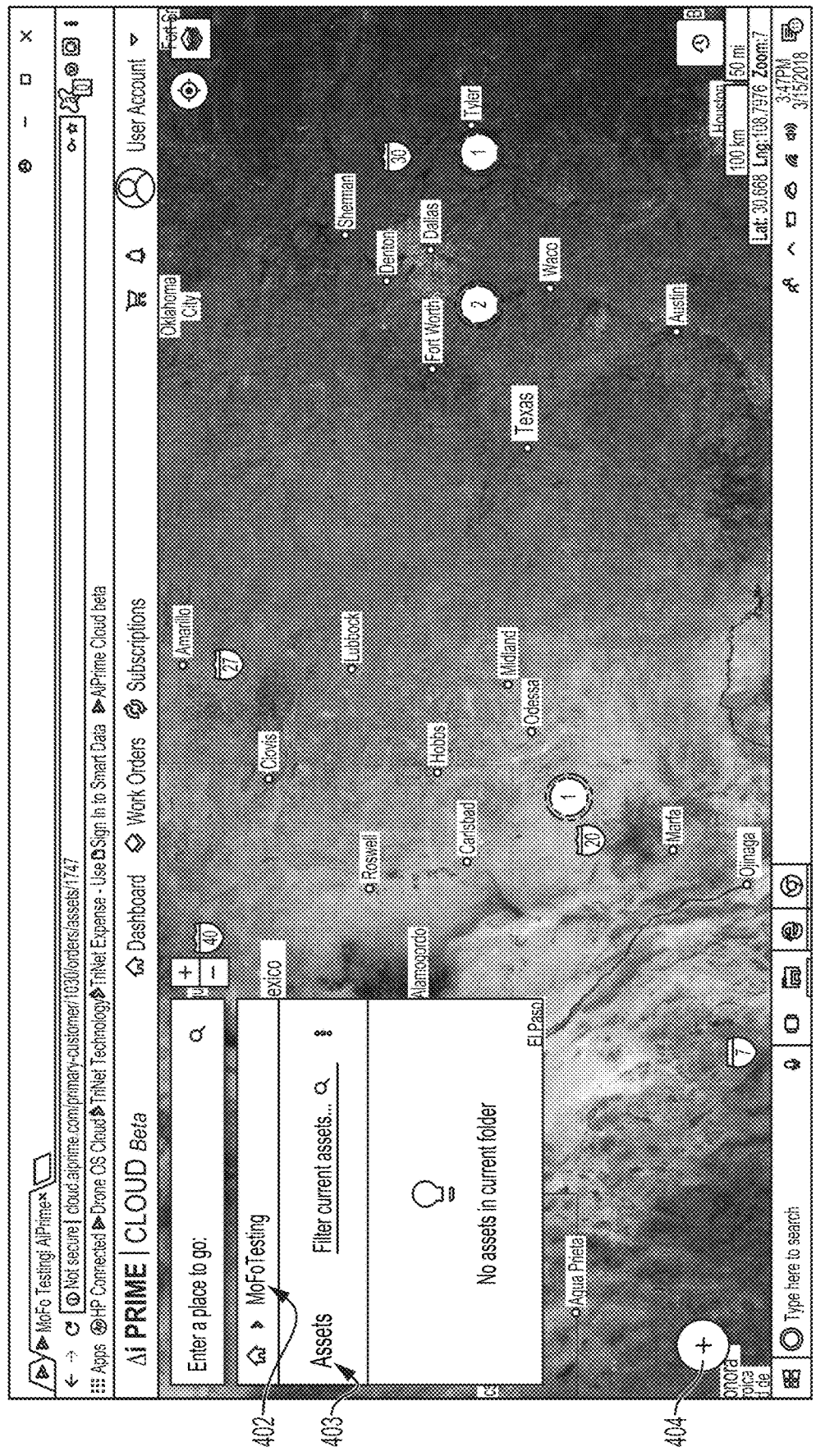
FIGS. 4A-D illustrate GUIs that show how the GIS application enables the user to configure a geospatial asset based on a file, according to some embodiments.
Figure 4B:
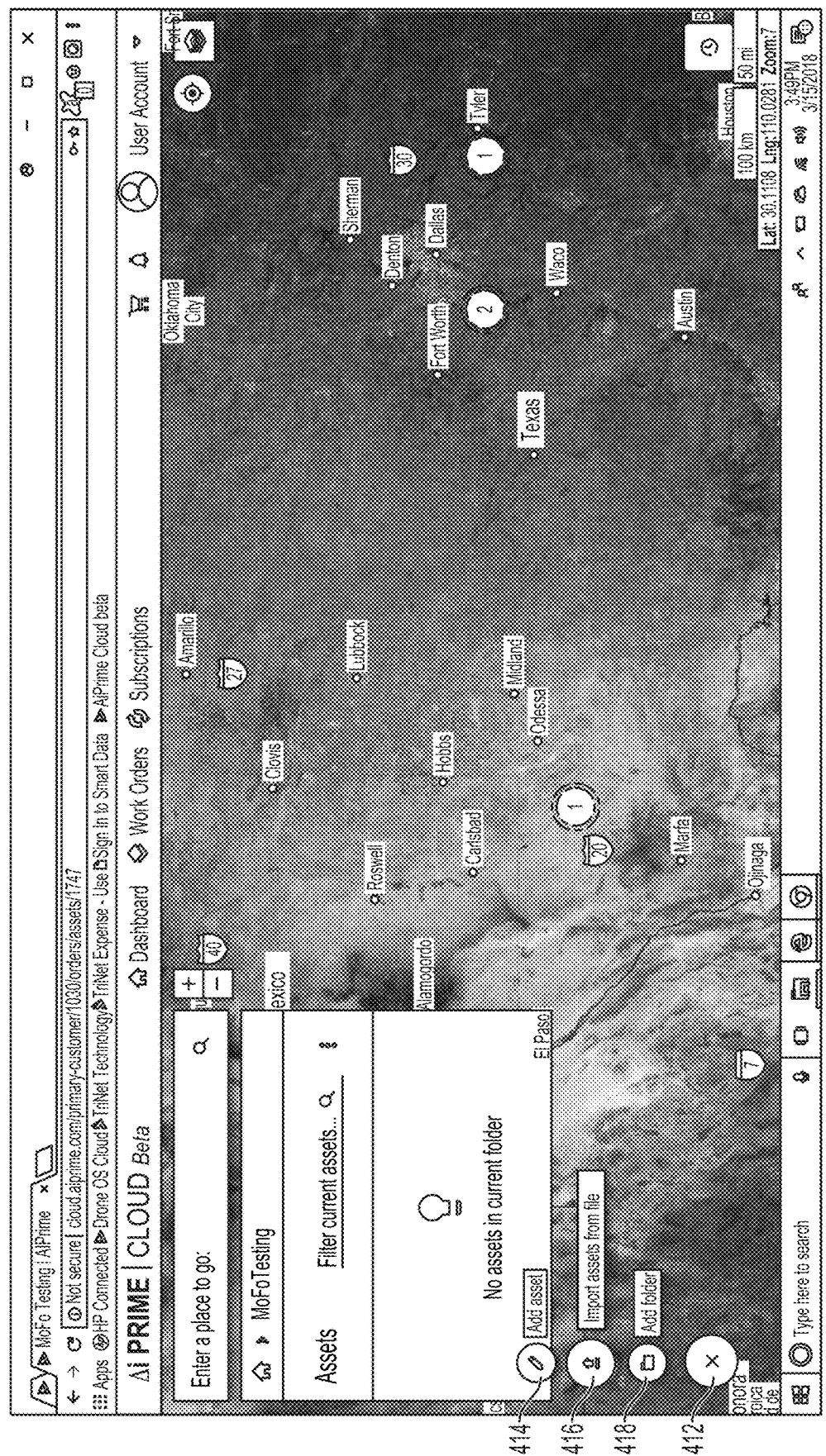
Figure 4C:
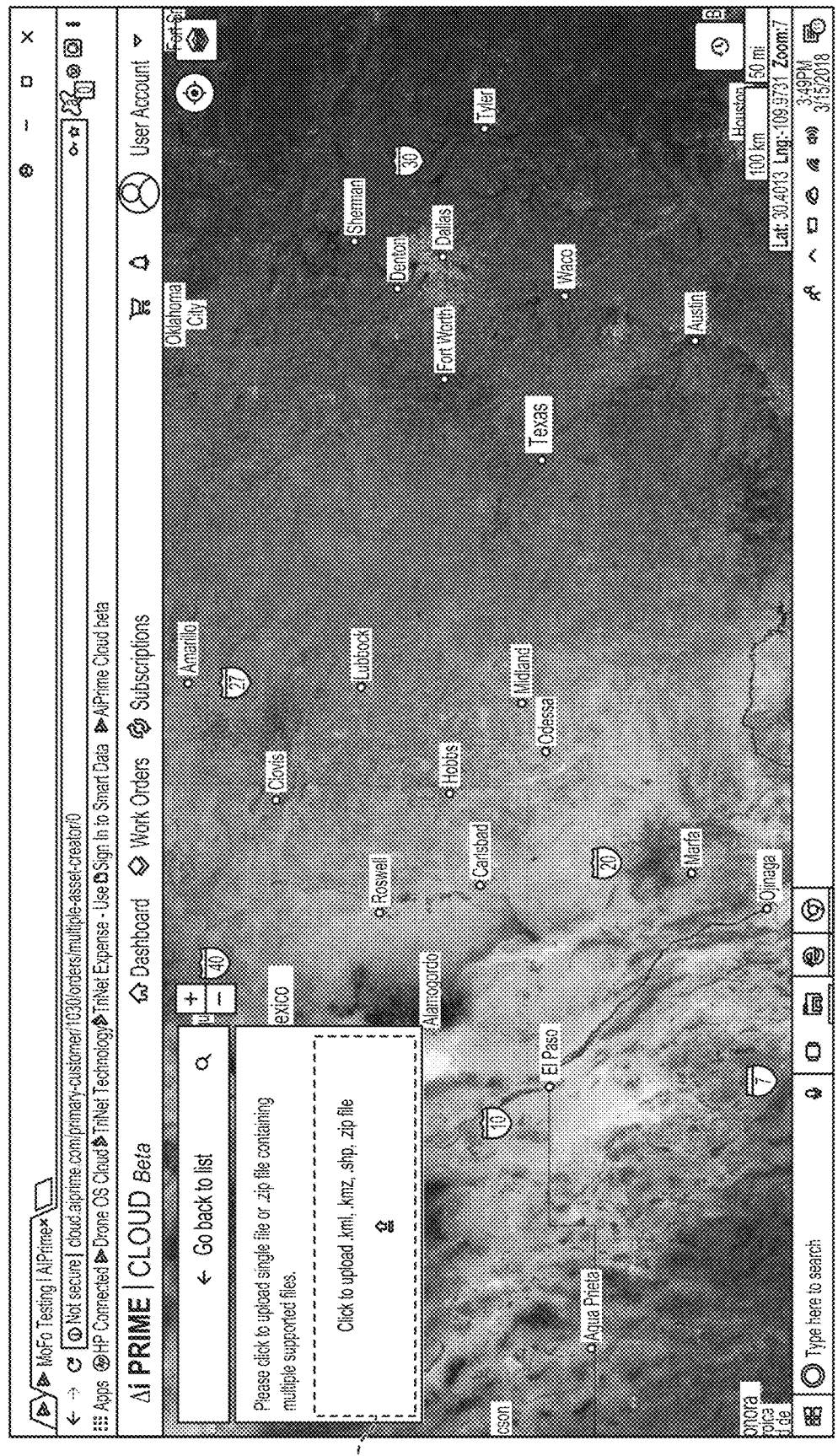
Figure 4D:
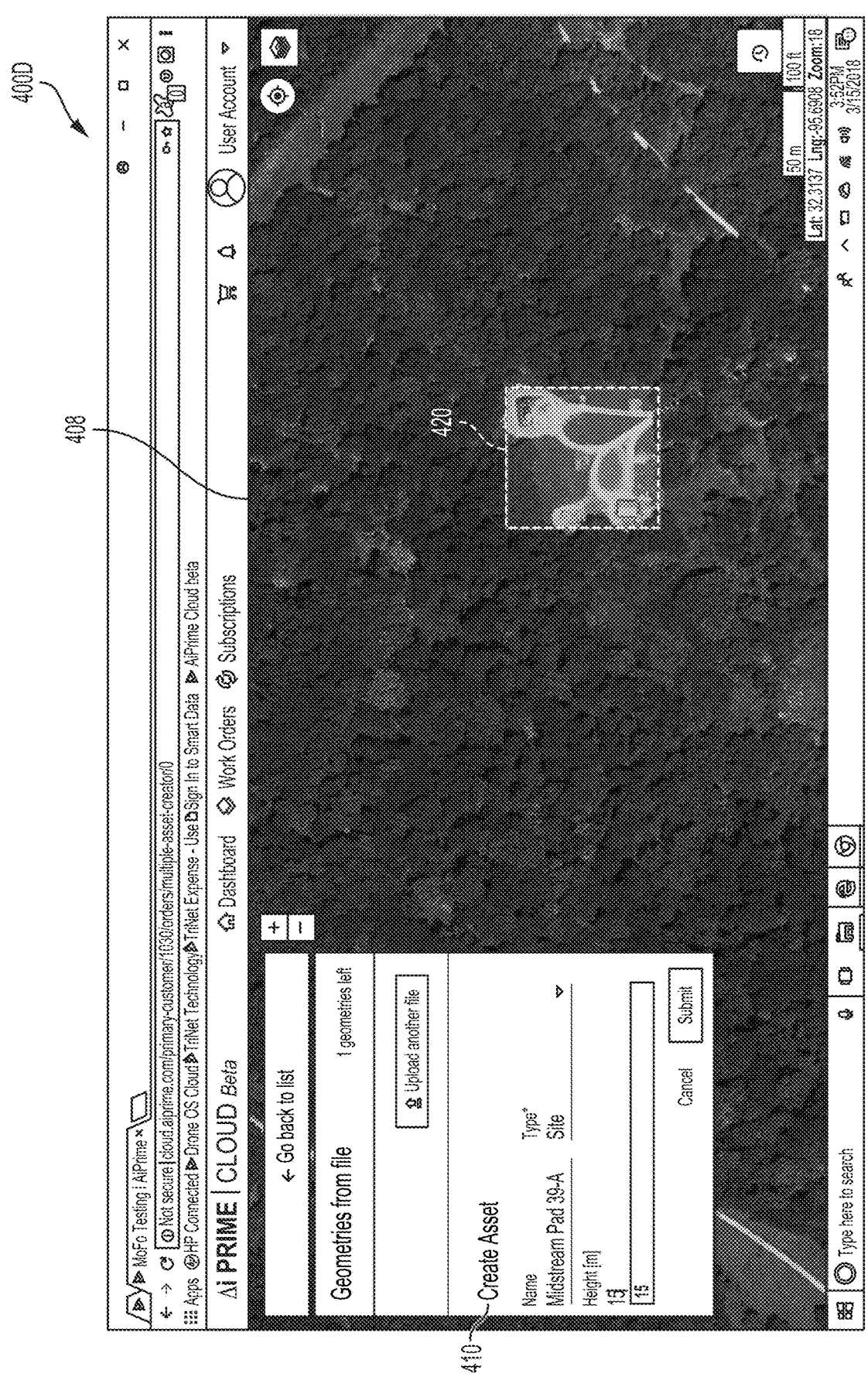
Figure 5A:
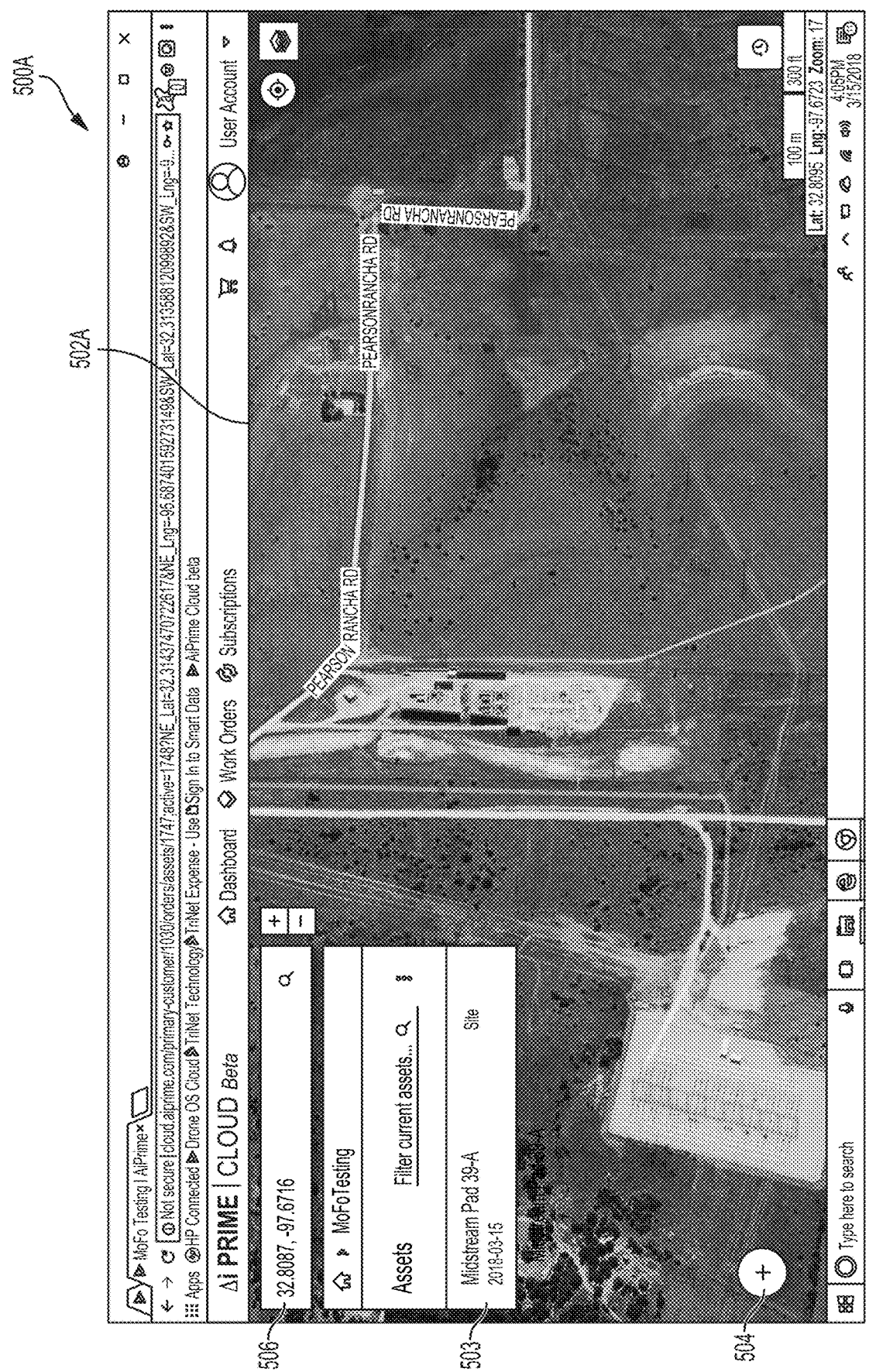
FIGS. 5A-D illustrate GUIs that show how the GIS application enables the user to configure the geospatial asset based on the user's input received on a map, according to some embodiments.
Figure 5B:
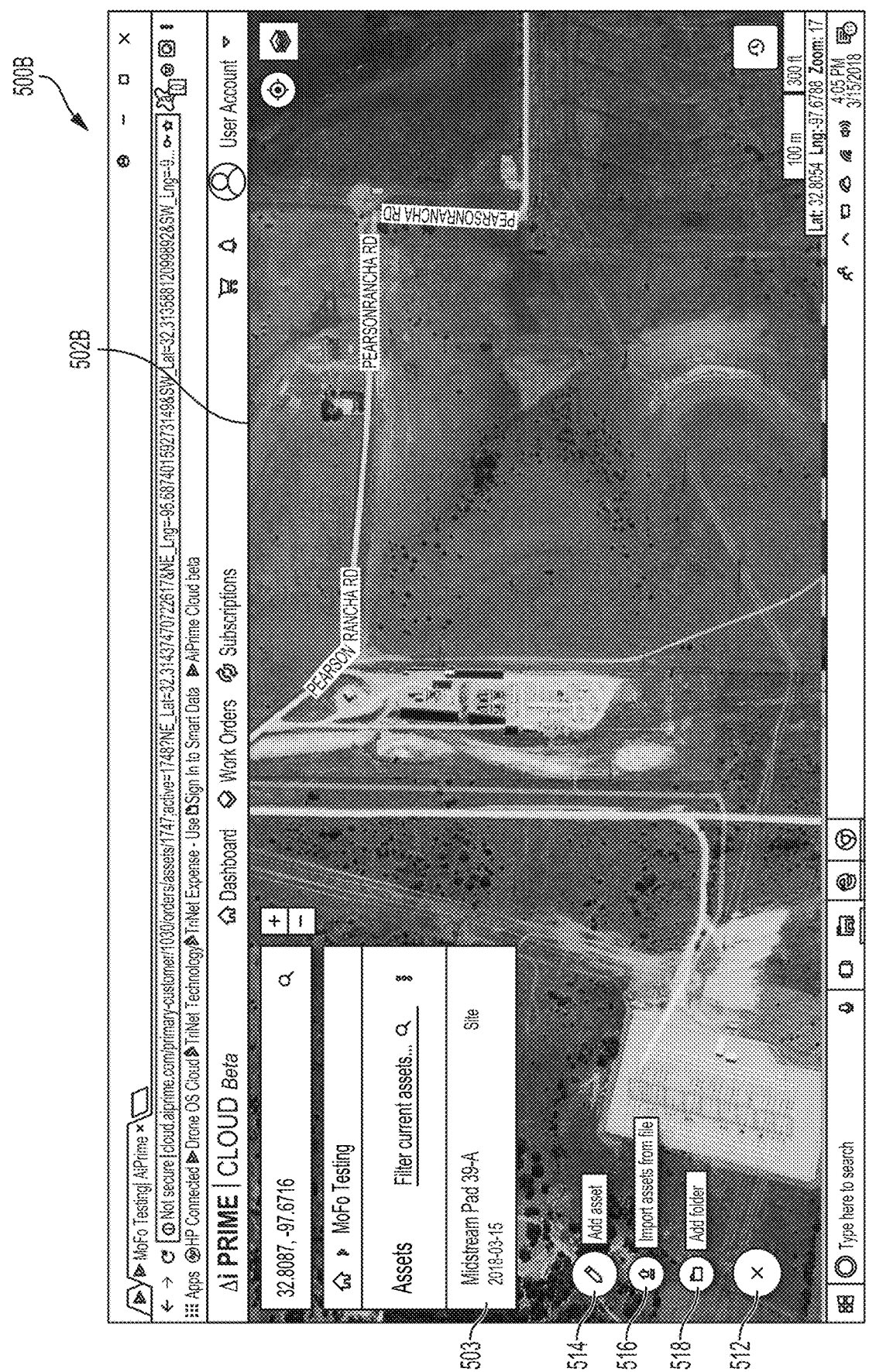
Figure 5C:
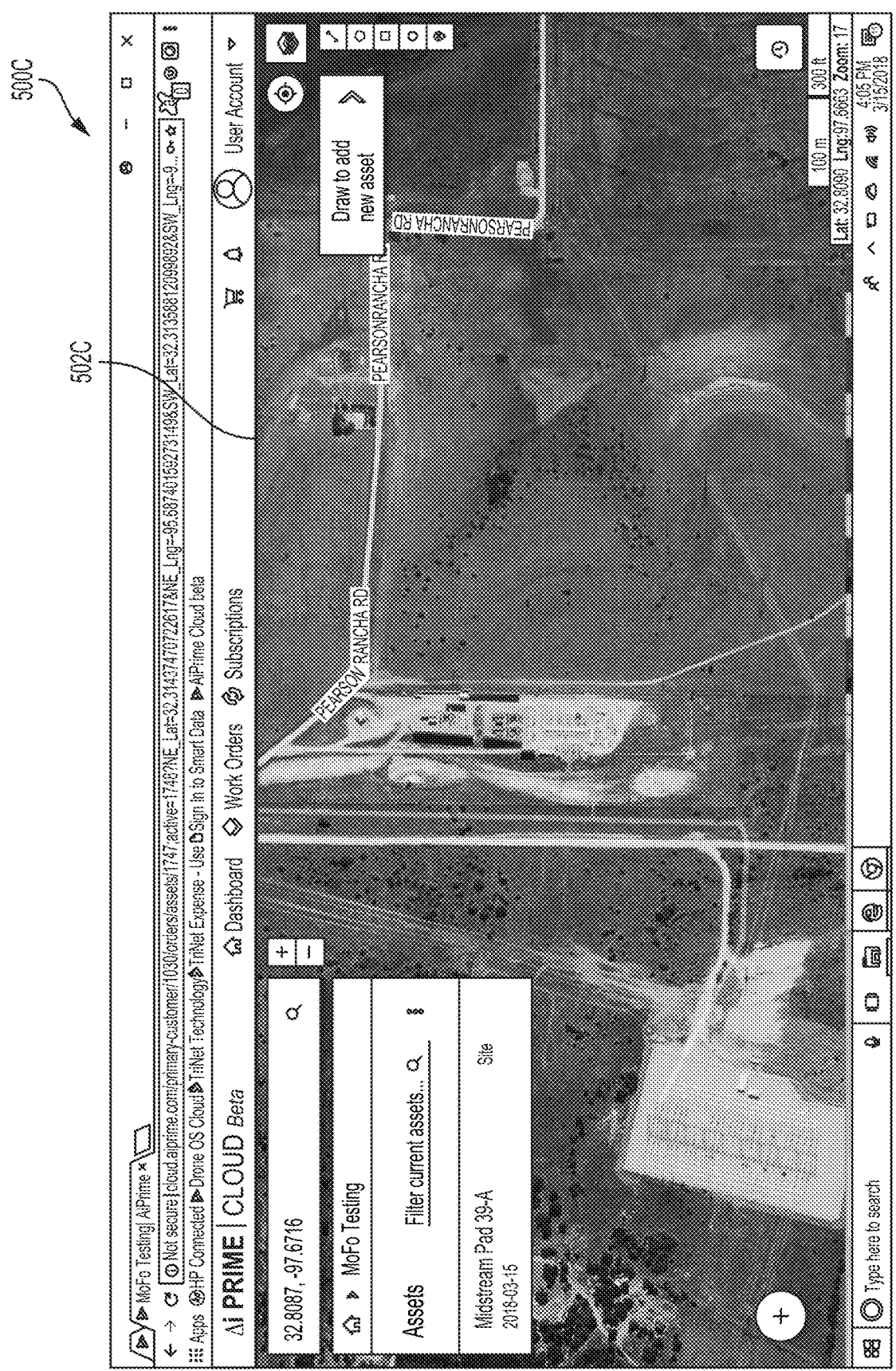
Figure 5D:
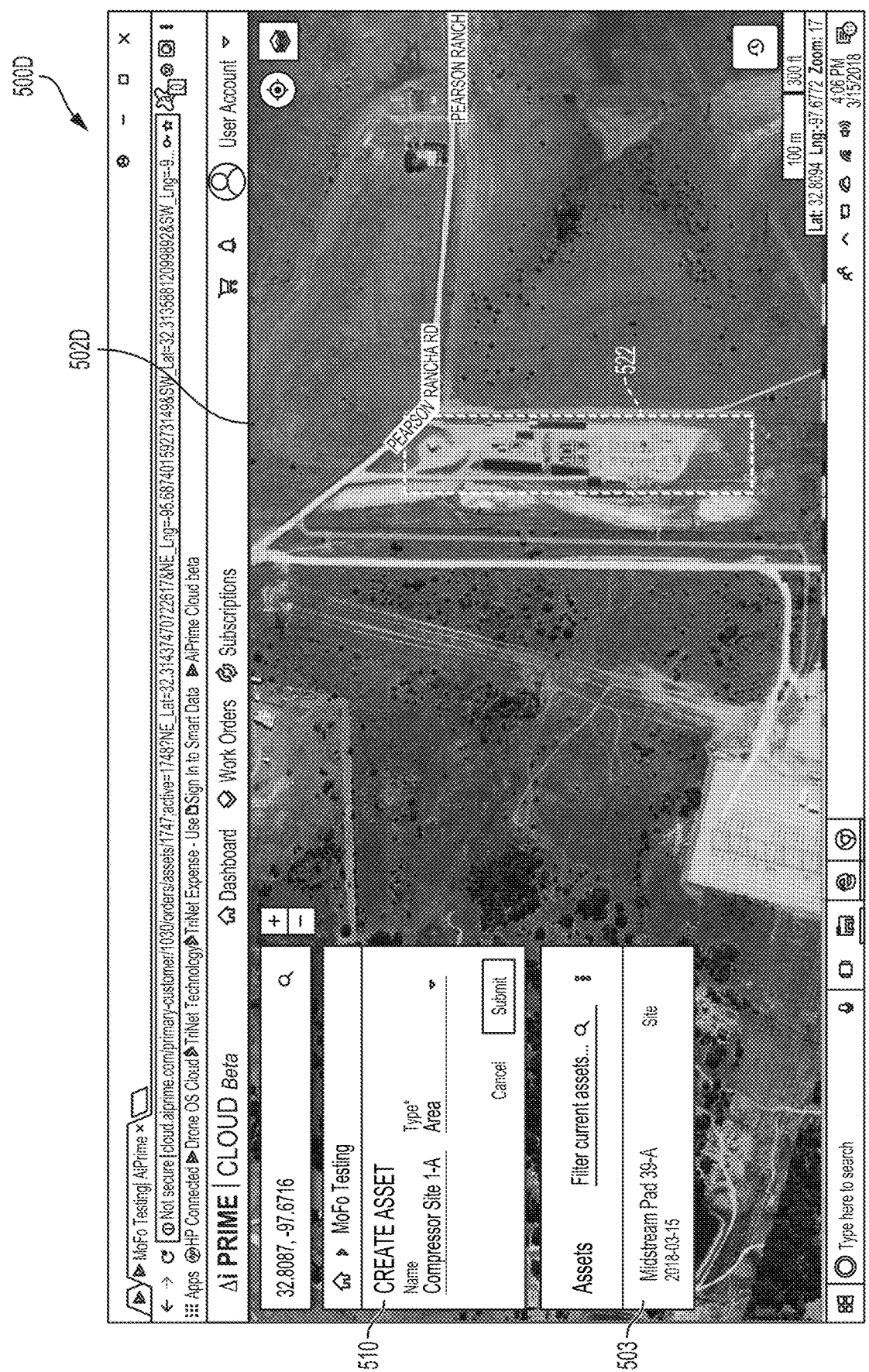
Figure 6A:
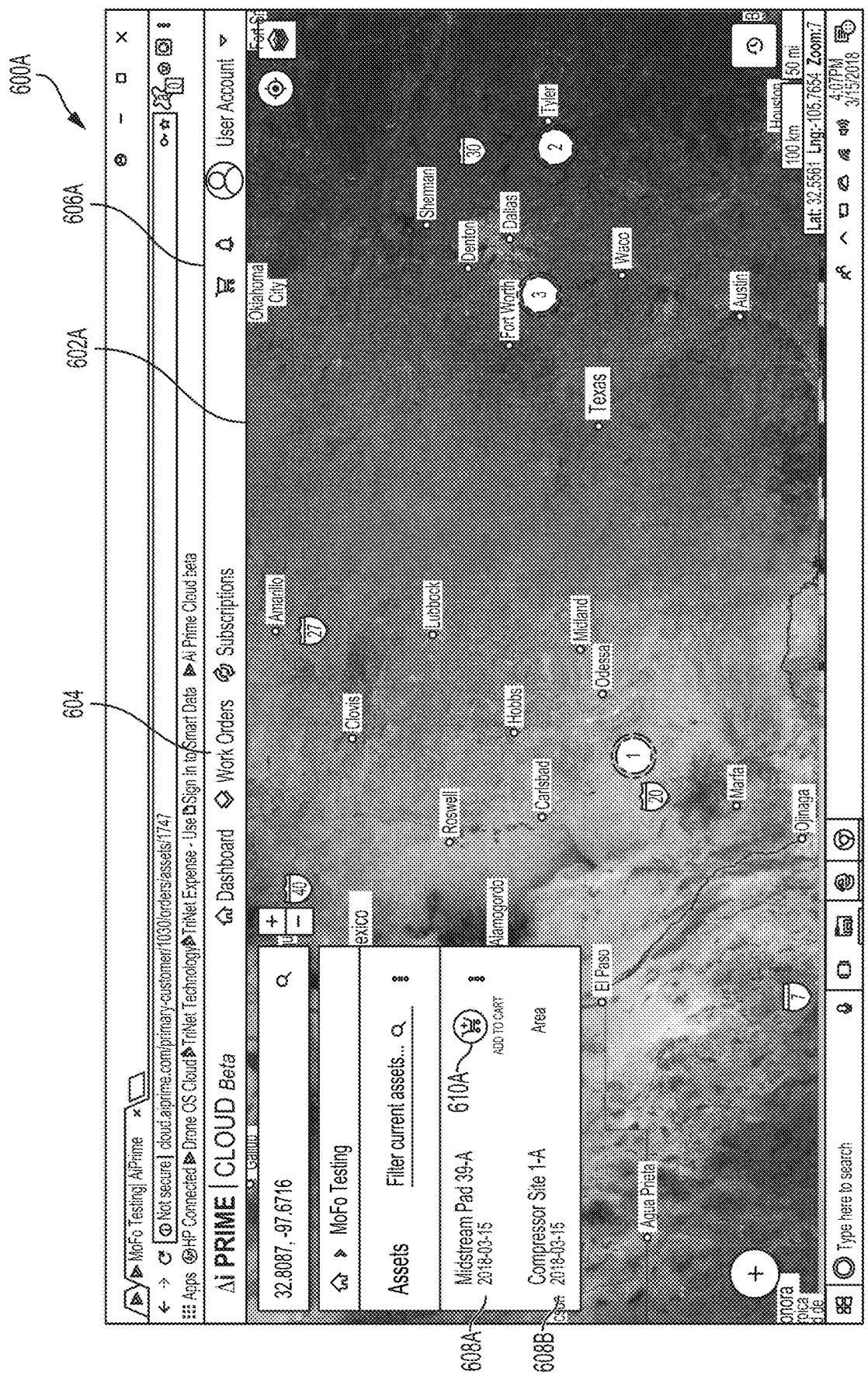
FIGS. 6A-E illustrate GUIs that show how the GIS application enables the user to request one or more data products associated with the geospatial asset, according to some embodiments.
Figure 6B:
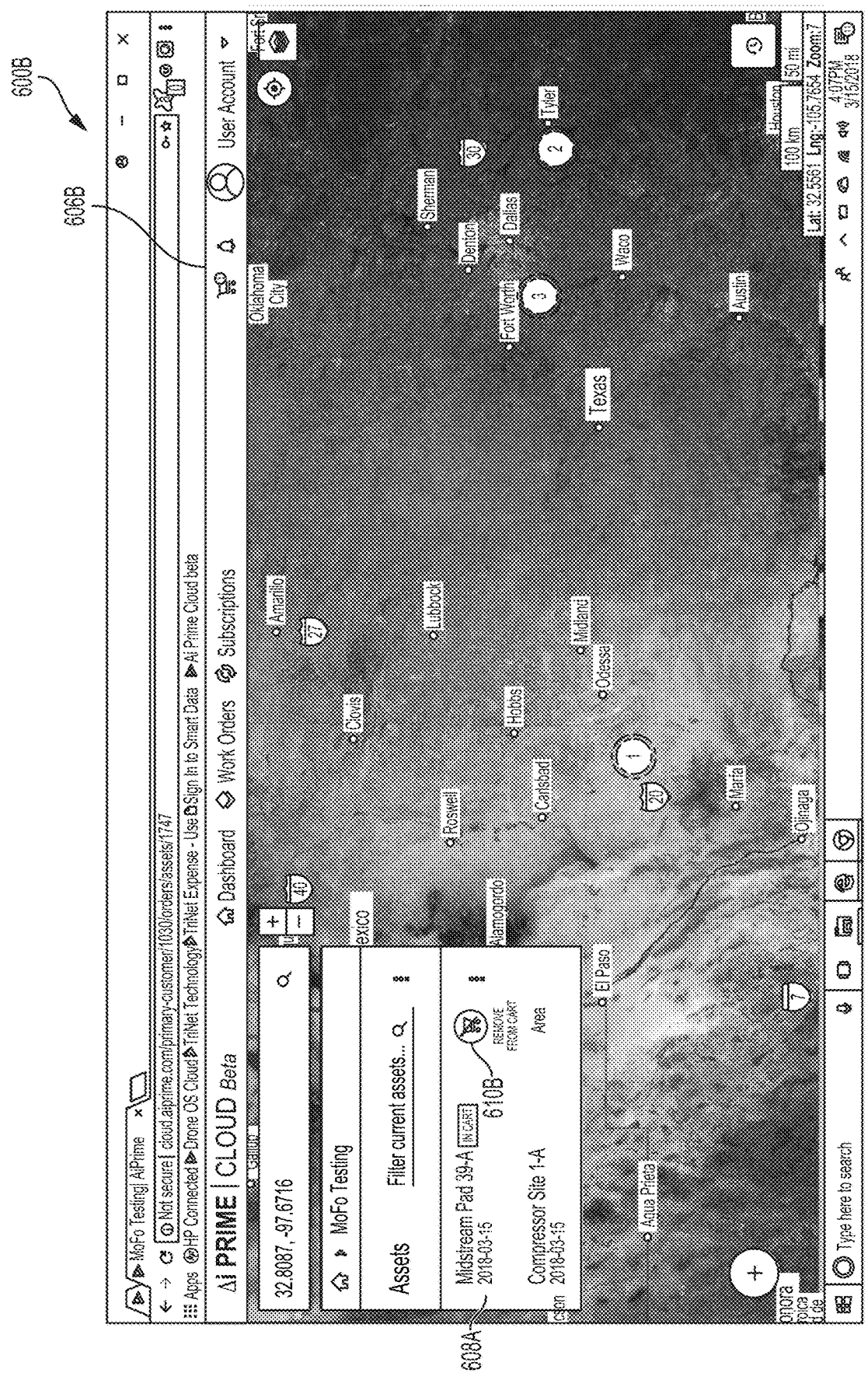
Figure 6C:
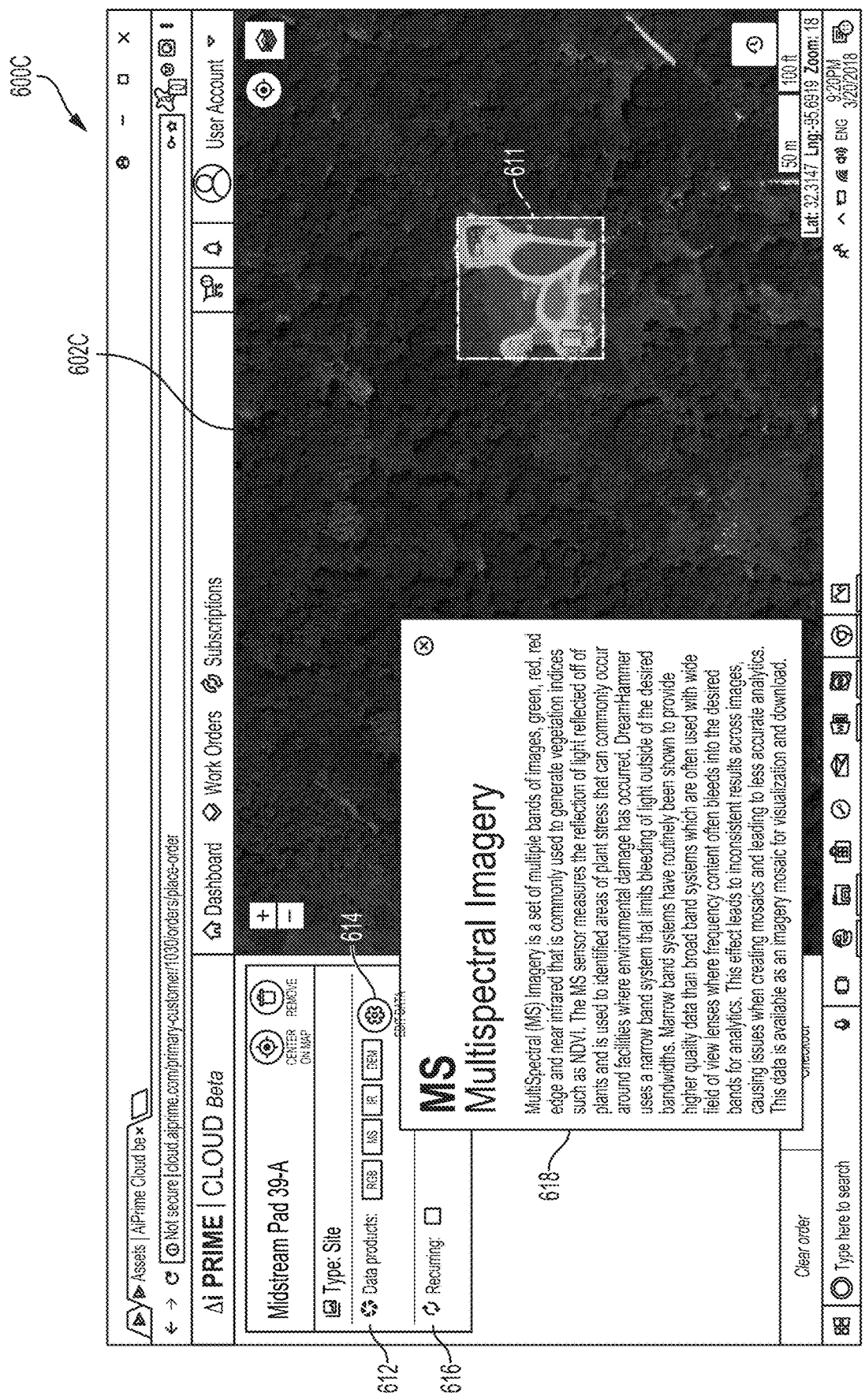
Figure 6D:
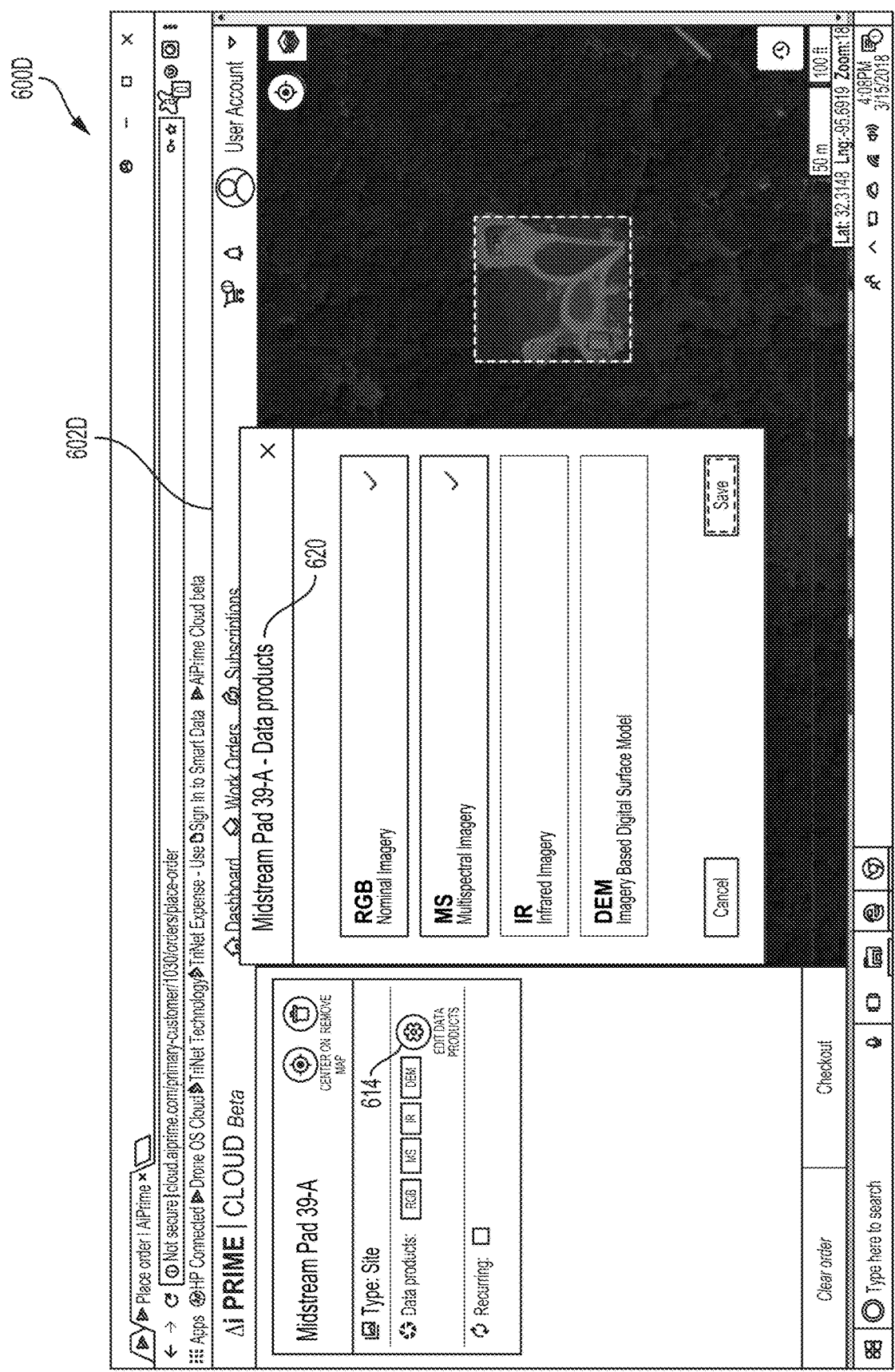
Figure 6E:
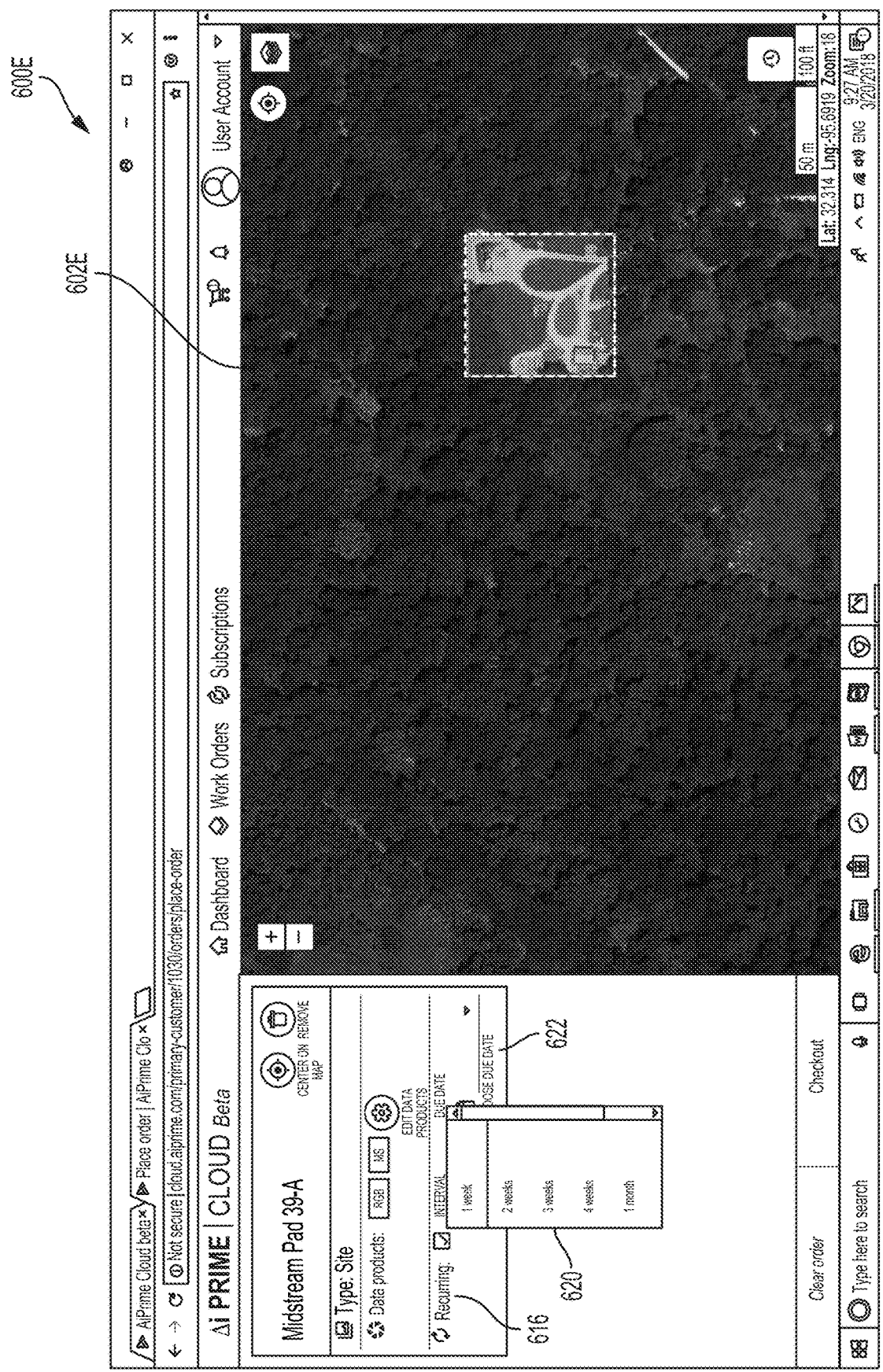
Figure 7C:
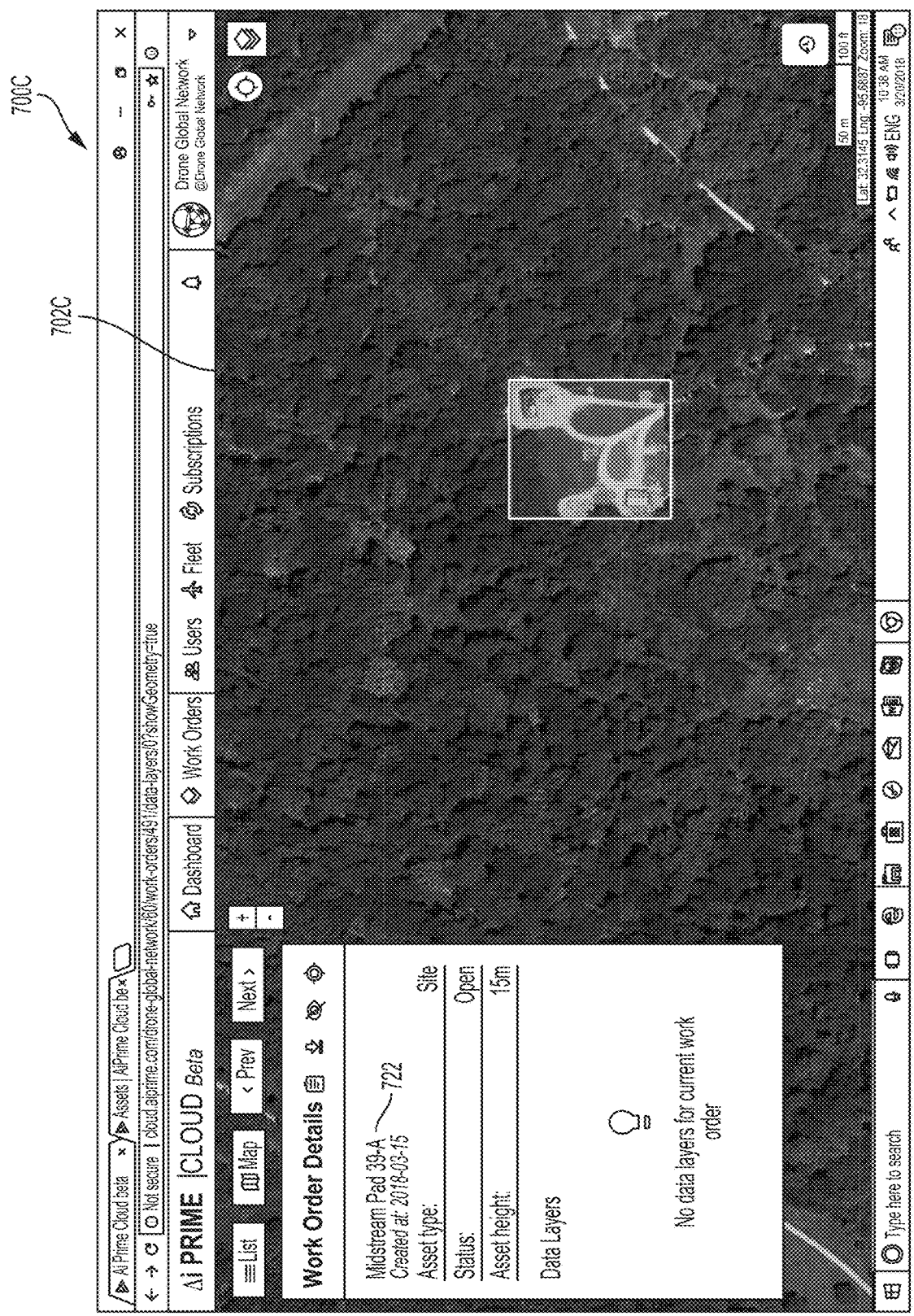
Figure 7D:
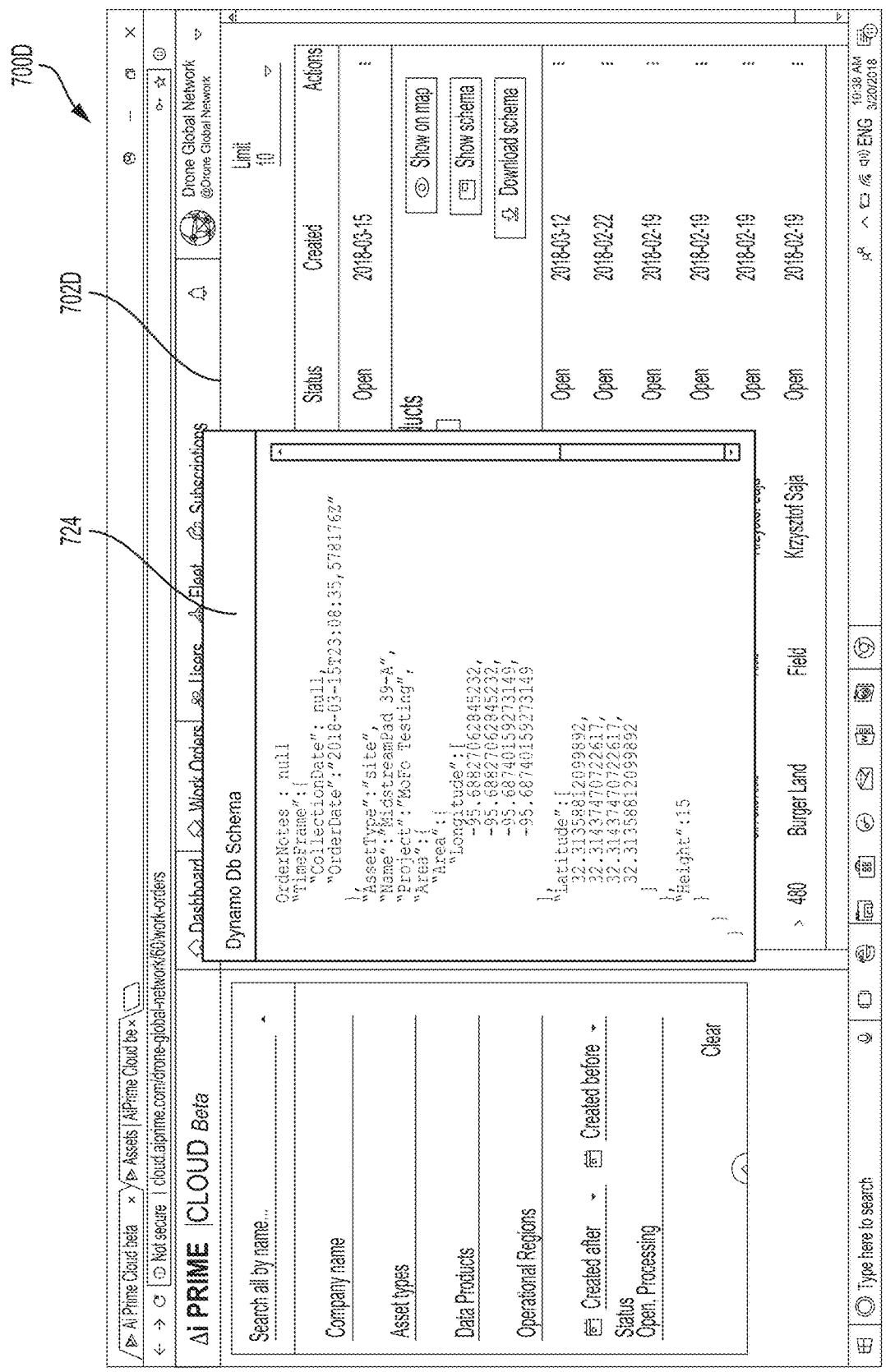
Figure 7E:
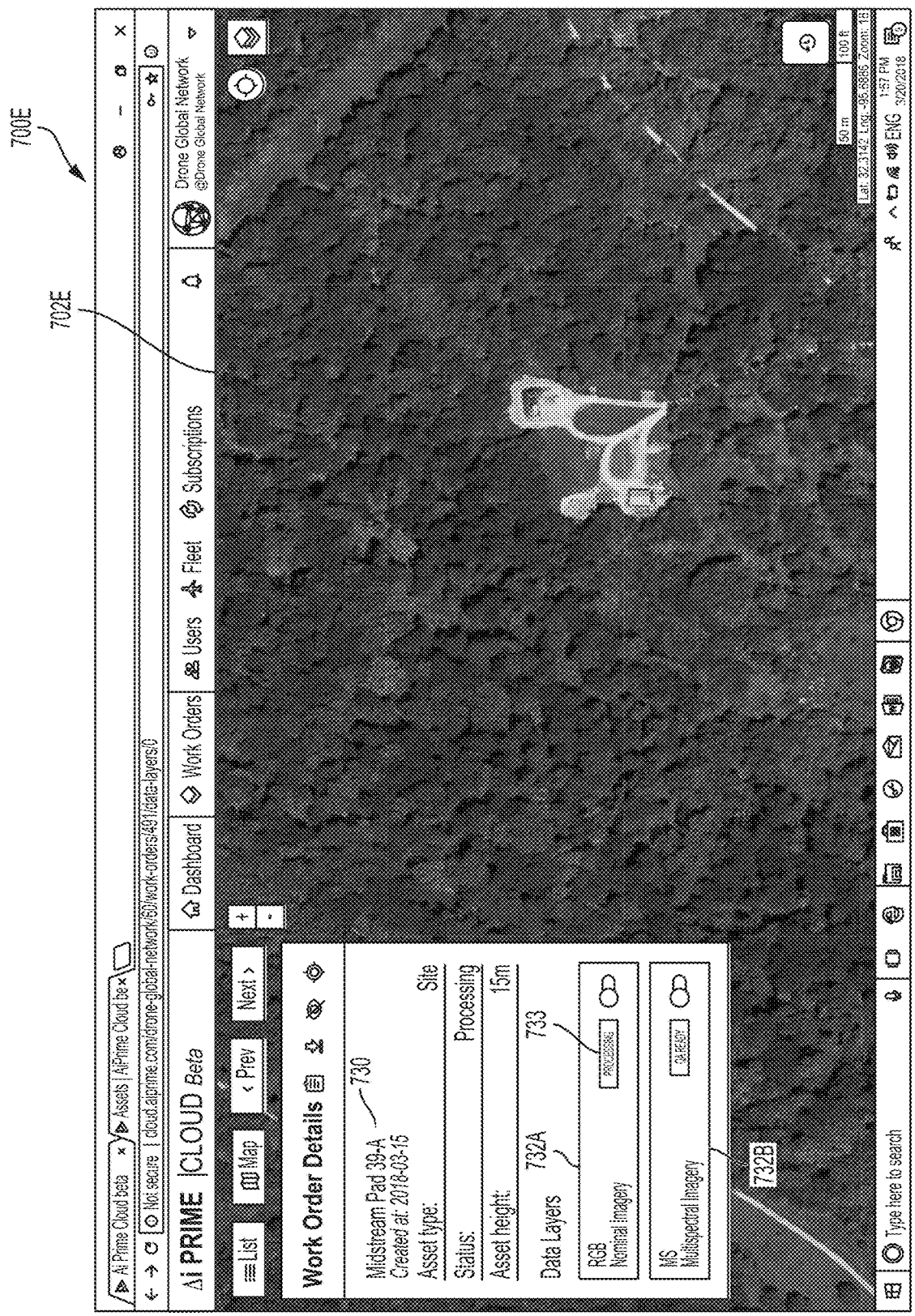
Figure 7F:
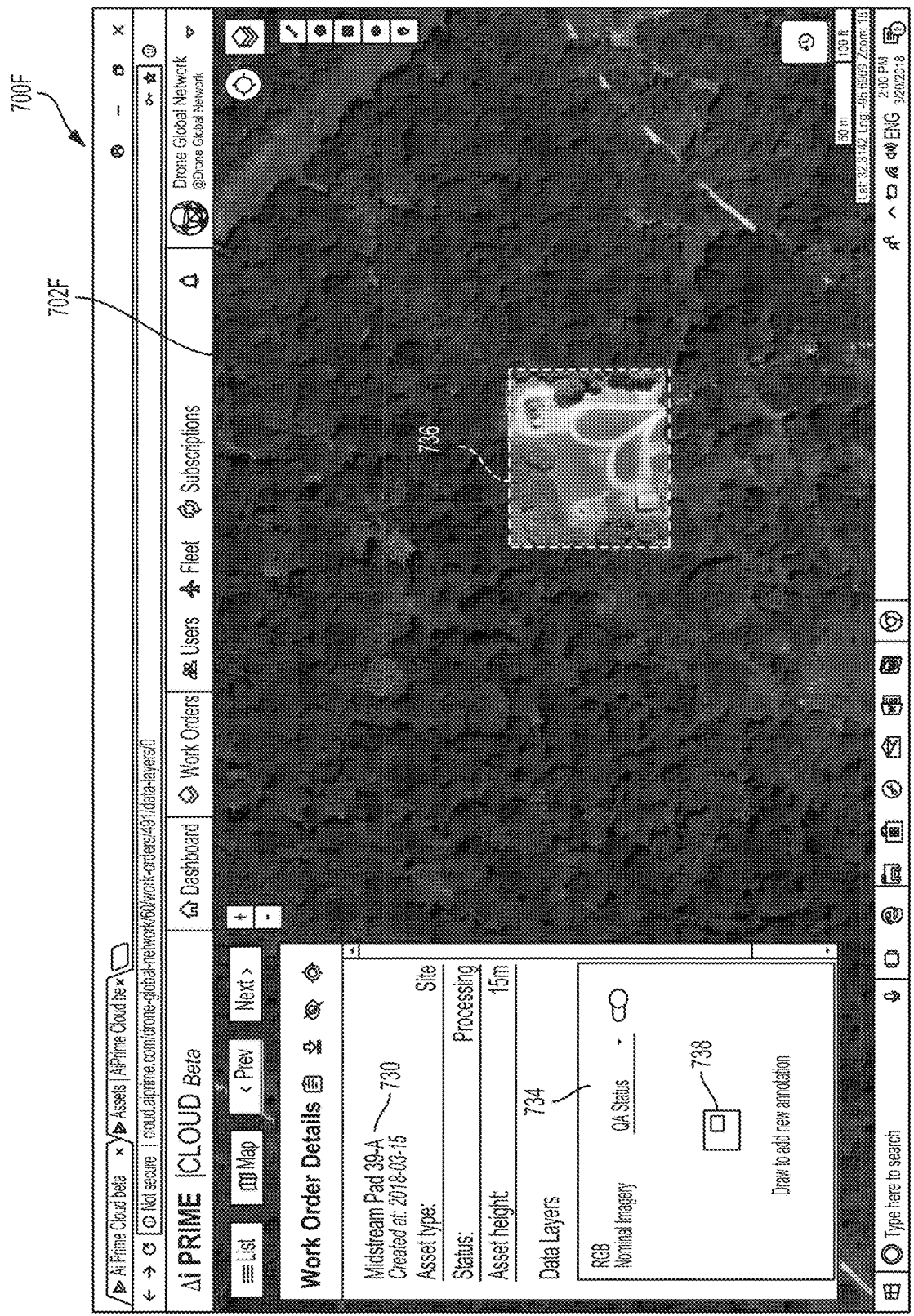
Figure 7G:
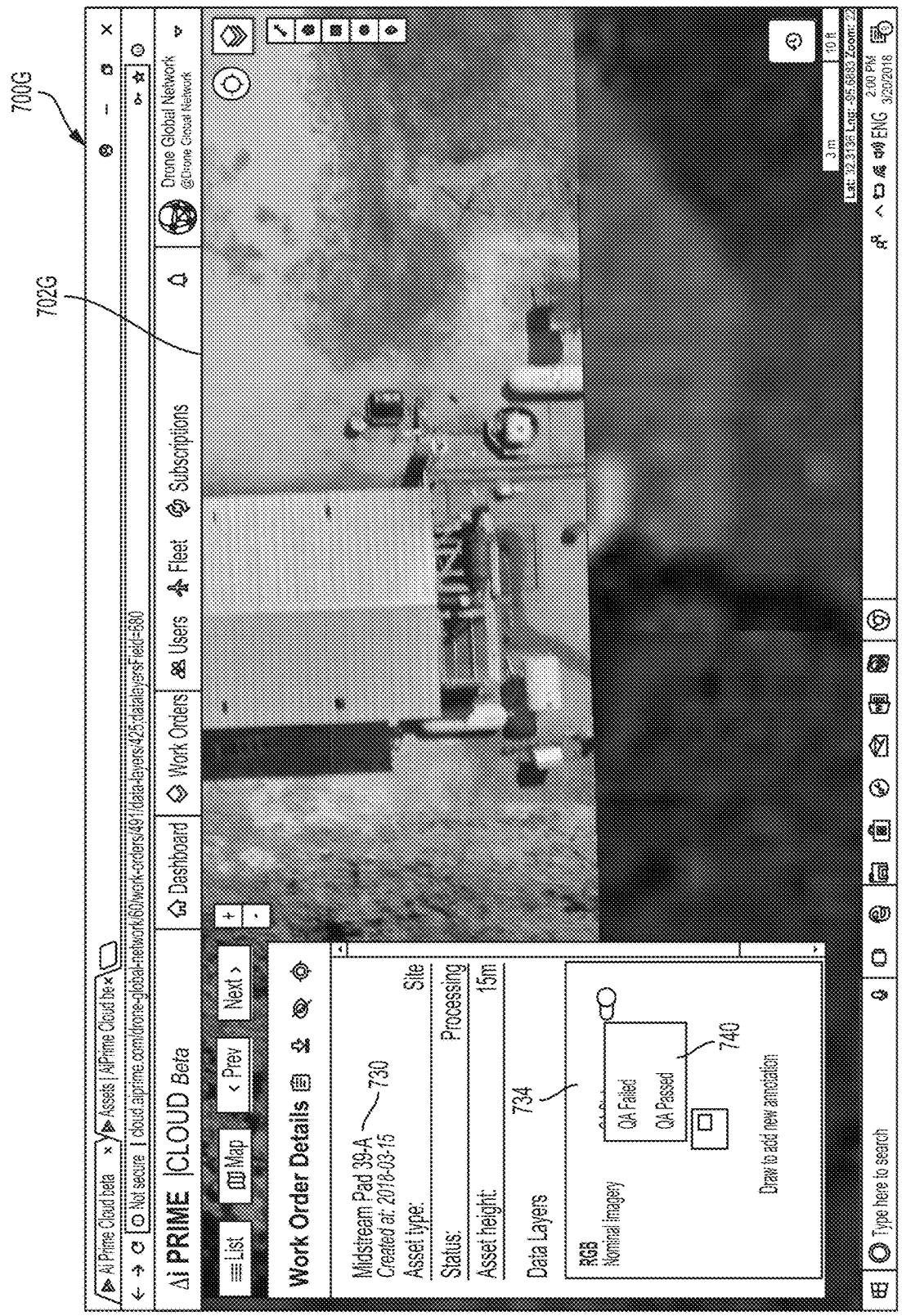
Figure 8A:
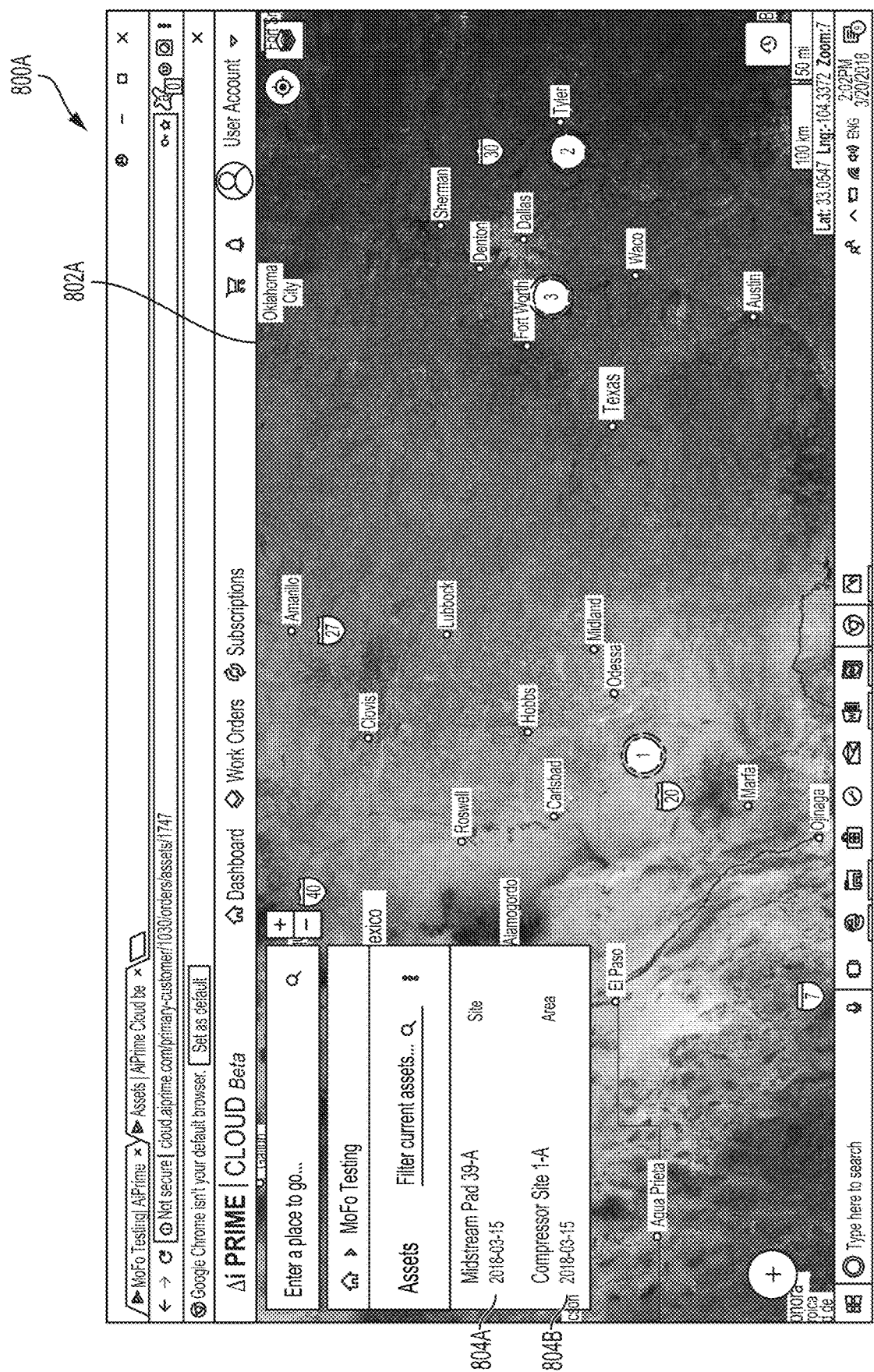
FIGS. 8A-E illustrate GUIs that show how the GIS application enables the user to access one or more data products associated with the geospatial asset, according to some embodiments.
Figure 8B:
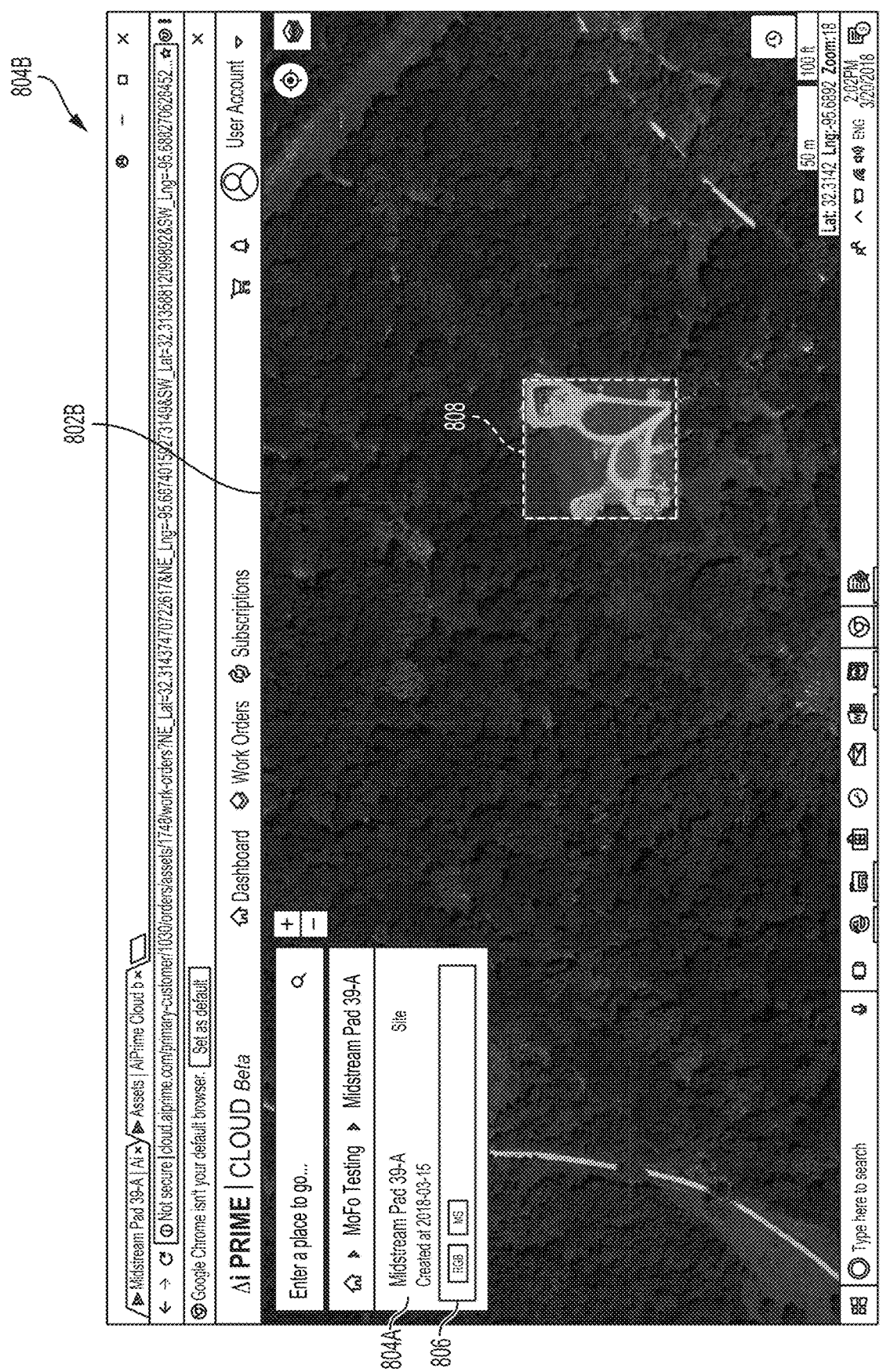
Figure 8C:
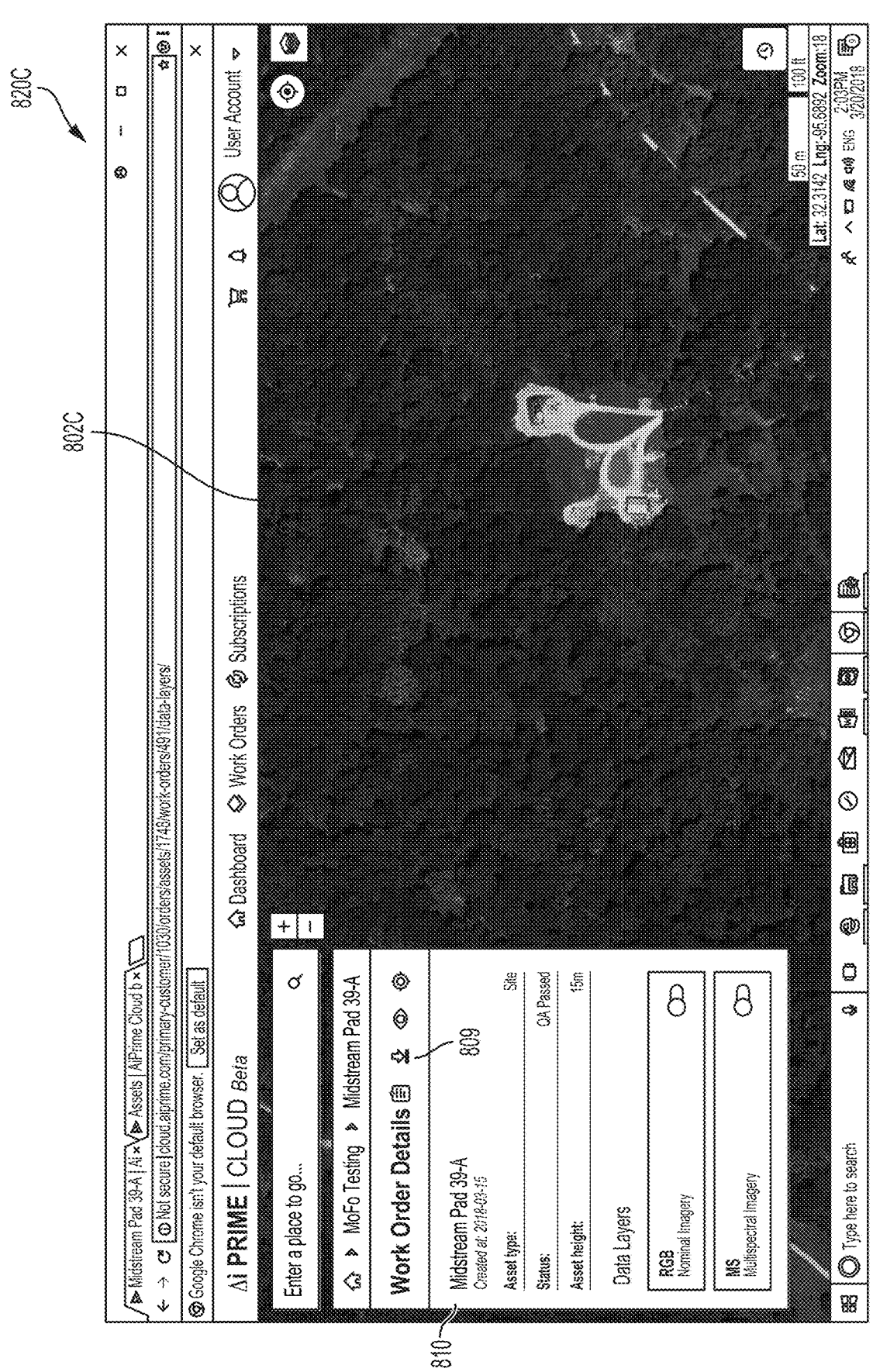
Figure 8D:
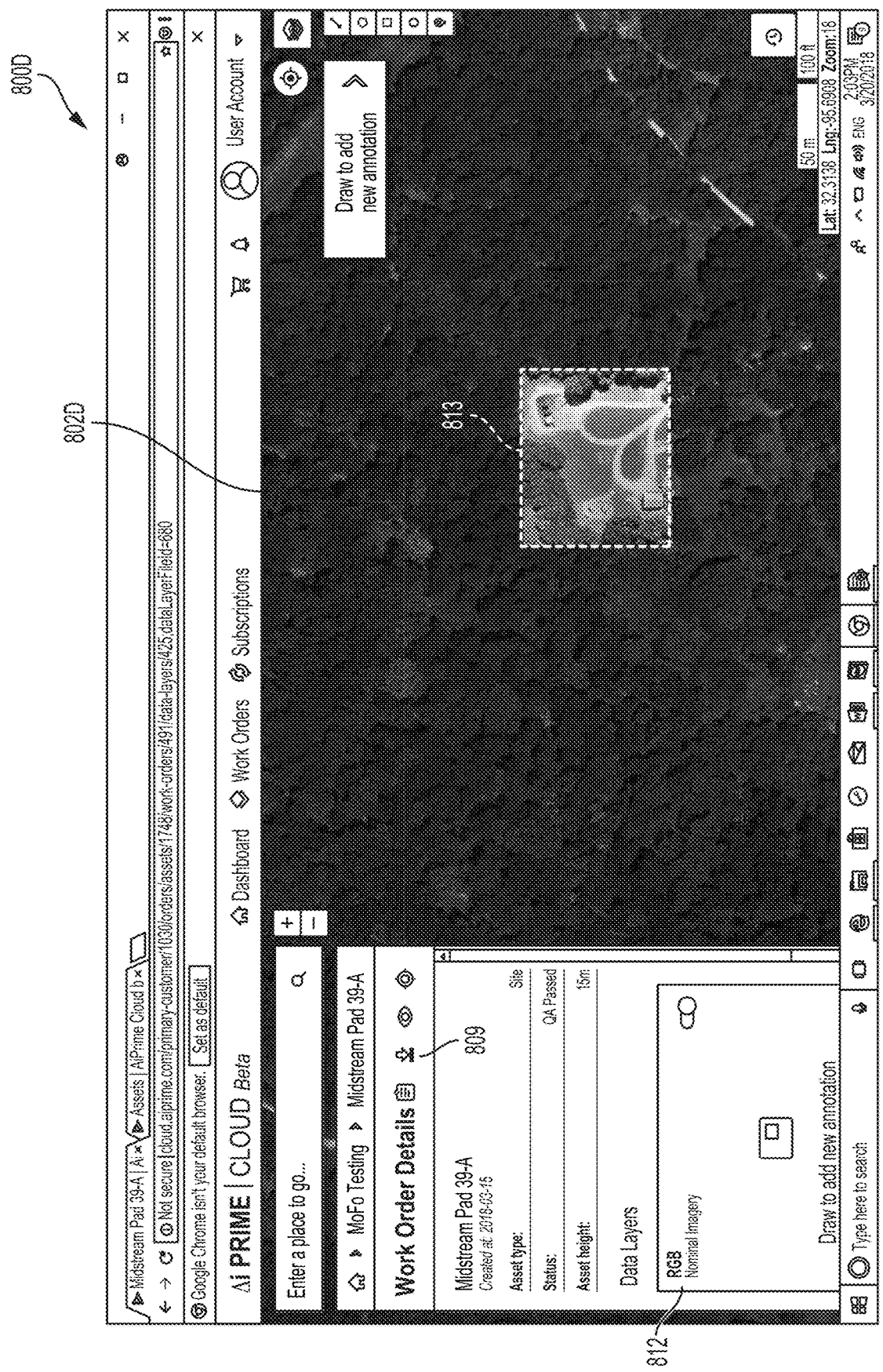
Figure 8E:
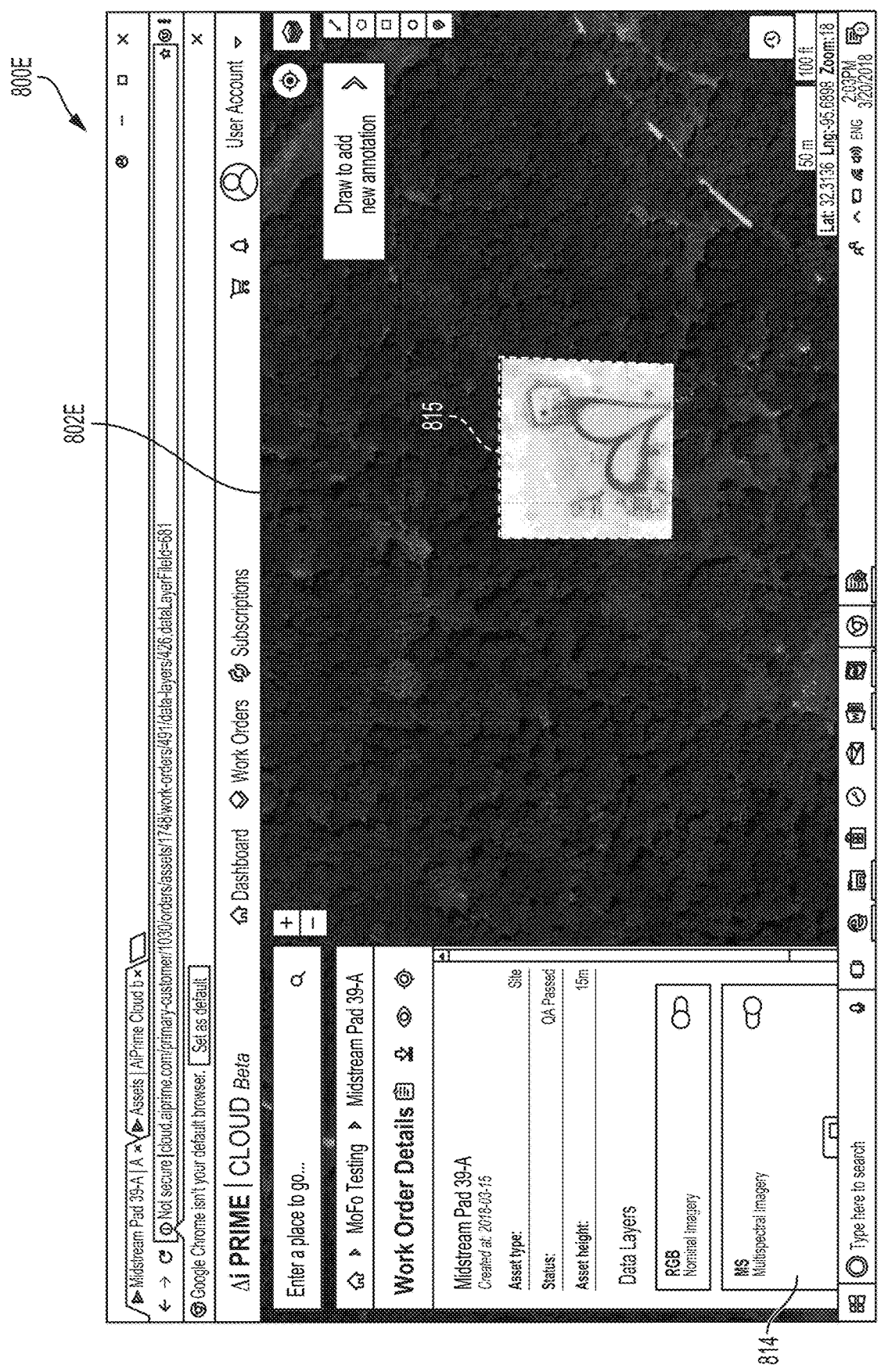

FIGS. 3A-C illustrate GUIs 300A-C that show how GIS application 122 enables the user to manage geospatial assets associated with the user, according to some embodiments. In some embodiments, the user can access GUI 300A by inputting a link 304 to client 110A (e.g., a web browser). In some embodiments, GIS application 122 can be configured to display a login screen to the user to prompt the user with a username and associated password to authenticate the user before providing GUI 300A to the user.

GUI 300A displays map 302 of a geographic area (e.g., Texas in the USA) at a first zoom level (e.g., zoom level 7). GUI 300A displays a plurality of existing folders 310A-B configured by the user and associated with user account 308. User account 308 may indicate the user's name or a company account, which the user has been granted access. In some embodiments, each of folders 310A-B can be associated with one or more geospatial assets. In some embodiments, GUI 300A displays an icon 306 (e.g., a plus sign) that upon the user's selection causes map-interface provider 210 to display GUI 300B, as shown in FIG. 3B, to enable the user to configure his geospatial assets. In particular, GUI 300B may display a plurality of asset-configuration icons 314-318, which may enable the user to add new assets or organize them in hierarchically files. GUI 300B also displays exit icon 312 that upon receiving a user's selection causes map-interface provider 210 to return to and redisplay GUI 300A, hiding asset-configuration icons 314-318. In some embodiments, upon receiving a user's input associated with hovering over one of asset-configuration icons 314-318, e.g., asset-configuration icons 318, map-interface provider 210 can be configured to enlarge the displayed icon being hovered in GUI 200B.

In some embodiments, upon receiving the user's selection of asset-configuration icon 318 related to adding a folder, map-interface provider 210 can be configured to display GUI 300C on the display of client 110A, as shown in FIG.

3C. GUI 300C shows panel 320 that enables the user to input a folder name and a folder type. For example, the user may enter "MoFo Testing" as the folder name and select "Project" as the folder type. In some embodiments, upon receiving the user's confirmation (e.g., input to "Add folder"), asset manager 202 can be configured to add the new folder as one of folders 310A-B and associate the new folder with user account 308 in database 130. Upon adding the new folder, asset manager 202 can be configured to request map-interface provider 210 to display the new folder as a third entry in the displayed folders 310A-B.

FIGS. 4A-D illustrate GUIs 400A-C that show how GIS application 122 enables the user to configure a geospatial asset based on a file, according to some embodiments. GUI 400A displays, on the client, a plurality of geospatial assets associated with a folder 402 (e.g., "MoFo Testing") in an assets listing 403. For example, map-interface provider 210 may display GUI 400A upon receiving the user's selection of folder 402 (e.g., "MoFo Testing") from a plurality of displayed folders 310A-B of FIG. 3A. By providing the ability to configure (e.g., add, edit, or delete) folders, as described with respect to FIGS. 3A-C, map-interface provider 210 enables the user to organize user-configured geospatial assets within a folder. Like icon 306 displayed by GUI 300A of FIG. 3A, GUI 400A displays icon 404 to enable the user to configure his geospatial assets.

Upon receiving the user's selection of icon 404, map-interface provider 210 can be configured to provide GUI 400B displaying asset-configuration icons 414-418, which correspond to asset-configuration icons 314-318 described above with respect to FIGS. 3A-C. As shown in GUI 400B, map-interface provider 210 may increase the size of an icon, e.g., asset-configuration icon 416, upon receiving the user's input associated with hovering or sliding over that icon.

In some embodiments, upon receiving the user's selection of icon 416, map-interface provider 210 can be configured to display GUI 400C to enable the user to configure the geospatial asset based on one or more uploaded file. A file may be uploaded in, for example, one of the following formats: kml, kmz, shp, or zip. GUI 400C can display a panel 406 that enables the user to upload the one or more files that each include geometry information related to configuring the geospatial asset to be added by asset manager 202. For example, the geometry information may include geolocation data related to one or more geofences to define boundaries enclosing a (geographic) region on a map and representative of the user's AOI. For example, the geolocation data may include one or more Global Positioning Satellite (GPS) coordinates. In some embodiments, upon receiving the user's selection to upload one or more files in panel 406, GUI 400C can be configured to display a dialog box that prompts the user to select one or more files to be uploaded from a memory (e.g., a local memory or a memory device) of the user device (e.g., user device 108A).

Upon receiving the one or more uploaded files, asset manager 202 can be configured to parse the geometry information in the one or more uploaded files to determine the one or more geofences that define the boundaries of the region associated with the geospatial asset, according to some embodiments. In some embodiments, map-interface 210 can be configured to display geofences overlay 420 on map 408 as displayed in GUI 400D at a second zoom level (e.g., zoom level 18). In some embodiments, geofences overlay 420 can include the one or more geofences determined from the one or more uploaded files. For example, GUI 400D shows geofences overlay 420 as a box, which may be in a predefined color (e.g., blue). As shown, geofences overlay 420 may define the boundaries of the region on map 408 associated with the geospatial asset. Further, GUI 400D may display panel 410 that enables the user to enter information (e.g., a name and a type) of the geospatial asset to be added. In some embodiments, a plurality of selectable types of assets can be predefined and provided to the user based on the user's identity (e.g., user account 308) and associated credentials or preferences. In some embodiments, GUI 400D requests the user to provide additional information (e.g., "Height") based on the user's selection of a specific type of asset (e.g., "Site").

Upon receiving the user's submission (e.g., the user selects the "Submit" icon), asset manager 202 can be configured to add the configured geospatial asset to database 130 and associate the geospatial asset with a selected folder (if any) and user account 308. Then, map-interface provider 210 can display the added geospatial asset in, for example, assets listing 403 of GUI 400A.

FIGS. 5A-D illustrate GUIs 500A-D that show how GIS application 122 enables the user to configure a geospatial asset based on the user's input received on map 502A-D, according to some embodiments. In some embodiments, map-provider interface 220 can be configured to enable the user to navigate AOIs on map 502A-D in one or more of the following three ways: user inputs (e.g., scroll, click, drag, etc.) directly on map 502A-D, selection of a geospatial asset from asset listing 503, and input into search field 506. In some embodiments, upon receiving the user's selection of the geospatial asset, map-provider interface 220 map display the region associated with the geospatial asset on the map. This may be useful to the user because an AOI may be located in physical proximity to one of the regions corresponding to the geospatial assets shown in assets listing 503. As shown in GUI 500A, the geospatial asset "Midstream Pad 39-A" in geospatial assets 503 may have been configured based on an input file, as described above with respect to FIGS. 4A-D, and added to assets listing 503 for display.

In some embodiments, search field 506 enables the user to locate the AOI based on inputting text such as physical coordinates (e.g., latitude and longitude), a landmark, or a place name (e.g., a city, a town, a county, a state, a country, etc.). For example, GUI 502A may show map 502A based on physical coordinates entered into search field 506. Like icon 404 shown in GUI 400A, GUI 502A may display icon 504 to enable the user to configure his or her geospatial assets.

In some embodiments, upon receiving the user's selection of icon 504, map-interface provider 210 can be configured to provide GUI 500B displaying asset-configuration icons 514-518 and exit icon 512, which correspond to asset-configuration icons 314-318 and exit icon 312 described above with respect to FIGS. 3A-C. In some embodiments, upon receiving the user's selection of asset-configuration icon 514 (e.g., showing a pencil graphic) to add a geospatial asset, map-interface provider 210 can be configured to provide GUI 400C showing drawing toolbar 520.

In some embodiments, drawing toolbar 520 provides a drawing interface to allow the user to input markings directly on map 502C to designate boundaries for a region on map 502C. In some embodiments, drawing toolbar 520 includes drawing lines, polygons, rectangles, circles, or location pins that enables the user to designate one or more geofences to define the boundaries to enclose the region. In the drawing mode, the marking may be a specific color, e.g., blue, to notify the user that the markings are not permanent and may be canceled or deleted to enable the user to re-mark the boundaries. GUI 500D shows map 502D having a user-drawn rectangle 522 showing an enclosed region representing the user's AOI. Rectangle 522 may have been drawn by the user using drawing toolbar 520 shown in GUI 500C. Once the enclosed region is confirmed, GUI 500D may present the user with panel 510 prompting the user to enter information (e.g., a name and a type) of the geospatial asset to be added. At this point, GUI 500D may operate similar to GUI 400D, as described above with respect to FIG. 4D. Upon receiving the user's submission in panel 510, GUI 500D may be configured to display the newly configured geospatial asset as a new entry to asset listing 503.

FIGS. 6A-E illustrate GUIs 600A-E that show how GIS application 122 enables the user to request one or more data products associated with geospatial asset 608A, according to some embodiments. In some embodiments, as will be further described below, GIS application 122 can be configured to enable the user to select one or more available data products for a selected region once geospatial asset 608A representative of that region has been configured (e.g., via the mechanisms described with respect to FIGS. 3-5) and stored in database 130 by asset manager 202. In some embodiments, GIS application 122 can be configured to determine the one or more available data products based on information provided by geospatial data suppliers 140 and the selected geospatial asset corresponding to the region. Accordingly, the one or more available data products may change depending on the capabilities and capacity of geospatial data suppliers 140.

GUI 600A may display map 602A of a geographic area, geospatial assets 608A-B 608B associated with the user, and checkout icon 606A indicating whether one or more data products are being requested. Upon receiving the user's selection of work order 604 view, GIS application 122 may enable the user to request one or more available data products associated with a selected geospatial asset. In particular, upon receiving a user's input (e.g., a scroll, a hover, a selection, etc.) over geospatial asset 608A, GUI 600A may be configured to display a cart icon 610A to begin the data products ordering process.

In some embodiments, upon receiving the user's selection of cart icon 610A, map-interface provider 210 can be configured to display GUI 600B showing updated cart icon 610B and checkout icon 606B indicating a data request was initiated. Upon receiving the user's input to proceed with requesting one or more data products for geospatial asset 608A, map-interface provider 210 may be configured to display order panel 612 in GUI 600C. Further, GUI 600C may display geofences overlay 611 showing the one or more geofences that enclose the region associated with geospatial asset 608A.

As shown in GUI 600C, order panel 612 can be configured to display a plurality of data product buttons associated with a plurality of data products available for the region associated with geospatial asset 608A, according to some embodiments. As described above, a data product may be a type of graphical representation of the AOI. For example, the data product may include an RGB image, a multispectral (MS) image, a long wave infra-red (IR) image, a Digital Elevation Map (DEM) image, and the like. Other types of data products may include data analytics associated with the region such as, for example, soil erosion analysis, projected deforestation, etc. These data products may be generated by geospatial data suppliers 140 operating satellites, unmanned aerial vehicles (e.g., a drone or a plane), or manned aircraft.

In some embodiments, data-request generator 204 can be configured to retrieve the plurality of data products available for geospatial asset 608A upon receiving the user's selection of geospatial asset 608A. By providing the dynamic order panel 612, map-provider interface 210 may provide to the user additional data products, as determined by data-request generator 204, as soon as those additional data products become available.

In some embodiments, upon receiving the user's selection of a data product button, map-interface provider 210 can be configured to display a screen showing descriptions for the selected data product. For example, as shown in GUI 600C, screen 618 may be displayed showing descriptions of the MS data product in response to the user selecting the MS data product button.

In some embodiments, upon receiving the user's selection of edit icon 614, map-interface provider 210 can be configured to display GUI 600D showing a screen 620 for ordering one or more data products. As shown in GUI 600D, two data products (i.e., RGB and MS) have been selected by the user. Further, GUI 600D shows the save button to enable the user to add selected data products to the data request. In some embodiments, once the selected data products are saved, the data product buttons associated with unselected data products may be removed, as shown in GUI 600E.

In some embodiments, recurring option 616 displayed in GUI 600E enables the user to select a recurrence time interval for one or more of the one or more selected data products. For example, upon receiving the user's selection (e.g., check mark) for recurring option 616, GUI 600E may provide a dropdown menu 620 to enable the user to select a recurrence time interval (e.g., a number of days, a number of weeks, a number of months, etc.). Further, GUI 600E enables the user to enter a requested due date 622 for the requested data products. Once the user finishes adding data products to his data request, he may confirm checkout at which point GIS application 122 may notify the user that his data request was successfully placed. For example, map-provider interface 210 may display a popup window or send a text message to the user indicating that the data request is being processed. In some embodiments, data-request generator 204 can be configured to generate the data request to associate with geospatial asset 608A based on the user configurations as described and shown with respect to GUIs 600A-E.

FIGS. 7A-G illustrate GUIs 700A-G that show how GIS application 122 enables the requested one or more data products (as described above with respect to FIGS. 6A-E) to be fulfilled by one or more geospatial data suppliers 140, according to some embodiments. In some embodiments, GIS application 122 can be configured to determine whether a user is associated with geospatial data consumer 106 or geospatial data supplier 140 based on the user's login credentials (e.g., a username) used to access GIS application 122. In some embodiments, GIS application 122 can be configured to provide GUI 700A showing a default screen view of data requests to the user upon determining that the user is associated with geospatial data suppliers 140. Accordingly, the screens and capability described below with respect to GUIs 700A-G may be provided to a user identified as an operator or one of geospatial data suppliers 140. For example, user account 705 displays "Drone Global Network," which may be a company account associated with the user. IN some embodiments, GUIs 700A-G are not made available to users identified as geospatial data consumers 106.

GUI 700A may display data requests 706 in a work order panel 702A where summary level details for each of data requests 706 may also be displayed. For example, summary level details for a data request may include a unique ID, a name of the geospatial asset associated with the data request, a type of the geospatial asset, a company or user that originated the data request, a completion status of the data request, a creation date of the data request, or a combination thereof. In some embodiments, the completion status may be: "open" indicating that the data request is not being processed by a geospatial data supplier, "processing" indicating that the data request is in the process of being fulfilled by the geospatial data supplier, or "completed" indicating that the data request has been fulfilled by the geospatial data supplier.

In some embodiments, in addition to providing work order panel 702A that is scrollable to allow the user to view and select data requests 706, GUI 700A can also provide a search panel 704. Search panel 704 may provide search options to enable the user to filter data requests 706 based on one or more portions of the summary details (e.g., geospatial asset name, company name, asset type, creation date or date range, completion status, etc.). In some embodiments, search panel 704 may also enable the user to search data requests 706 based on a data product type or an operational region associated with specific geospatial assets.

In some embodiments, GIS application 122 can be configured to expand a selected data request to show additional details and options. For example, upon receiving a user's selection of an expand icon (e.g., the ">" graphic) associated with the "Midstream Pad 39-A" geospatial asset shown in data requests 706, map-interface provider 210 may provide GUI 700B showing expanded details 710 associated with data request 708. In some embodiments, expanded details 710 may include user information (e.g., username, user type, or the user's company), asset information (e.g., name of geospatial asset, a type of the geospatial asset, or a creation date), or the data products (e.g., RGB and MS) included in the data request. Further, options 712-716 may be shown to enable the user to visualize or fulfill data request 708.

In some embodiments, upon receiving the user's selection of option 712 to show the region associated with data request 708 on the map, map-interface provider 210 can be configured to display GUI 700C. GUI 700C displays a map showing the boundaries 720 of a region associated with data request 708. For example, boundaries 720 may be shown using one or more geofences as stored in the geospatial asset associated with data request 708. Data-request manager 206 may be configured to retrieve the geofences from database 130 based on the geospatial asset. By visualizing the region associated with data request 708 on the map, the user may view items of interest such as public roads, utility lines, wind farms, etc. within boundaries 720 that may affect operation of satellites, unmanned aerial vehicles, or manned aircraft used to obtain the requested data products. In some embodiments, GUI 700C allows the user to select a base map on which boundaries 720 are to be overlaid. For example, the base map may be a satellite image (as shown in GUI 700C). Work order panel 722 may show details of data request 708 in addition to the status of one or more data products (also shown as "data layers") associated with data request 708.

Returning to GUI 700B, upon receiving the user's selection of option 714 to show a schema associated with data request 708, map-interface provider 210 can be configured to display GUI 700D, according to some embodiments. Further, data-request manager 206 can provide the schema for download upon receiving the user's selection of option 716. In some embodiments, data-request manager 206 can be configured to query database 130 based on the data request to retrieve the schema. As shown in GUI 700D, the schema may be displayed in panel 724. In some embodiments, the schema shown in panel 724 was first created by data-request generator 204 when data request 708 was generated, as described above with respect to FIGS. 6A-E. In some embodiments, the schema can be stored in a schema file (e.g., a JSON file) storing first information used to recreate boundaries of a region and storing second information associated with one or more data products being requested. For example, the first information may include geolocation data such as a plurality of geographical coordinates (e.g., GPS coordinates) that define the boundary for the region. The second information may include the specific types of data products along with a requested resolution for each data product.

In some embodiments, the schema file for data request 708 can be downloaded automatically without using GUI 700B as shown in FIG. 7B. In particular, geospatial data supplier 140 may include data-supplier server 146 that implements supplier application 148 that transmits schema download requests to GIS application 122 via API server 124.

In some embodiments, geospatial data supplier 140 may operate satellites, unmanned aerial vehicles, or manned aircraft to obtain raw image data representative of one or more graphical representations of a geographic area. In some embodiments, supplier application 148 can be configured to generate a data product for upload based on the schema file. For example, supplier application 148 may filter the raw image data to include a specific type of graphical representation (e.g., an MS image) corresponding to the data product specified in the schema file. Further, supplier application 148 may select portions of the filtered raw image data that comprise the (geographical) region specified by geolocation data in the schema file. Once the data product is generated by data-supplier server 146, supplier application 148 can be configured to upload the data product to fulfill data request 708. In some embodiments, when one or more of the data products in data request 708 is received by GIS application 122, map-interface provider 210 may change the completion status of data request 708 to "processing."

GUI 700E displays work order panel 730 including uploaded data products 732A-B specified in data request 708. Data product 732A may be associated with a "processing" status 733 if the data product is still being generated by supplier application 148. Once the data product is successfully uploaded, GUI 700E may display "QA Ready," as shown for data product 732B. In some embodiments, the user may select one of data products 732A-B that has a "QA Ready" status to verify that the uploaded data product satisfies the requirements of the data product being requested.

In particular, upon receiving the user's selection of data product 732A, map-interface provider 210 displays GUI 700F showing the uploaded data product on map 702F. For example, for data product 732A, an RGB image 736 is shown on map 702F. In some embodiments, GUI 700F enables the user to zoom in and out of RGB image 736 to verify the image quality of data product 730. For example, GUI 700G shows map 702G including a zoomed in view of RGB image 736. In some embodiments, GUI 700F enables the user to add annotations 738 to be associated with data product 730. To assign a quality assurance result, the user may select QA selection 734, which causes map-interface provider 210 to display GUI 700G showing a drop-down menu 740 with a "QA Failed" option and a "QA Passed" option. In some embodiments, if the user assigns a QA failure to data product 730, supplier application 148 can be configured to generate a replacement data product to improve upon the image quality. If the user assigns a QA pass to data product 730, GUI 700E may be configured to change the status 733 to "QA Passed." In some embodiments, a data product that passes quality assurance can be provided by asset manager 202 to a geospatial data consumer to enable the consumer to visualize the requested data product.

FIGS. 8A-E illustrate GUIs 800A-E that show how GIS application 122 enables the user to access one or more data products associated with geospatial assets 804A-B, according to some embodiments. In addition to allowing the user to select one of geospatial assets 804A-B, map-interface provider 210 can be configured to provide GUI 800A showing map 802A with one or more marked regions (e.g., shown as numbered circle graphics) that are selectable by the user. In some embodiments, one or more data products for a geospatial asset may be made available to the user for visualization once the one or more data products passes the quality assurance mechanism, as described above with respect to FIGS. 7A-G.

In response to receiving the user's selection of geospatial asset 804A, map-interface provider 210 can be configured to provide GUI 800B. GUI 800B may display boundaries 808 of a region associated with geospatial asset 804A. Also, GUI 800B may show graphical representations 806 for requested data products (e.g., an RGB image and an MS image).

In some embodiments, in response to receiving the user's selection of geospatial asset 804A shown in GUI 800B, map-interface provider 210 can be configured to provide GUI 700C showing work order details 810. For example, work order details 810 show one or more requested data products, which can be downloaded by GIS application 122 to the user's device upon receiving the user's selection of download 809 data products. In some embodiments, the option for download 809 enables the user to download individual data products as well as select corresponding download formats (e.g. a GeoTIFF format).

In some embodiments, each of data products in work order details 810 may be selectable to enable the user to visualize a selected data product. In some embodiments, a selected data product is visualized as a data layer on top of map 802C. For example, upon receiving the user's selection of data product 812, GUI 800D may be provided to the user showing data layer 813 including the RGB image. In another example, upon receiving the user's selection of data product 814, GUI 800E may be provided to the user showing data layer 815 including the MS image. In some embodiments, once a data layer is displayed, map-interface provider 210 enables the user to zoom in or out of the data layer as well as change a base map of map 802A-D.

FIGS. 9A-D illustrate GUIs 900A-D that show how GIS application 122 enables the user to add annotations to a data product associated with a geospatial asset, according to some embodiments. In particular, when a user accesses a data product for display, as described above with respect to FIGS. 8A-E, GIS application 122 may enable the user to create one or more annotations for specific areas of interest on that data product. In some embodiments, once the annotations are saved, asset manager 202 can be configured to associate the annotations with the data product and store the annotations in association with that geospatial asset in database 130. In some embodiments, the annotations may be shown to any user having access to that geospatial asset, as will be further described below.

GUI 900A shows map 902A of a data layer (e.g., an RGB image) corresponding to data product 904 uploaded for geospatial asset 902. Data product 904 may be accessed by the user according to the mechanism described above with respect to FIGS. 8A-E. In some embodiments, data product 904 may be associated with icon 906 to add one or more annotations to the data layer corresponding to data product 904. In some embodiments, upon receiving the user's selection of icon 906, map-interface provider 210 may be configured to display drawing toolbar 908 to enable the user to identify an area of interest in the data layer shown on map 902A. For example, the user may identify a rectangular region 910 in map 902B, as shown in GUI 900B. In some embodiments, drawing toolbar 908 operates similar to 520, as described with respect to FIG. 5C.

In some embodiments, upon receiving the user's identified and marked area of interest, map-interface provider 210 can be configured to display dialogue box 912 for receiving and storing annotation details. For example, annotation details may include characteristics of the identified area of interest (e.g., an area, a perimeter, a status, etc.) as well as a title and comments submitted by the user. In some embodiments, the annotation details may include comments from a plurality of users with each comment being time and spatially stamped. In some embodiments, upon receiving the user's submission of the annotation (e.g., the user selects the "Save annotation" button in dialogue box 912), GUI 900C may show saved annotation 908 in association with data product 904. In some embodiments, multiple annotations can be generated for each data product associated with geospatial asset 902. Further, the multiple annotations may be submitted by one or more users. In some embodiments, dialogue box 912 may enable the user to input text (as shown) or one or more files (e.g., a PDF file, an image file, a video, etc.) to associate with data product 904.

Figure 9A:
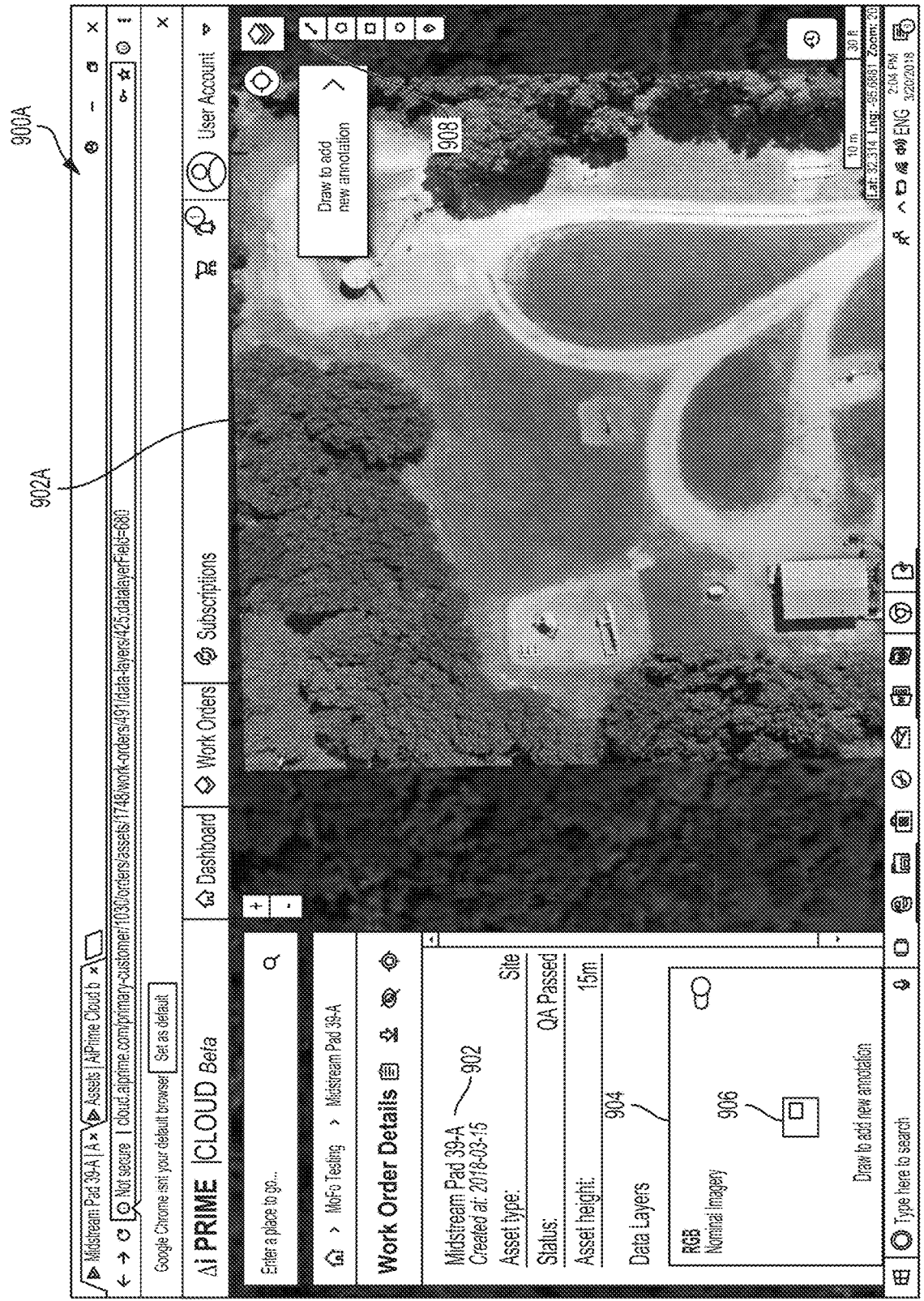
FIGS. 9A-D illustrate GUIs that show how the GIS application enables the user to add annotations to a data product associated with the geospatial asset, according to some embodiments.
Figure 9B:
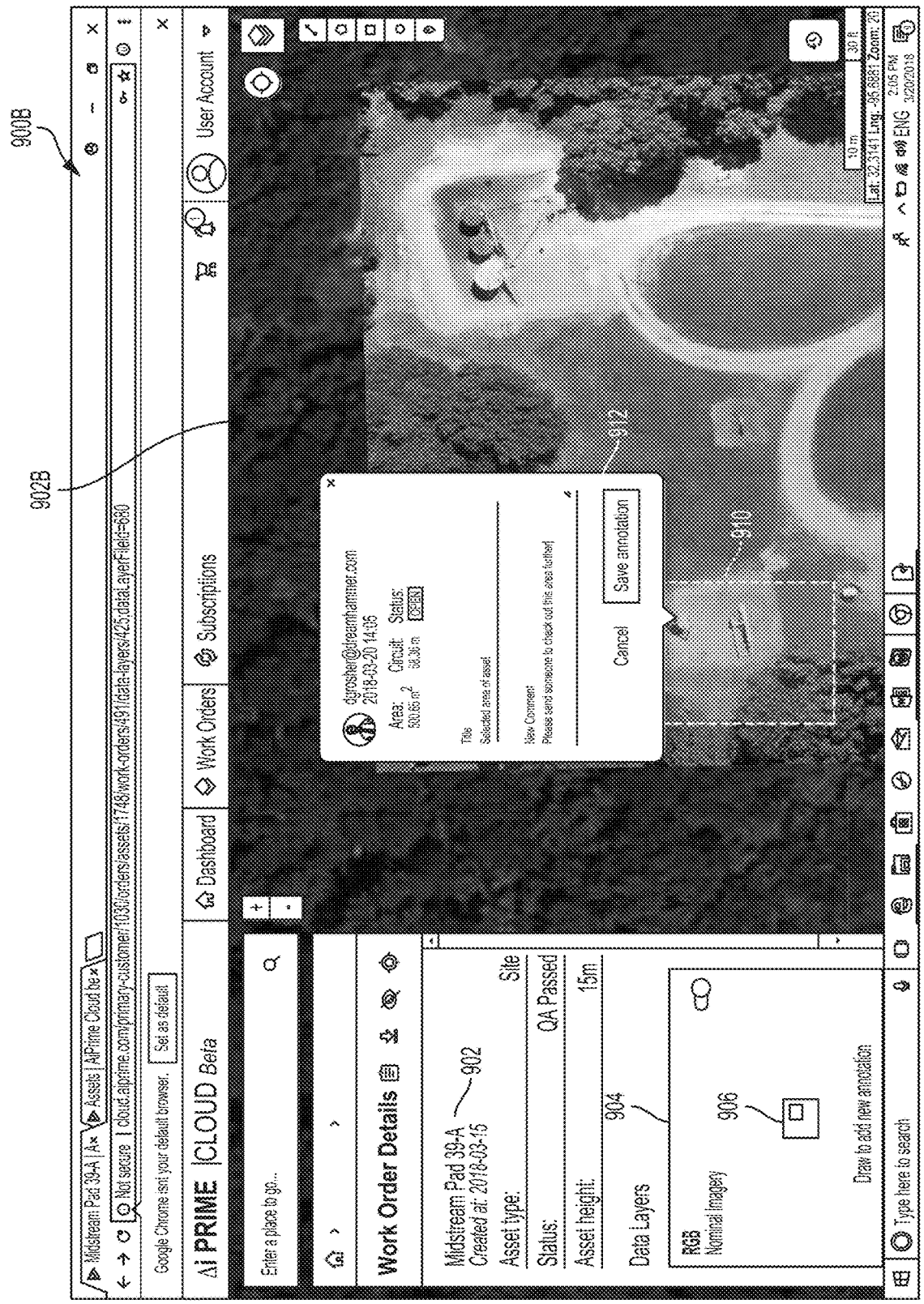
Figure 9C:
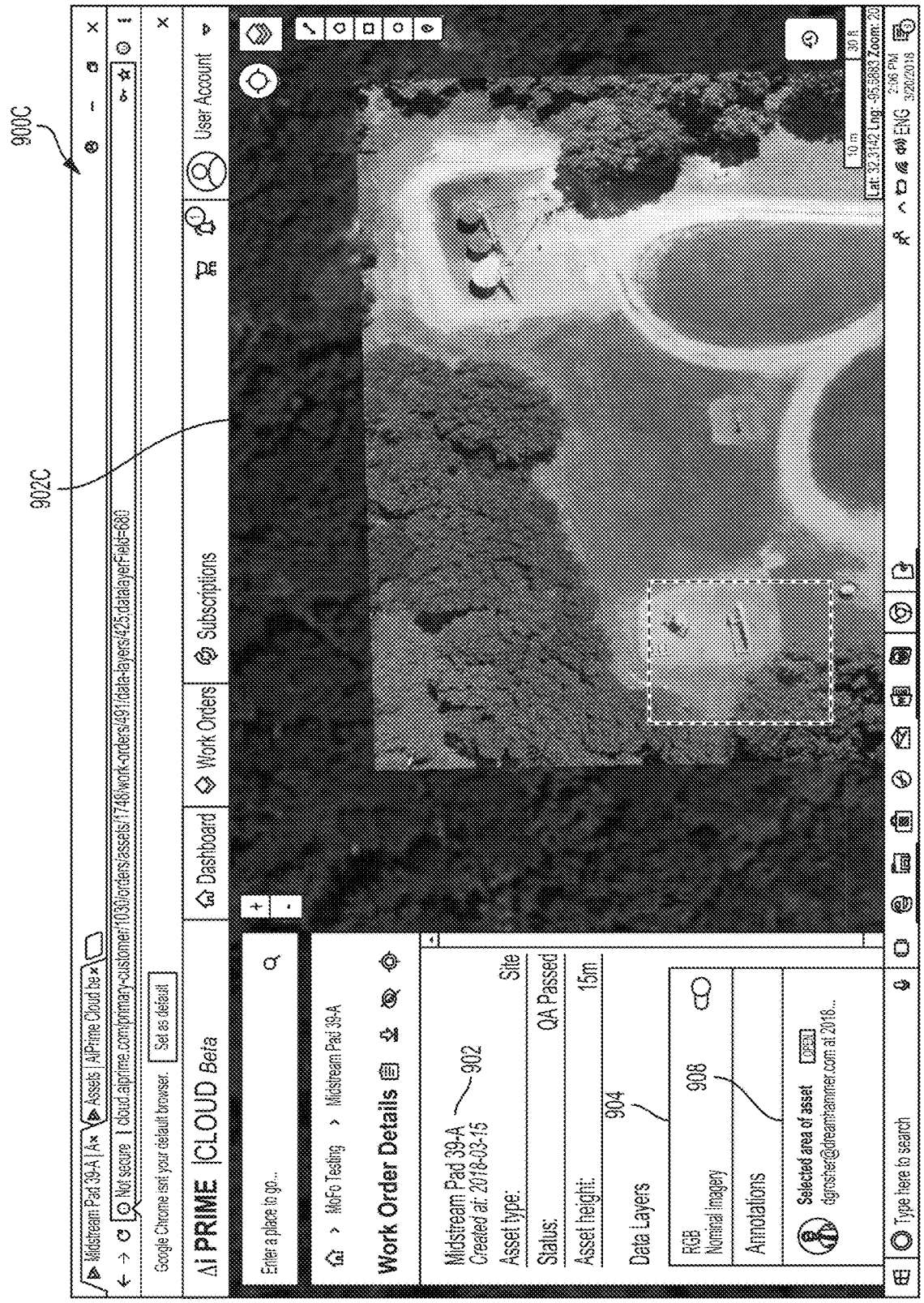
Figure 9D:
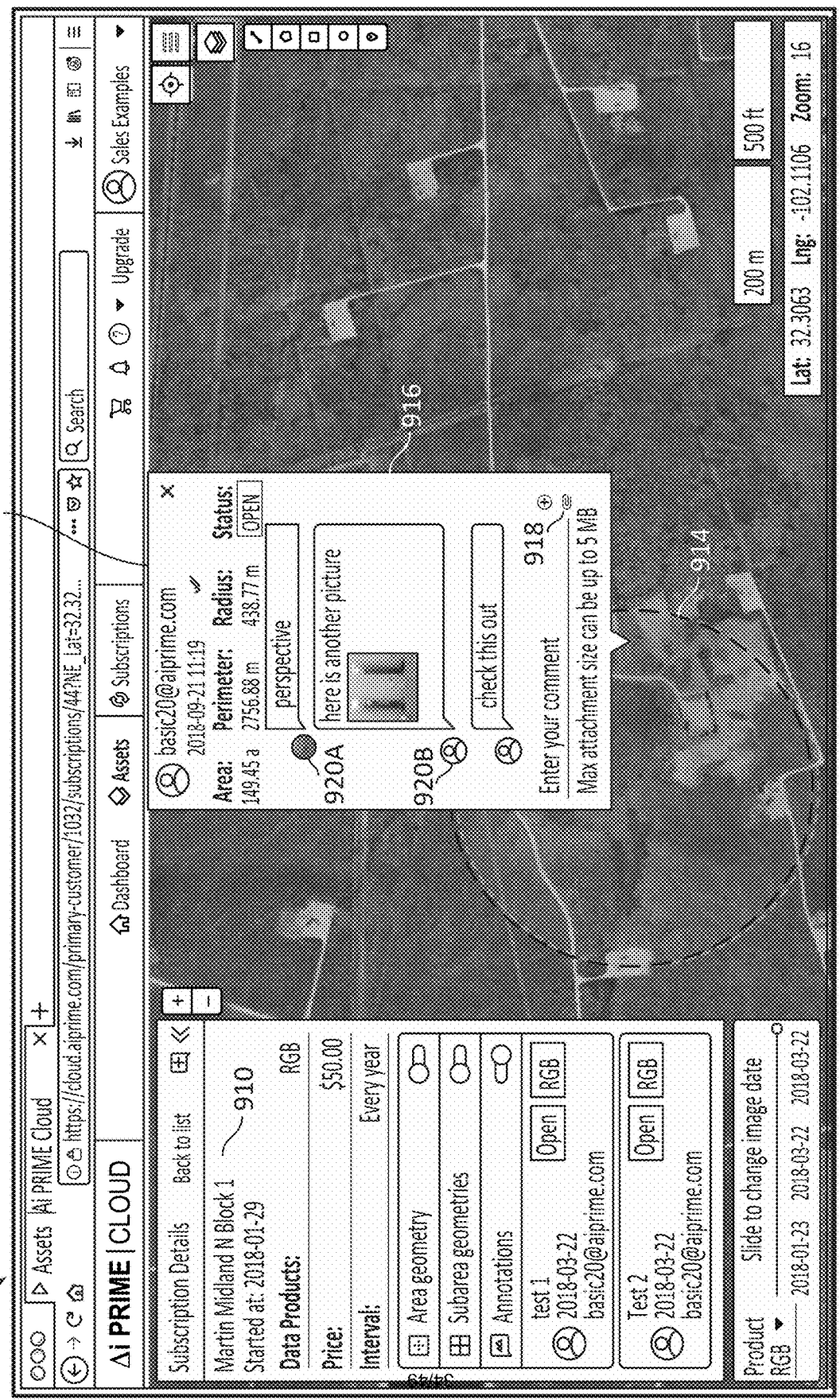

For example, GIS application 122 can be configured to provide GUI 900D that shows map 912 of a data product (e.g., an RGB image) uploaded for geospatial asset 910 labeled "Martin Midland N Block 1." As shown in FIG. 9D, GUI 900D can enable the user to select a region 914 (e.g., a circular region) on map 912 and add one or more annotations via dialogue box 916. For example, dialogue box 916 shows saved comments from a plurality of users 920A-B. In some embodiments, dialogue box 916 provides a text entry box to enable users to input comments and provides an attachment button 918 to allow the user to submit and add attachments such as an image, a video, a PDF file, or the like. Therefore, GUI 900D provides the functionality of spatially and time stamping annotations with respect to a data product associated with geospatial asset 910, according to some embodiments.

Figure 10A:
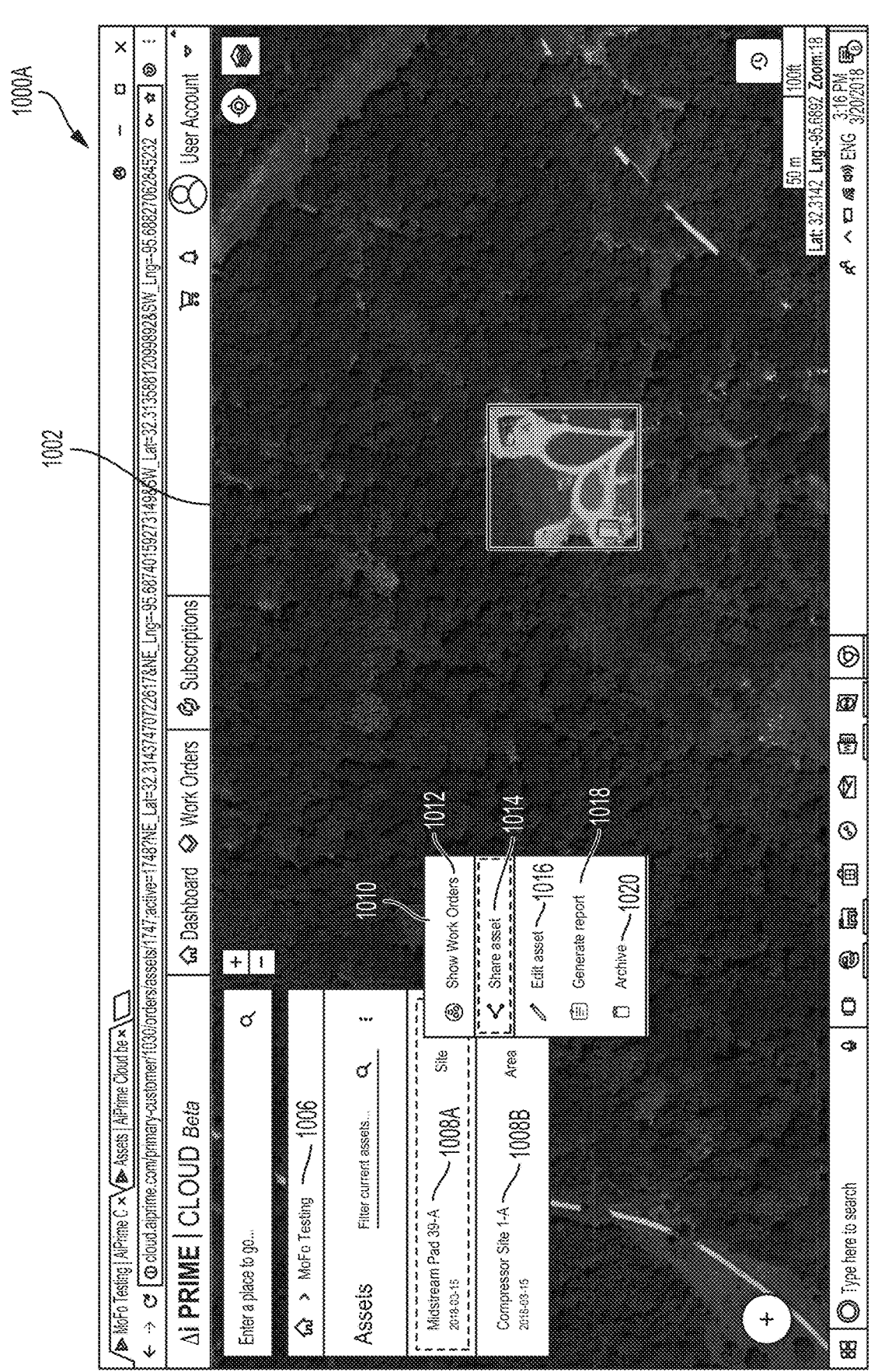
FIGS. 10A-B illustrate GUIs that show how the GIS application enables the user to share geospatial assets associated with the user, according to some embodiments.
Figure 10B:
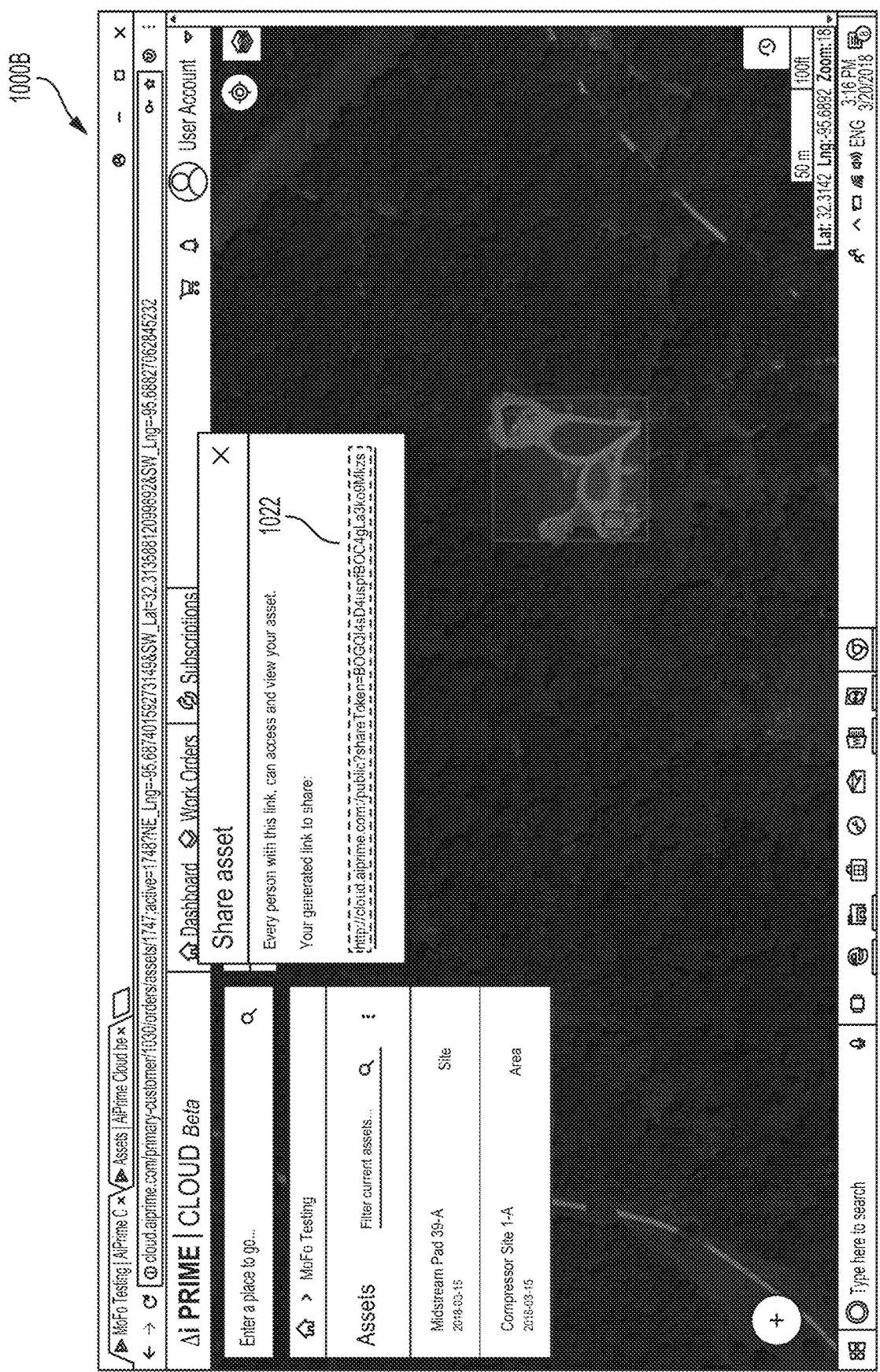

FIGS. 10A-B illustrate GUIs 1000A-B that show how GIS application 122 enables the user to share geospatial assets associated with the user, according to some embodiments. GUI 1000A displays, on the client, a plurality of geospatial assets 1008A-B stored in folder 1006 (e.g., "MoFo Testing") in an assets listing. In some embodiments, upon receiving the user's selection of geospatial asset 1008A, map-interface provider 210 can be configured to display on map 1002 boundaries 1004 (e.g., as a geofences overlay) enclosing the region associated with geospatial asset 1008A. Further, map-interface provider 210 can display pop-up menu 1010 listing one or more of the following functionalities provided by asset manager 202 to the user: show work orders 1012, share asset 1014, edit asset 1016, generate report 1018, and archive 1020.

In some embodiments, map-interface provider 210 enables the user to view data requests associated with geospatial asset 1008A upon receiving the user's selection of show work orders 1012. In some embodiments, map-interface provider 210 enables the user to edit information (e.g., a name or a file type, etc.) associated with geospatial asset 1008A upon receiving the user's selection of edit asset 1016. Asset manager 202 can update information of geospatial asset 1008A stored in database 130 based on the user's edits. In some embodiments, map-interface provider 210 enables the user to generate a downloadable report associated with geospatial asset 1008A upon receiving the user's selection of generate report 1018. The report may include the geolocation data that defines boundary (e.g., one or more geofences) of the region associated with geospatial asset 1008A and include a set of geospatial data associated with the region. For example, the geospatial data may include one or more requested or received data products. In some embodiments, map-interface provider 210 enables the user to archive geospatial asset 1008A (and associated geospatial data) upon receiving the user's selection of archive 1020. For example, map-interface provider 210 may update GUI 1002 to remove the entry of geospatial asset 1008A.

In some embodiments, map-interface provider 210 enables the user to share geospatial asset 1008A and one or more associated data products upon receiving the user's selection of share asset 1014. In some embodiments, in response to receiving the user's selection of share asset 1014, map-interface provider 210 can be configured to display GUI 1000B including link 1022 shown in, for example, a pop-up box. In some embodiments, link 1022 can be a hyperlink that can be shared to a desired recipient via text, email, phone, or other communication methods. Upon receiving link 1022, the recipient may access geospatial asset 1008A and associated data products by entering link 1022 into a client, e.g., a web browser, operated by the recipient.

In some embodiments, link 1022 associated with geospatial asset 1008A can be generated by asset manager 202. In some embodiments, while link 1022 is described with respect to geospatial asset 1008A, based on the user's selections, link 1022 may be associated with one or more geospatial assets 1008A-B or one or more folders each including one or more geospatial assets. For example, upon receiving the user's selection to share assets associated with folder 1006, map-interface provider 220 may provide link 1022 associated with geospatial assets 1008A-B stored in folder 1006.

In some embodiments, map-provider interface 210 can restrict the functionality provided to a user by one or more components of GIS application 200 based on link 1022. For example, upon receiving link 1022 from the recipient, map-provider interface 210 may display the geospatial asset on a map and enable the recipient to access the data visualization functionality provided to users that are logged into the GIS data platform. For example, map-provider interface 210 may enable the recipient view-only functionality such as zoom in/out, but disable functionality related to editing information or requesting data products.

Figure 11A:
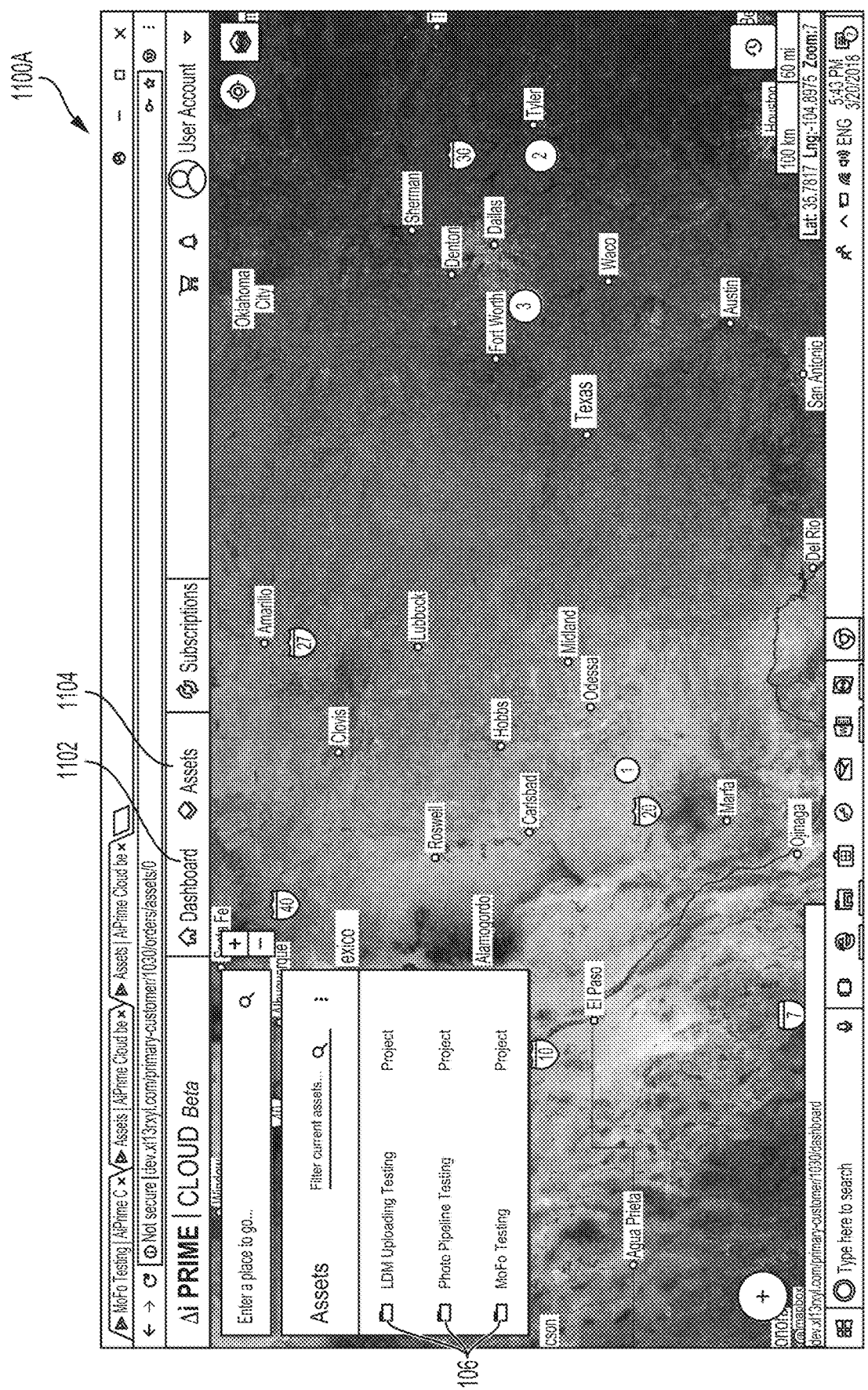
FIGS. 11A-B illustrate GUIs that show how the GIS application enables the user to share geospatial assets associated with the user, according to some embodiments.
Figure 11B:
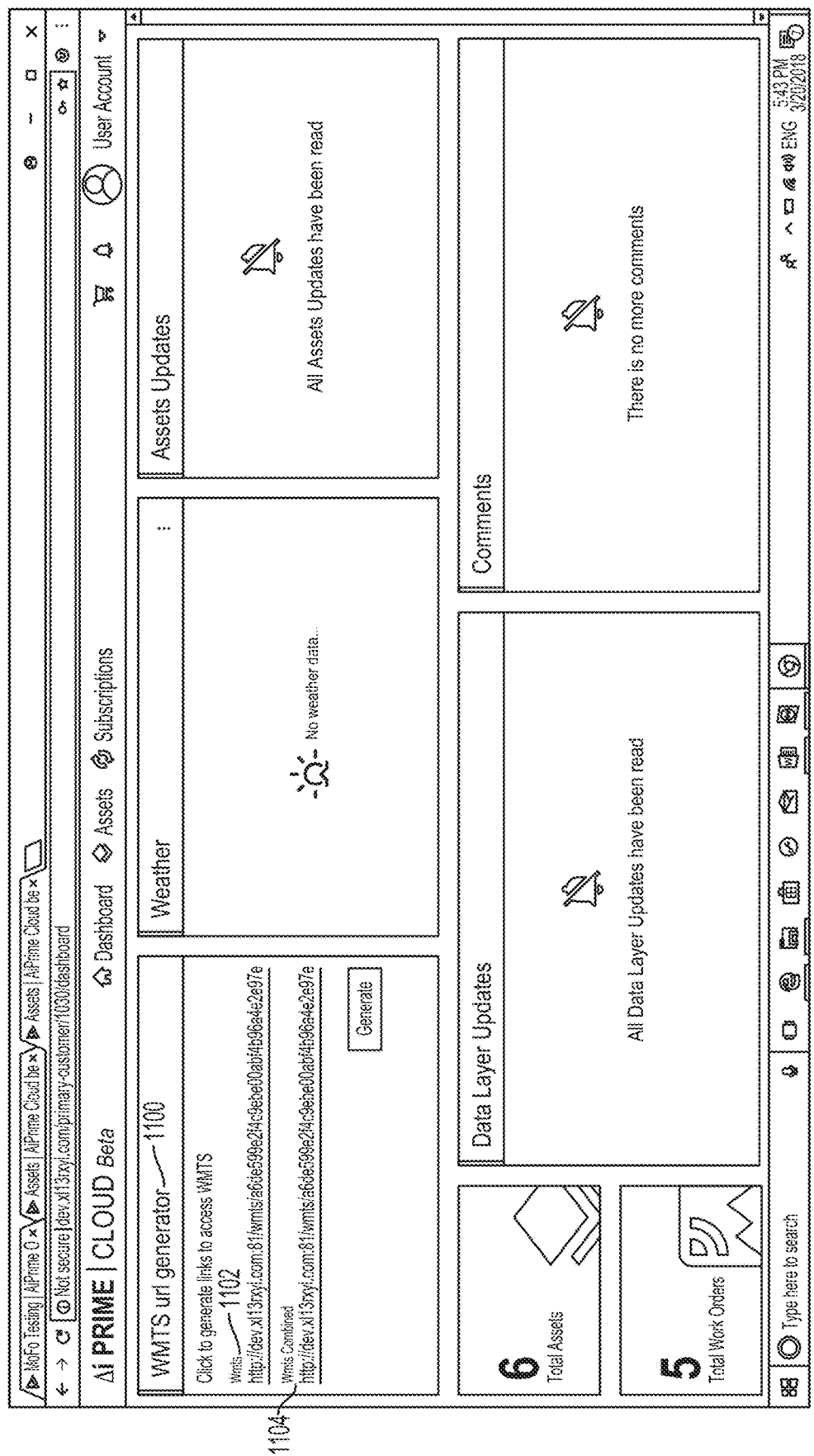

FIGS. 11A-B illustrate GUIs 1100A-B that show how GIS application 122 enables the user to share geospatial assets associated with the user, according to some embodiments. GUI 1100A displays, on the client, folders 1106 in an assets tab 1104. As described above, each of folders 1106 may store one or more geospatial assets. In some embodiments, upon receiving the user's selection of dashboard tab 1102, map-interface provider 210 can be configured to provide GUI 1100B showing link generation panel 1100. In some embodiments, asset manager 202 can be configured to generate one or more links (e.g., a Web Map Tile Service (WMTS) link) representative of one or more geospatial assets and that is associated with a file that comports with one or more GIS tools (e.g., ArcGis). In some embodiments, all the data products for every geospatial asset associated with the requesting user may be stored within the file. As shown in GUI 1100B, link generation panel 1100 enables the user to generate a link 1102 or a combined link 1104. In some embodiments, link 1102 can be associated with a file that organizes the data products of the user based on the name of the geospatial assets corresponding to the data products. In some embodiments, combined link 1104 can be associated with a file that organizes the data products based on a product type (e.g., RGB, MS, IR, etc.).

FIGS. 12A-I illustrate GUIs 1200A-I that show how GIS application 122 enables the user to access one or more data product subscriptions, according to some embodiments. In some embodiments, in contrast to on-demand data products associated with geospatial asset that are configured by geospatial data consumers 106, a data product subscription can correspond to one or more data products that are created on a recurring time interval for an area of interest defined by one of geospatial data suppliers 140. The area of interest may correspond to a specific geographic region on a map. In some embodiments, similar to how a user can configure a geospatial asset based on an input file (as described with respect to FIGS. 4A-D) or using a drawing toolbar (as described with respect to FIGS. 5A-D), geospatial data supplier 140 can configure data product subscription using similar mechanisms.

Accordingly, a data product subscription may be associated with a plurality of data products corresponding to a plurality of time periods for the same region. In some embodiments, GIS application 122 enables multiple users to purchase and request the same data product subscription, which can be accessed and visualized by each of those users as long as the subscription remains active.

In some embodiments, upon receiving the user's selection of a subscriptions tab, map-interface provider 210 can be configured to provide GUI 1200A showing current subscriptions 1204 of the user and available subscriptions 1206 that the user can request and purchase. Current subscriptions 1204 show that, for example, there are no current subscriptions associated with the user. In response to receiving the user's selection of available subscriptions 1206, map-interface provider 210 can be configured to provide GUI 1200B showing data product subscriptions 1210 that the user can request. In some embodiments, GUI 1200B can be configured to display marked locations 1208A-C corresponding to data product subscriptions 1210 on map 1202B. In the example shown in GUI 1200B, there may be thirty total data product subscriptions 1210 grouped into three different geographic areas as shown by the three marked locations 1208A-C.

In some embodiments, in addition to enabling the user to scroll through data product subscriptions 1210, GUI 1200B may enable the user to select one of marked locations 1208A-C to view one or more of data product subscriptions 1210 in greater detail. For example, in response to receiving the user's selection of marked location 1208A in GUI 1200B, map-interface provider 210 can be configured to provide GUI 1200C showing marked location 1208A in greater detail on map 1202C. In particular, map 1202C shows that marked location 1208A includes a total of ten selectable data product subscriptions.

In some embodiments, upon receiving the user's selection of a data product subscription, e.g., "Reeves Pecos SE Block 08," map-interface provider 210 can be configured to provide GUI 1200D showing the selected data product 1212 in the center of map 1202D. In some embodiments, the data product subscription can be selected from one of data product subscriptions 1210 as shown in GUI 1200A, or from one of the selectable data product subscriptions shown in map 1202C of GUI 1200C.

In some embodiments, upon receiving the user's selection to purchase the selected data product subscription, map-interface provider 210 can be configured to provide GUI 1200E showing dialog box 1214. Dialog box 1214 may enable the user to name the subscription, select one or more available data products, and a recurring time interval for each of the one or more selected data products. In some embodiments, upon confirming the options in dialog box 1214, asset manager 202 can be configured to store the purchased data product subscription in association with the user's account in database 130. As shown in GUI 1200F, data product subscription 1204A for "Reeves Pecos SE Block 08" may be shown under current subscriptions 1204 associated with the user.

In some embodiments, as shown in GUI 1200F, in response to receiving the user's selection of data product subscription 1204A, GUI 1200F can be configured to display boundaries 1216 of the region associated with data product subscription 204A. In some embodiment, in response to receiving the user's selection of a view option (e.g., the eye icon), map-interface provider 210 can be configured to provide GUI 1200G showing subscription details 1218 of data product subscription 1204A.

Figure 12A:
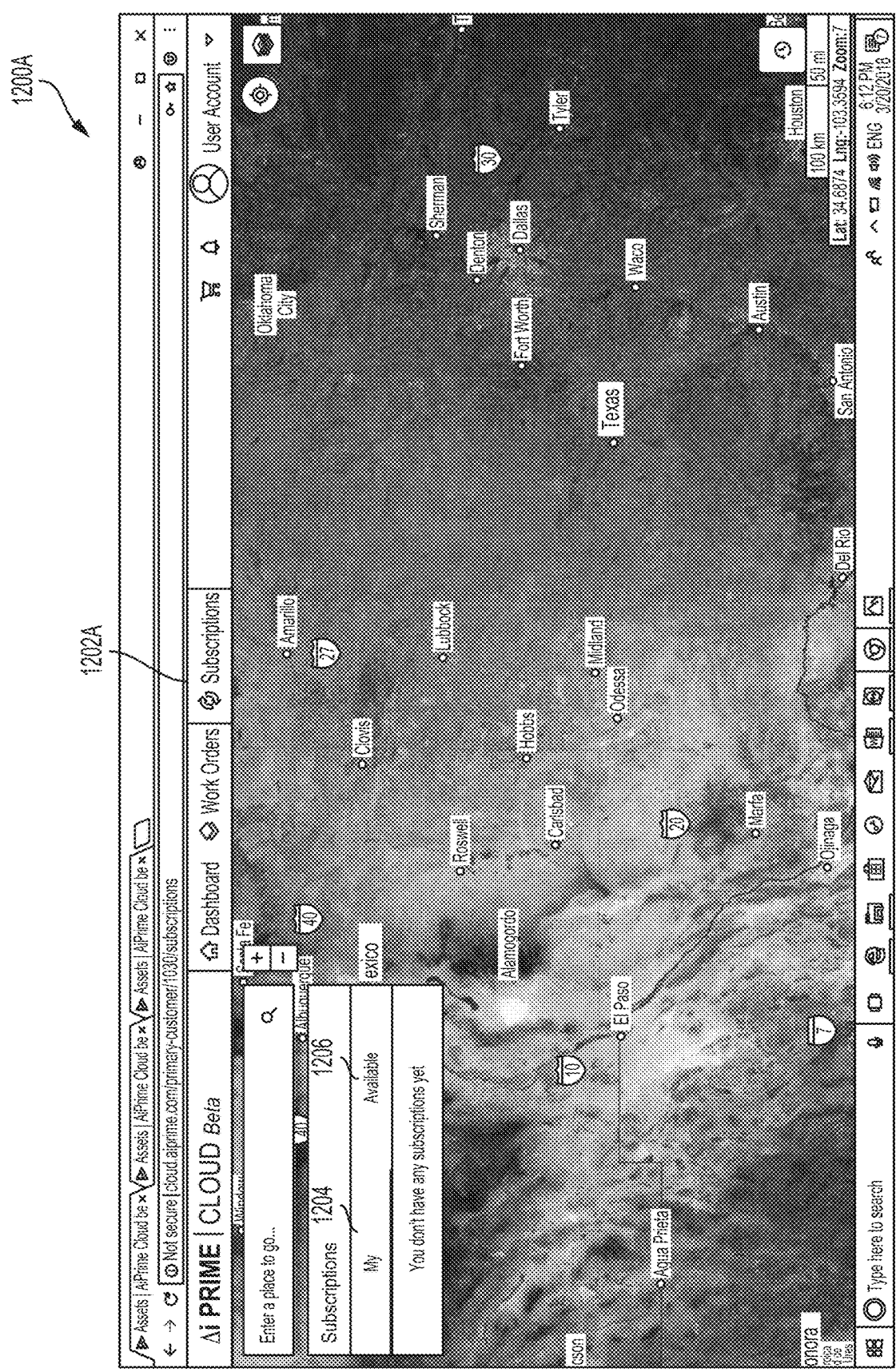
FIGS. 12A-I illustrate GUIs that show how the GIS application enables the user to access one or more data product subscriptions, according to some embodiments.
Figure 12B:
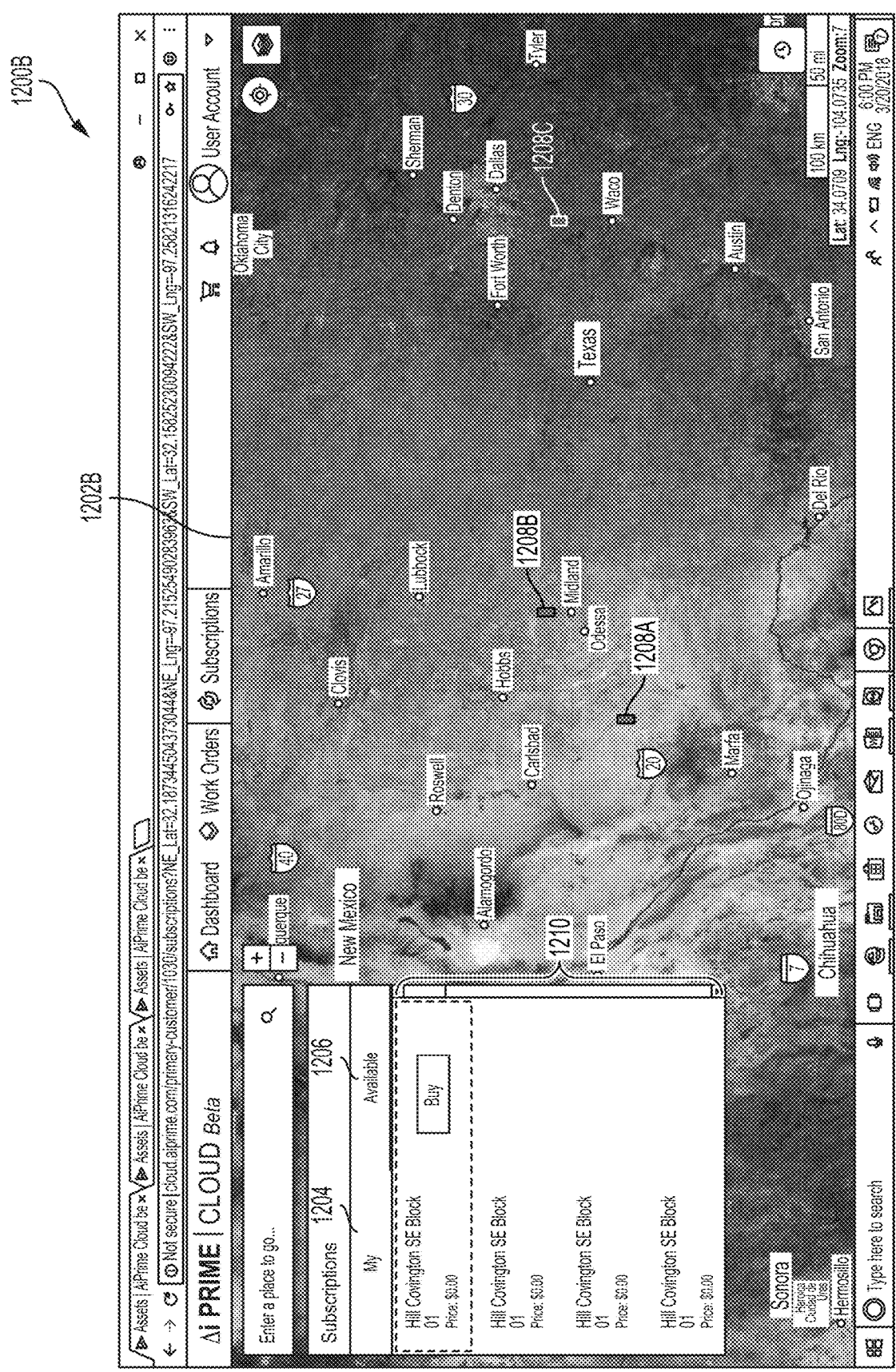
Figure 12C:
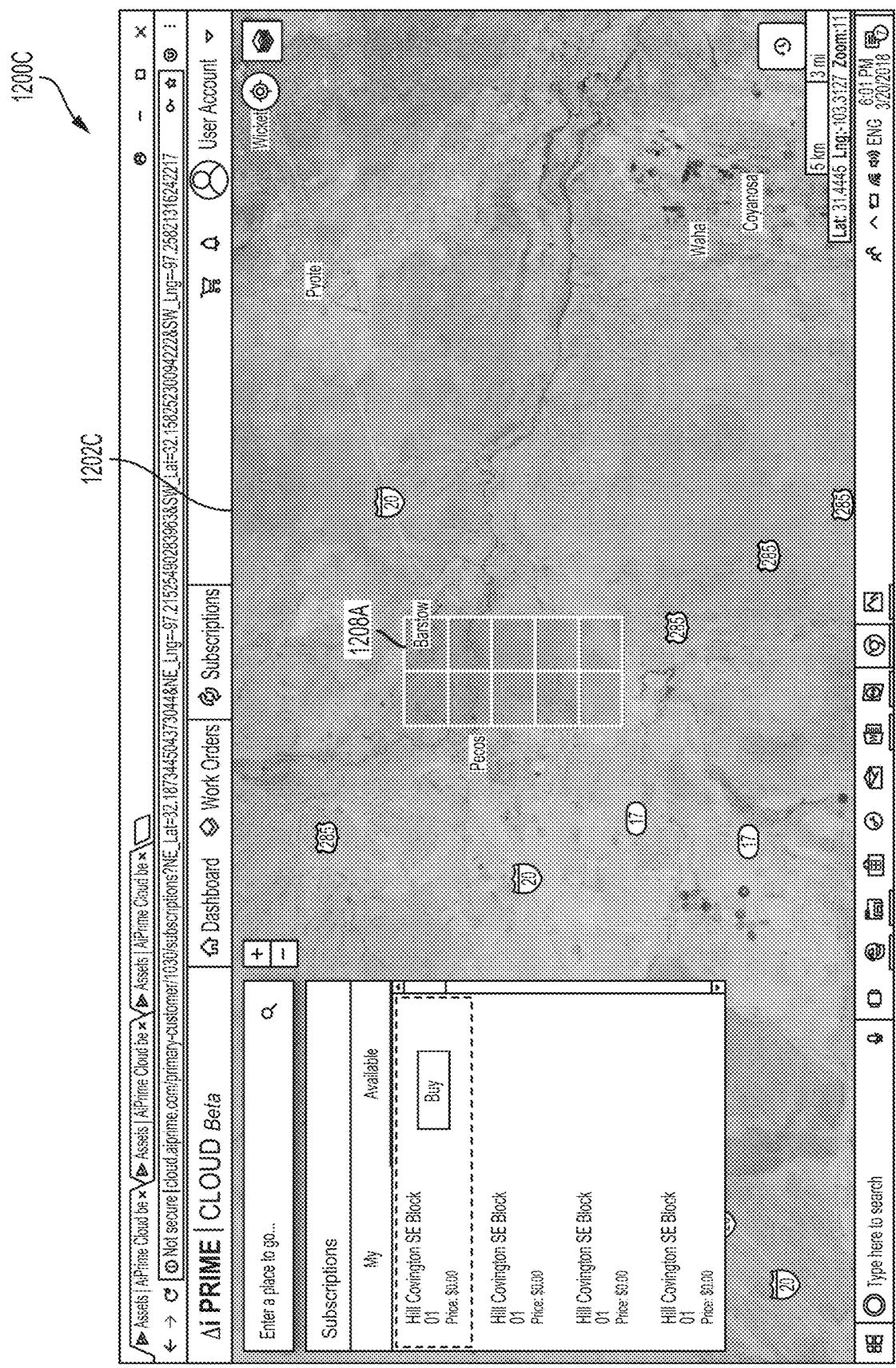
Figure 12D:
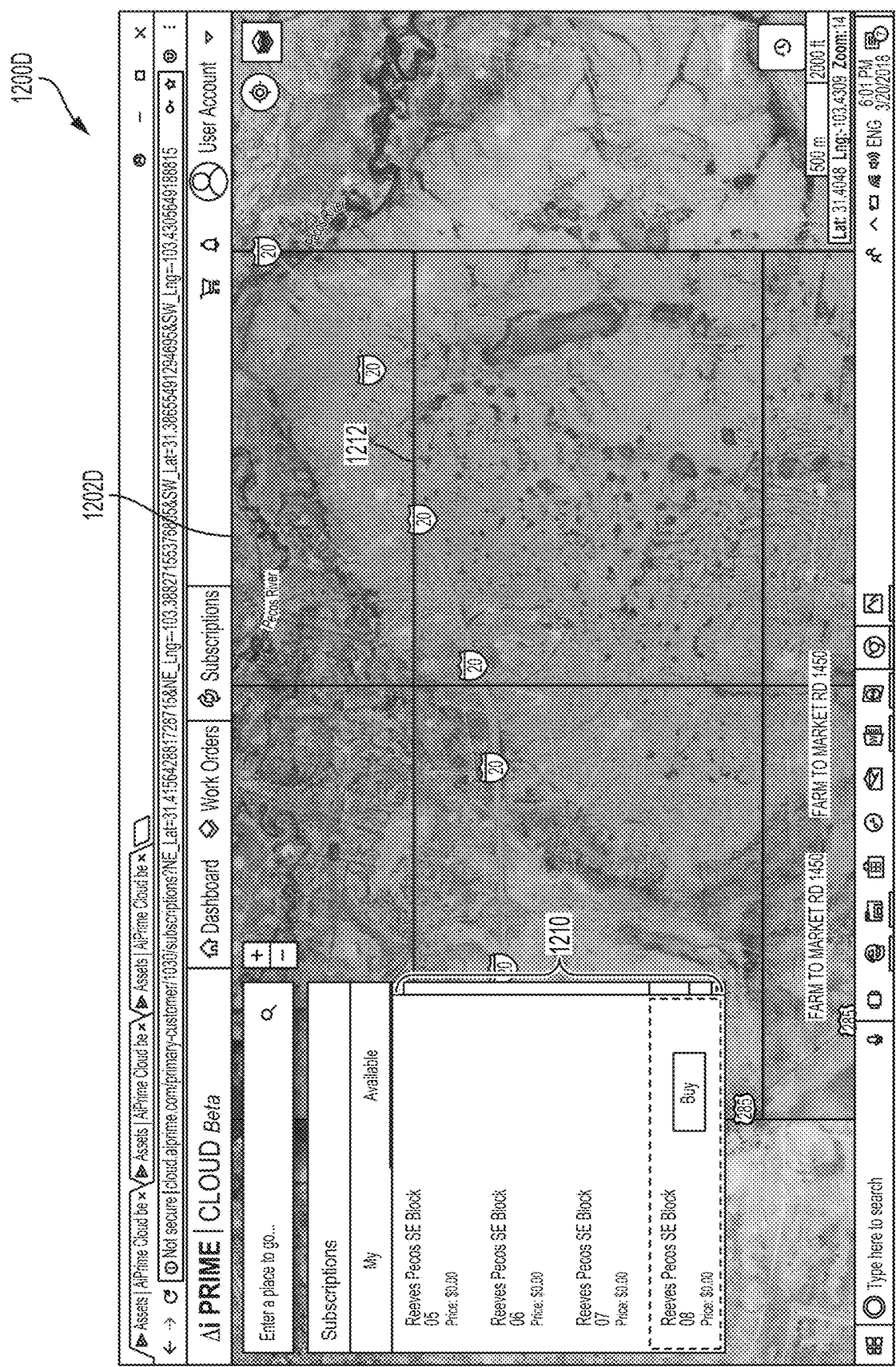
Figure 12E:
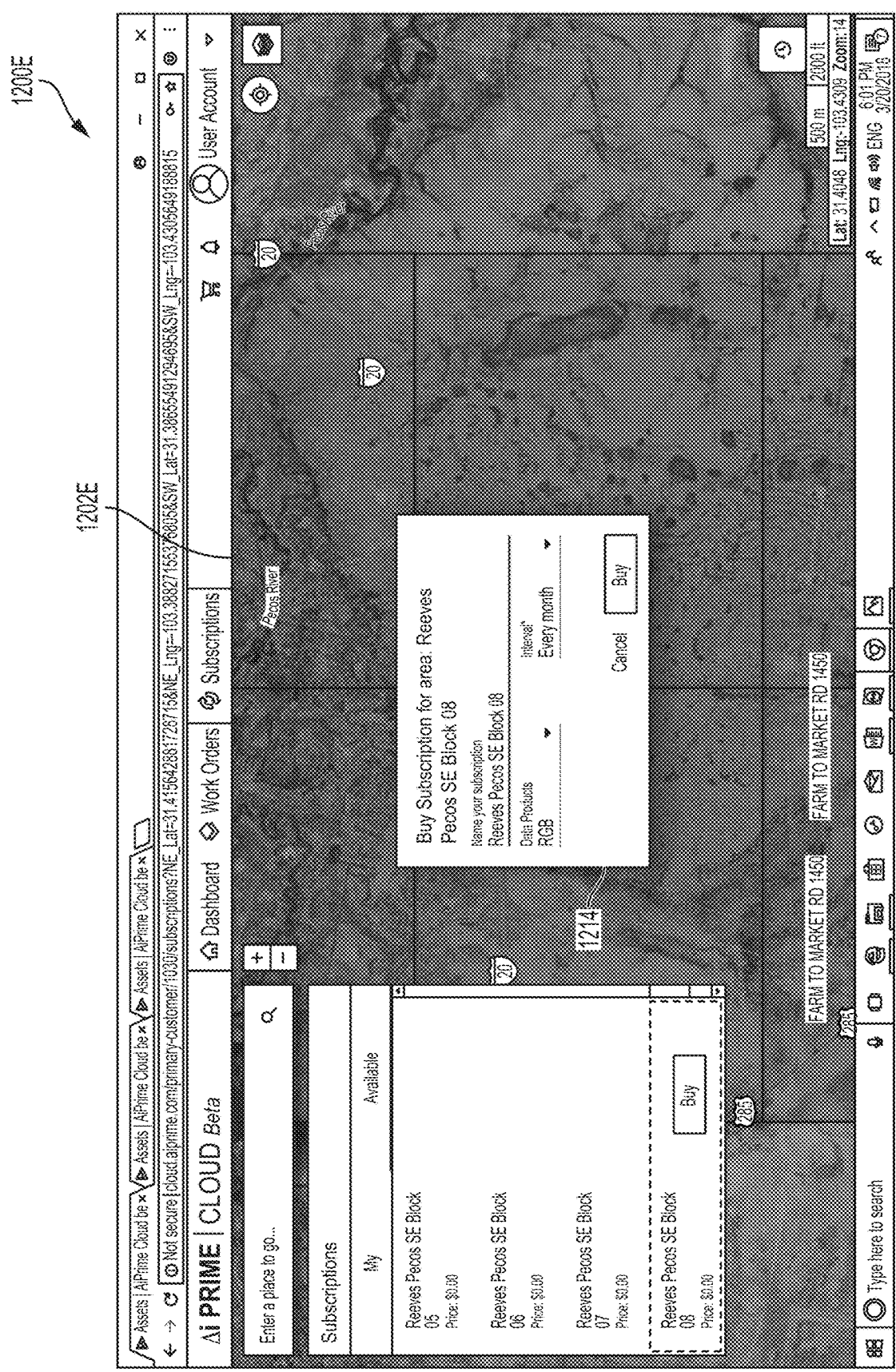
Figure 12F:
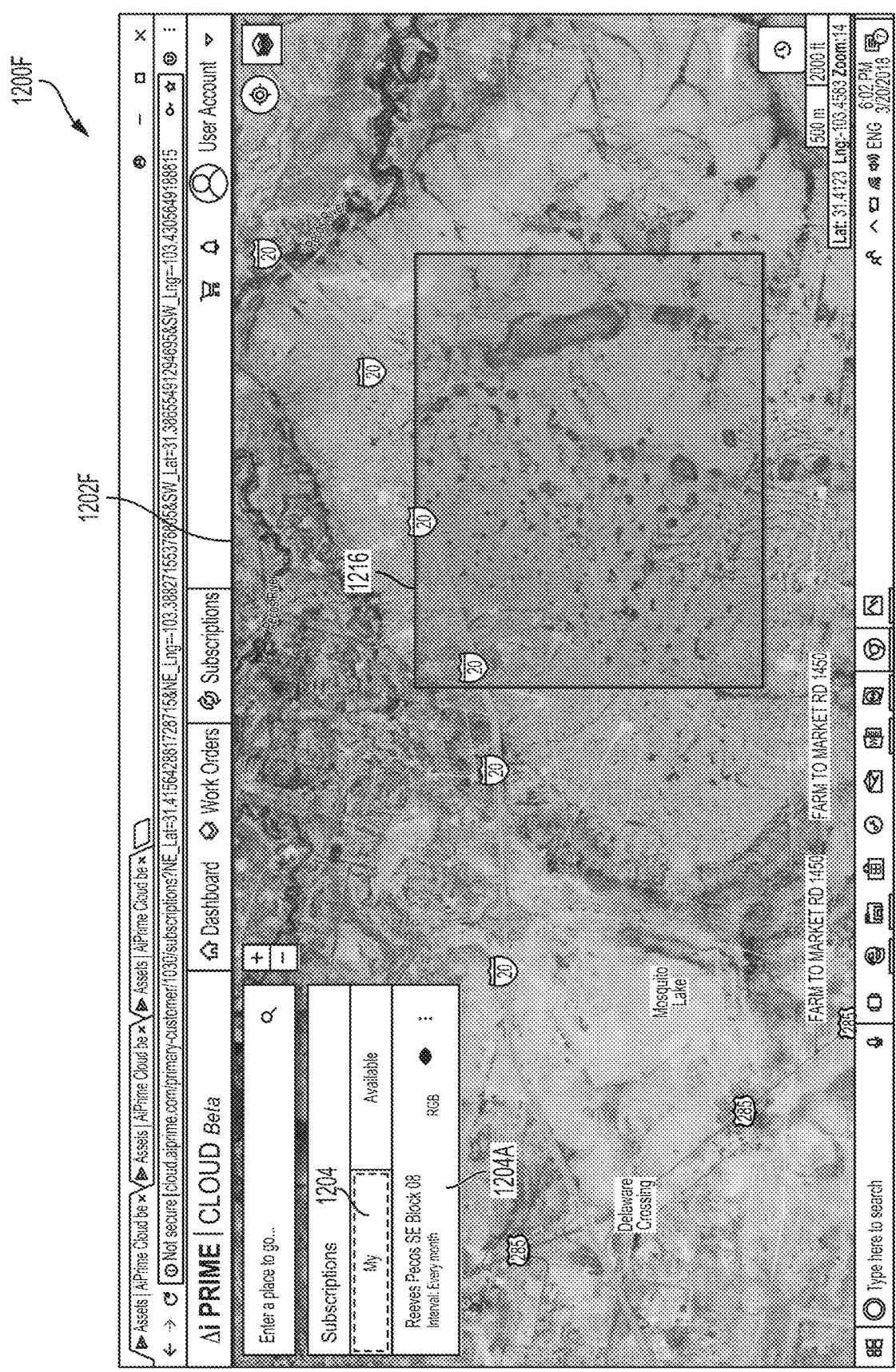
Figure 12G:
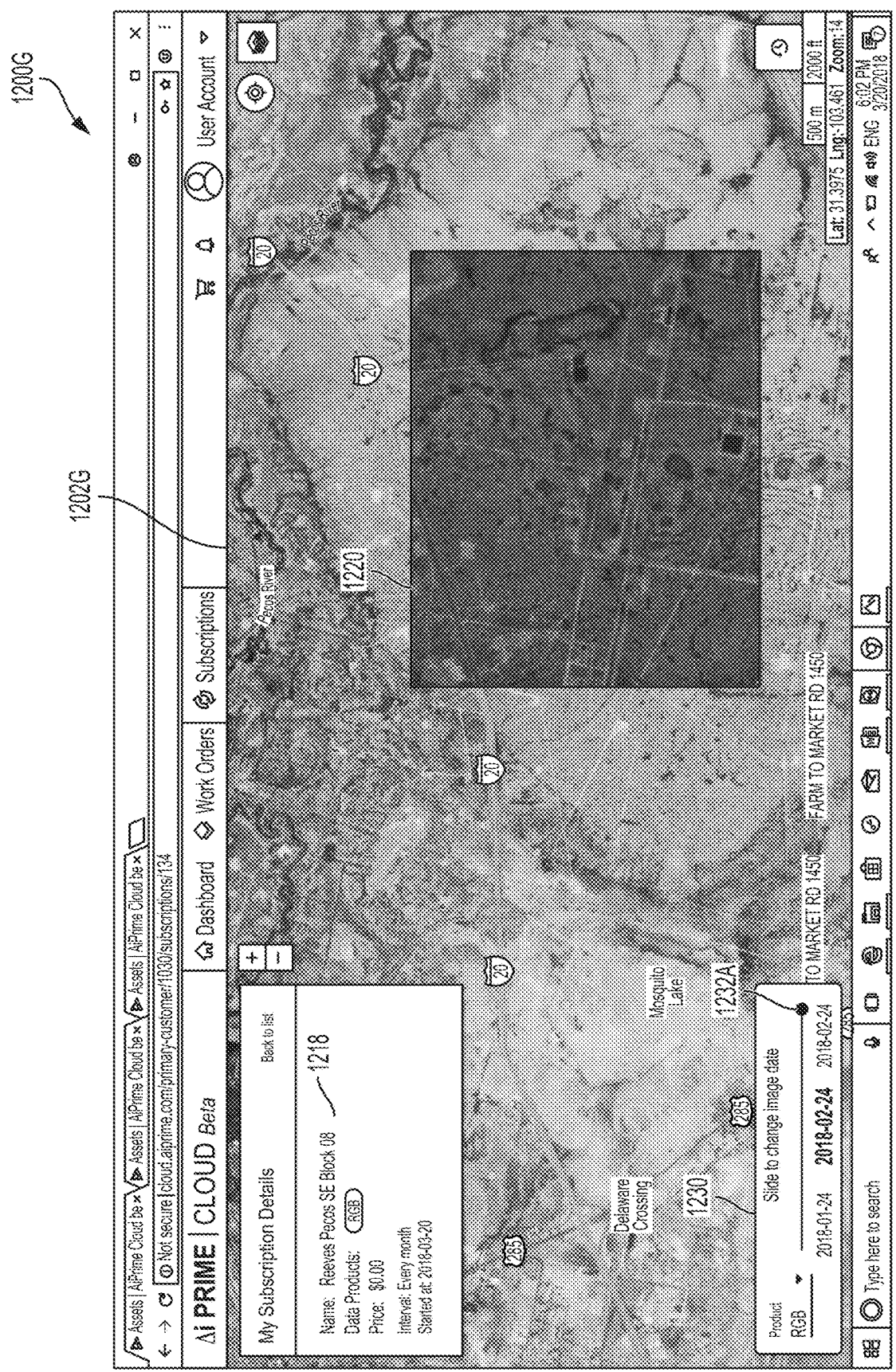
Figure 12H:
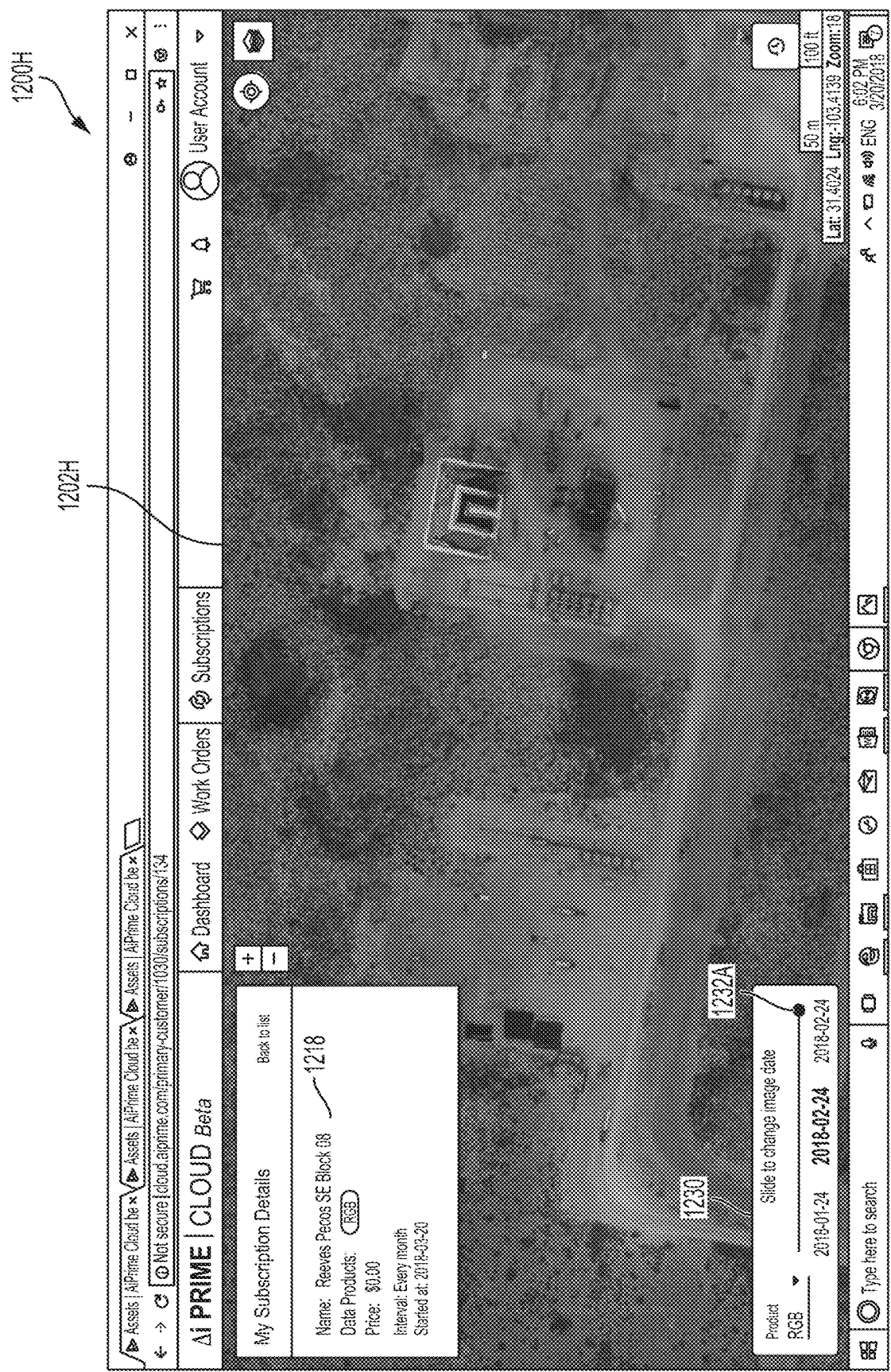
Figure 12I:

In some embodiments, one or more data products associated with data product subscription 1204A can be accessed via data product navigator 1230 provided to the user in GUI 1200G. Data product navigator 1230 can be configured to enable the user to select a data product type (e.g., RGB) provided in data product subscription 1204A. Additionally, data product navigator 1230 can be configured to enable the user to select one of the data products for display from a plurality data product shown in a slider bar. The slider bar may be a time slider that indicates a plurality of time periods to allow the user to move the indicator 1232A between different time periods to select one of the corresponding data products for display in map 1202G. Accordingly, as shown in FIGS. 12H-I, map-interface provider 210 can be configured to provide a time-slider bar functionality, within GUI 1200, to enable the user to view one or more data products for a geospatial area, as defined by a geospatial asset, over a plurality of time periods.

In some embodiments, indicator 1232A may default to the most recent image available, for example, taken on Feb. 24, 2018. Accordingly, GUI 1200G may display the data product corresponding to indicator 1232A as data layer 1220 on map 1202G. In some embodiments, GUI 1200G enables the user to change a zoom level for viewing data layer 1220. For example, GUI 1200G displays data layer 1220 at zoom level 14. In response to receiving the user's input to change the zoom level, map-interface provider 210 may provide GUI 1200H showing the same data layer 1220 of GUI 1200G at a different zoom level, for example, zoom level 18.

In some embodiments, map-interface provider 210 can maintain the same zoom level for a displayed data layer as the user changes the data product being displayed by changing a location of indicator 1232A-B in the slide bar of data product navigator 1230. For example, as shown in GUI 1200I, map-interface provider 210 can be configured to update map 1202H to map 1202I showing the data product corresponding to indicator 1232B, i.e., the data product produced on Jan. 24, 2018. The zoom level, however, remains at the same zoom level, e.g., zoom level 18. Accordingly, the user can slide indicator 1232A-B along the slide bar to smoothly visualize a progression of graphic representations of an area of interest without having to readjust the view of the area of interest in map 1202A-I.

In some embodiments, in addition to enabling the user to access one or more data products subscriptions as described above with respect to FIGS. 12A-I, GIS application 122 can be configured to provide the user access, via GUI 1200, to a plurality of data products procured by third parties. For example, GIS application 122 may display, via GUI 1200, an online data store portal showing a plurality of available data products for a plurality of geospatial assets. GIS application 122 may display each available data product with an associated price and the provider, i.e., the third party that obtained and is providing the data product. In some embodiments, upon the user selecting and paying for a displayed data product, the GIS application 122 can store the data product in association with one of the user's stored geospatial assets, as will be further described below.

Figure 14:
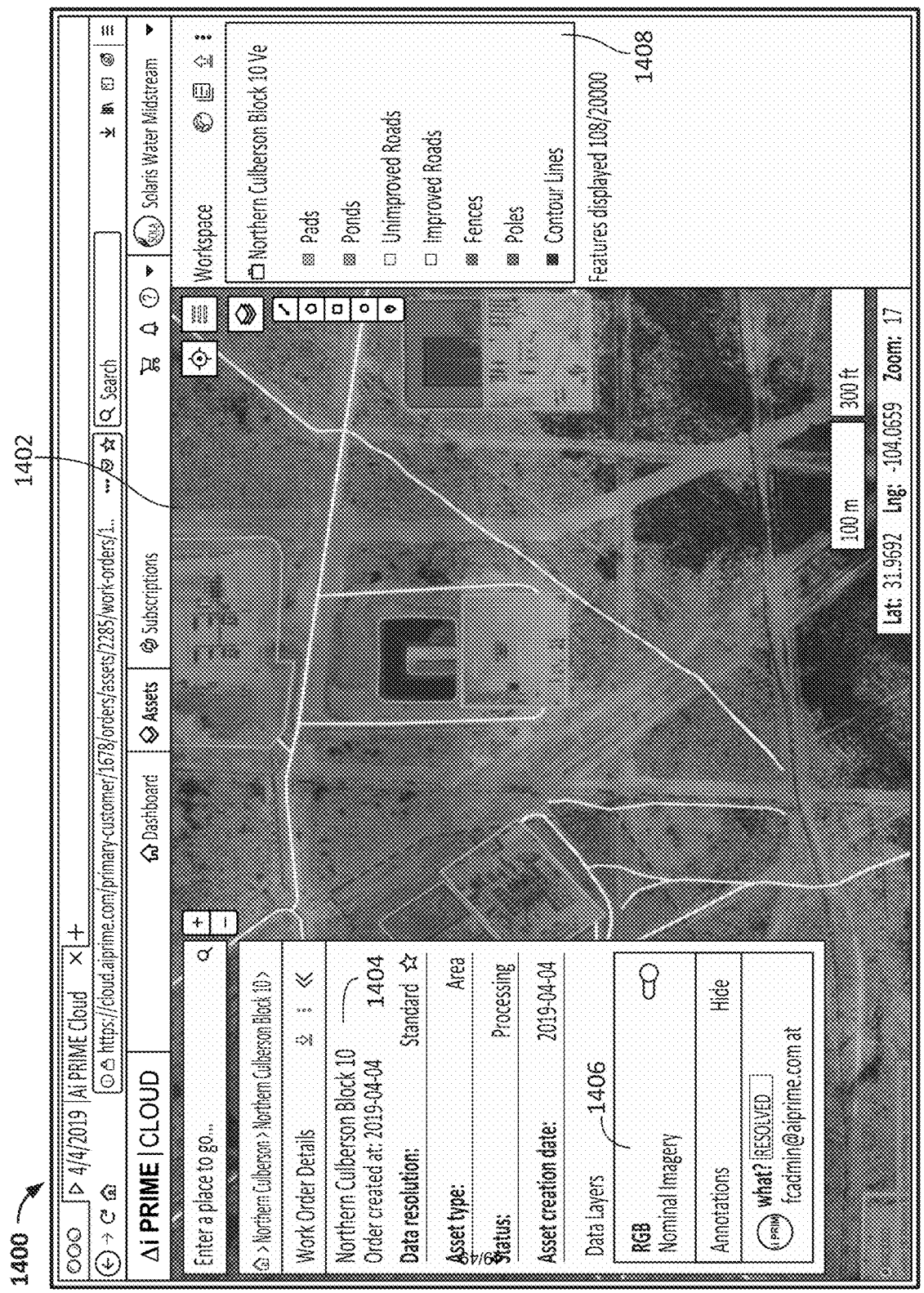
FIG. 14 illustrates a GUI that shows how the GIS application enables the user to add one or more data-viewing layers on top of a data product associated with the geospatial asset.

FIG. 14 illustrates a GUI 1400 that shows how GIS application 122 enables the user to add one or more data-viewing layers 1408 on top of a data product 1406 (e.g., an RGB image) associated with a geospatial asset 1404 (e.g., labeled "Northern Culberson Block 10), according to some embodiments. Further to enabling the user to select and view a plurality of data products associated with geospatial asset 1404 (e.g., as described above with respect to FIG. 8D-E), GUI 1400 can enable the user to create, upload, or share custom spatial data within a data-viewing layer, according to some embodiments. For example, GUI 1400 shows data-viewing layer 1408 that shows features of interest identified within the RGB image (i.e., data product 1406) shown on map 1402. In some embodiments, data-viewing layer 1408 may be a custom layer of annotations created and submitted by the user or data-viewing layer 1408 may be one of the data products selected and purchased by the user from the online data store portal provided by GIS application 122.

Figure 13:
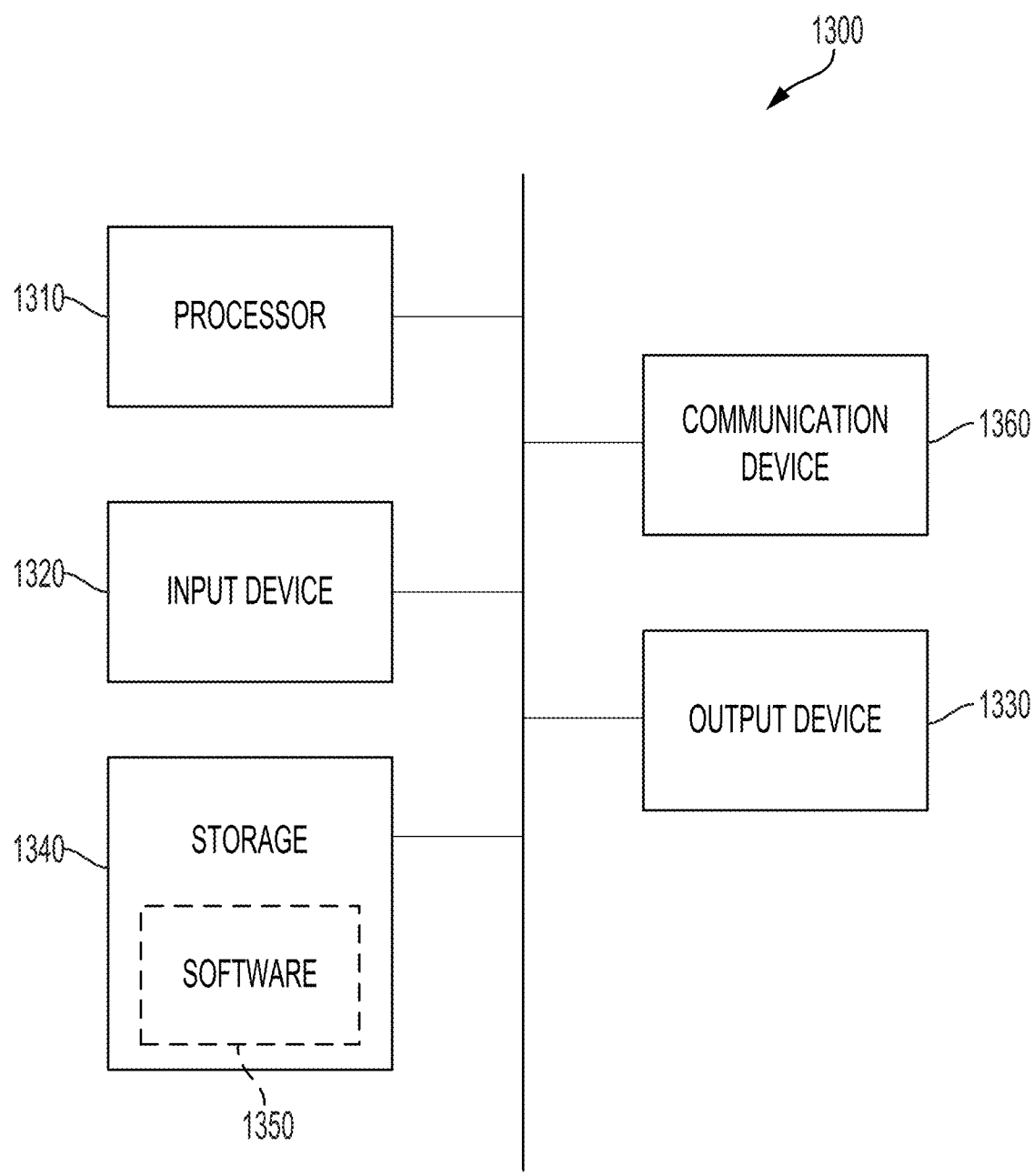
FIG. 13 illustrates an example of a computing device, according to some embodiments.

FIG. 13 illustrates an example of a computer in accordance with one embodiment. Computer 1300 can be a component of a system for detecting anomalies for a plurality of components operating in a system according to the systems and methods described above, such as system 100 of FIG. 1, or can include the entire system itself. In some embodiments, computer 1300 is configured to execute a method for detecting anomalies, such as method 500 of FIG. 5.

Computer 1300 can be a host computer connected to a network. Computer 1300 can be a client computer or a server. As shown in FIG. 13, computer 1300 can be any suitable type of microprocessor-based device, such as a personal computer, workstation, server, or handheld computing device, such as a phone or tablet. The computer can include, for example, one or more of processor 1310, input device 1320, output device 1330, storage 1340, and communication device 1360. Input device 1320 and output device 1330 can correspond to those described above and can either be connectable or integrated with the computer.

Input device 1320 can be any suitable device that provides input, such as a touch screen or monitor, keyboard, mouse, or voice-recognition device. Output device 1330 can be any suitable device that provides an output, such as a touch screen, monitor, printer, disk drive, or speaker.

Storage 1340 can be any suitable device that provides storage, such as an electrical, magnetic, or optical memory, including a random access memory (RAM), cache, hard drive, CD-ROM drive, tape drive, or removable storage disk. Communication device 1360 can include any suitable device capable of transmitting and receiving signals over a network, such as a network interface chip or card. The components of the computer can be connected in any suitable manner, such as via a physical bus or wirelessly. Storage 1340 can be a non-transitory computer-readable storage medium comprising one or more programs, which, when executed by one or more processors, such as processor 1310, cause the one or more processors to execute methods described herein, such as method 500 of FIG. 5.

Software 1350, which can be stored in storage 1340 and executed by processor 1310, can include, for example, the programming that embodies the functionality of the present disclosure (e.g., as embodied in the systems, computers, servers, and/or devices as described above). In some embodiments, software 1350 can include a combination of servers such as application servers and database servers.

Software 1350 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 1340, that can contain or store programming for use by or in connection with an instruction execution system, apparatus, or device.

Software 1350 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include but is not limited to, an electronic, magnetic, optical, electromagnetic, or infrared wired or wireless propagation medium.

Computer 1300 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 1300 can implement any operating system suitable for operating on the network. Software 1350 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The preceding description sets forth exemplary methods, parameters and the like. It should be recognized, however, that such description is not intended as a limitation on the scope of the present disclosure but is instead provided as a description of exemplary embodiments. The illustrative embodiments described above are not meant to be exhaustive or to limit the disclosure to the precise forms disclosed. Many modifications and variations are possible in view of the above teachings. The embodiments were chosen and described to best explain the principles of the disclosed techniques and their practical applications. Others skilled in the art are thereby enabled to best utilize the techniques, and various embodiments with various modifications as are suited to the particular use contemplated.

Although the disclosure and examples have been thoroughly described with reference to the accompanying figures, it is to be noted that various changes and modifications will become apparent to those skilled in the art. Such changes and modifications are to be understood as being included within the scope of the disclosure and examples as defined by the claims. In the preceding description of the disclosure and embodiments, reference is made to the accompanying drawings, in which are shown, by way of illustration, specific embodiments that can be practiced. It is to be understood that other embodiments and examples can be practiced, and changes can be made without departing from the scope of the present disclosure.

Although the preceding description uses terms first, second, etc. to describe various elements, these elements should not be limited by the terms. These terms are only used to distinguish one element from another.

Also, it is also to be understood that the singular forms "a," "an," and "the" used in the preceding description are intended to include the plural forms as well unless the context indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

In some embodiments, a non-transitory computer-readable storage medium stores one or more programs configured to be executed by one or more processors of an electronic device with a display, the one or more programs including instructions for implementing any of the steps described or claimed herein. The present disclosure also relates to a device for performing the operations herein. This device may be specially constructed for the required purposes, or it may include a general-purpose computer selectively activated or reconfigured by a computer program stored in the computer. Such a computer program may be stored in a non-transitory, computer computer-readable storage medium, such as, but not limited to, any type of disk, including floppy disks, optical disks, CD-ROMs, magnetic-optical disks, read-only memories (ROMs), random access memories (RAMs), electrically program read-only memories (EPROMs), electronically erasable program read-only memories EEPROMs, magnetic or optical cards, application specific integrated circuits (ASICs), or any type of media suitable for storing electronic instructions, and each coupled to a computer system bus. Furthermore, the computers referenced in this disclosure may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems appears from the description above. Also, the present disclosure is not described with reference to any particular programming language. It will be appreciated that a variety of programming languages may be used to implement the teachings of the present disclosure as described herein.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The invention claimed is:

1. A method of fulfilling requests for data products, comprising:
   displaying, using a graphical user interface (GUI), a plurality of data requests comprising a data request that corresponds to one or more requested data products associated with a geospatial asset, the one or more requested data products comprising one or more requested images or maps;
   receiving, from a user using the GUI, a first input comprising a selection of the data request from the plurality of data requests;
   displaying, using the GUI, a plurality of selectable options based on the first input, wherein the plurality of selectable options are configured to enable the user to fulfill the data request;
   receiving, from the user using the GUI, a second input comprising a selection of a first option from the plurality of selectable options;
   displaying, using the GUI, a schema based on the second input, wherein the schema comprises a data structure storing information defining boundaries of a region;
   generating the one or more requested images or maps using raw image data selected based on the schema;
   transmitting the generated one or more images or maps to a geospatial data consumer;
   a first instance of updating a status of the generated one or more images or maps based upon a determination that the generated one or more images or maps has been uploaded; and
   a second instance of updating the status of the generated one or more images or maps comprises:
      displaying the generated one or more images or maps based on a fourth input comprising a selection of the generated one or more images or maps;
      receiving, from the user of the graphical user interface, a fifth user input comprising a quality assurance assessment, wherein the quality assurance assessment comprises one of a pass and a fail; and
      updating the status of the generated one or more images or maps based on the received quality assurance assessment.

2. The method of claim 1, wherein the plurality of selectable options comprises the first option to display the schema, a second option to display a boundary map, and a third option to download the schema.

3. The method of claim 2, comprising:
   receiving, from the user using the graphical user interface (GUI), a third input comprising a selection of the second option from the plurality of selectable options; and
   displaying, using the GUI, the boundary map based on the third input, wherein the boundary map comprises the boundaries of the region associated with the data request.

4. The method of claim 3, wherein the boundary map is displayed using the information comprising a plurality of geographical coordinates defining the boundaries of the region.

5. The method of claim 1, wherein the schema comprises second information comprising a type and a resolution for each requested image or map of the one or more requested images or maps.

6. The method of claim 5, wherein the type of image or map comprises an RGB image, a multispectral (MS) image, a long wave infra-red (IR) image, or a digital elevation map (DEM).

7. The method of claim 1, wherein generating the one or more requested images or maps based on the schema comprises:
   filtering the raw image data to include a type of image or map corresponding to the one or more requested images or maps; and
   selecting one or more portions of the filtered raw image data that comprises the region whose boundaries are defined in the information of the schema.

8. The method of claim 1, comprising, in accordance with the status of the generated one or more images or maps being updated to a fail:
   generating one or more replacement images or maps, wherein the one or more replacement images or maps comprises an improved image quality from the previously generated image or map.

9. A system, comprising:
   one or more processors; and
   a memory storing instructions that when executed by the one or more processors, cause the one or more processors to perform instructions for fulfilling requests for data products comprising:
      displaying, using a graphical user interface (GUI), a plurality of data requests comprising a data request that corresponds to one or more requested data products associated with a geospatial asset, the one or more requested data products comprising one or more requested images or maps;
      receiving, from a user using the GUI, a first input comprising a selection of the data request from the plurality of data requests;
      displaying, using the GUI, a plurality of selectable options based on the first input, wherein the plurality of selectable options are configured to enable the user to fulfill the data request;
      receiving, from the user using the GUI, a second input comprising a selection of a first option from the plurality of selectable options;
      displaying, using the GUI, a schema based on the second input, wherein the schema comprises a data structure storing information defining boundaries of a region;
      generating the one or more requested images or maps using raw image data selected based on the schema; and
      transmitting the generated one or more images or maps to a geospatial data consumer;
      a first instance of updating a status of the generated one or more images or maps based upon a determination that the generated one or more images or maps has been uploaded; and a second instance of updating the status of the generated one or more images or maps comprises:
    displaying the generated one or more images or maps based on a fourth input comprising a selection of the generated one or more images or maps;
    receiving, from the user of the graphical user interface, a fifth user input comprising a quality assurance assessment, wherein the quality assurance assessment comprises one of a pass and a fail; and
    updating the status of the generated one or more images or maps based on the received quality assurance assessment.

10. The system of claim 9, wherein the plurality of selectable options comprises the first option to display the schema, a second option to display a boundary map, and a third option to download the schema.

11. The system of claim 10, comprising:
receiving, from the user using the graphical user interface (GUI), a third input comprising a selection of the second option from the plurality of selectable options; and
displaying, using the GUI, the boundary map based on the third input, wherein the boundary map comprises the boundaries of the region associated with the data request.

12. The system of claim 11, wherein the boundary map is displayed using the information comprising a plurality of geographical coordinates defining the boundaries of the region.

13. The system of claim 9, wherein the schema comprises second information comprising a type and a resolution for each requested image or map of the one or more requested images or maps.

14. The system of claim 13, wherein the type of image or map comprises an RGB image, a multispectral (MS) image, a long wave infra-red (IR) image, or a digital elevation map (DEM).

15. The system of claim 9, wherein generating the one or more requested images or maps based on the schema comprises:
filtering the raw image data to include a type of image or map corresponding to the one or more requested images or maps; and
selecting one or more portions of the filtered raw image data that comprises the region whose boundaries are defined in the information of the schema.

16. The system of claim 9, comprising, in accordance with the status of the generated one or more images or maps being updated to a fail:
generating one or more replacement images or maps, wherein the one or more replacement images or maps comprises an improved image quality from the previously generated image or map.

17. A non-transitory computer-readable storage medium comprising instructions for fulfilling requests for data products, wherein the instructions, when executed by one or more processors, cause the one or more processors to perform instructions comprising:
displaying, using a graphical user interface (GUI), a plurality of data requests comprising a data request that corresponds to one or more requested data products associated with a geospatial asset, the one or more requested data products comprising one or more requested images or maps;
receiving, from a user using the GUI, a first input comprising a selection of the data request from the plurality of data requests;
displaying, using the GUI, a plurality of selectable options based on the first input, wherein the plurality of selectable options are configured to enable the user to fulfill the data request;
receiving, from the user using the GUI, a second input comprising a selection of a first option from the plurality of selectable options;
displaying, using the GUI, a schema based on the second input, wherein the schema comprises a data structure storing information defining boundaries of a region;
generating the one or more requested images or maps using raw image data selected based on the schema; and
transmitting the generated one or more images or maps to a geospatial data consumer;
a first instance of updating a status of the generated one or more images or maps based upon a determination that the generated one or more images or maps has been uploaded; and
a second instance of updating the status of the generated one or more images or maps comprises:
    displaying the generated one or more images or maps based on a fourth input comprising a selection of the generated one or more images or maps;
    receiving, from the user of the graphical user interface, a fifth user input comprising a quality assurance assessment, wherein the quality assurance assessment comprises one of a pass and a fail; and
updating the status of the generated one or more images or maps based on the received quality assurance assessment.

* * * * *